(12) United States Patent
Fang et al.

(10) Patent No.: US 12,512,484 B2
(45) Date of Patent: Dec. 30, 2025

(54) ALKALINE FUEL CELL ELECTRODE CATALYST, ALKALINE FUEL CELL, AND METHODS OF MAKING AND USING AN ELECTRODE CATALYST

(71) Applicant: The Research Foundation for the State University of New York, Albany, NY (US)

(72) Inventors: Jiye Fang, Vestal, NY (US); Ming Zhou, Binghamton, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 399 days.

(21) Appl. No.: 18/081,485

(22) Filed: Dec. 14, 2022

(65) Prior Publication Data

US 2023/0261211 A1 Aug. 17, 2023

Related U.S. Application Data

(60) Provisional application No. 63/310,230, filed on Feb. 15, 2022.

(51) Int. Cl.
H01M 4/90 (2006.01)
H01M 4/88 (2006.01)
H01M 8/083 (2016.01)
H01M 4/86 (2006.01)

(52) U.S. Cl.
CPC ....... *H01M 4/9016* (2013.01); *H01M 4/8882* (2013.01); *H01M 8/083* (2013.01); *H01M 2004/8689* (2013.01)

(58) Field of Classification Search
CPC .................................................. H01M 4/9016
See application file for complete search history.

(56) References Cited

U.S. PATENT DOCUMENTS

| 7,208,439 B2 * | 4/2007 | Zhong ....................... B22F 9/24 |
| | | 502/185 |
| 2020/0295380 A1 * | 9/2020 | Yang ................... H01M 4/9016 |

* cited by examiner

*Primary Examiner* — Brian R Ohara
(74) *Attorney, Agent, or Firm* — Peter Fallon

(57) ABSTRACT

A fuel cell catalyst, including: one or more substantially monodisperse nanocrystals, wherein the one or more substantially monodisperse nanocrystals include an octahedral morphology or nanocrystal geometry including eight exclusively exposed {101} facets. In embodiments, a cathode including the fuel cell catalyst is also provided, including methods of making the fuel cell catalyst.

11 Claims, 40 Drawing Sheets

ALKALINE FUEL CELL ELECTRODE CATALYST, ALKALINE FUEL CELL, AND METHODS OF MAKING AND USING AN ELECTRODE CATALYST

CROSS-REFERENCE TO RELATED APPLICATIONS

The present application claims the benefit of prior-filed U.S. Provisional Application Ser. No. 63/310,230, which was filed on Feb. 15, 2022, the disclosure of which is hereby incorporated by reference.

STATEMENT OF GOVERNMENTAL SUPPORT

This invention was made with government support under grant no. DE-SC0019445 awarded by the U.S. Department of Energy. The government has certain rights in the invention.

FIELD OF THE INVENTION

This disclosure generally relates to an electrode catalyst, an alkaline fuel cell including the electrode catalyst, as well as manufacturing methods for an alkaline fuel cell electrode catalyst.

BACKGROUND

As key renewable energy technologies, hydrogen fuel cells have gained increasing attention for meeting rising global energy demand and alleviating the severe environmental pollution caused by fossil fuel combustion. However, the oxygen reduction reaction (ORR) at the cathode is considered a kinetically sluggish four-electron transfer process. While the precious metal-based electrocatalysts have been well-demonstrated to be the state-of-the-art ORR electrocatalysts, their high cost, scarcity and insufficient durability in alkaline media problematically impedes their large-scale industrial applications. Therefore, low-cost alternative ORR electrocatalysts with high activity and stability are needed to overcome the bottleneck in fuel cells. Among the candidates of non-precious metal alkaline ORR electrocatalysts, multimetallic oxides with a spinel structure are considered to be a promising class due to their abundance and low cost, and have provided catalytic performances for the ORR in alkaline media. Recent studies on the catalytic performance of noble-metal-based nanocrystals, transition metal oxides, and perovskites have demonstrated the dominance of surface structures in determining the reaction kinetics and thus affecting the intrinsic catalytic activity. This provides valuable clues in deliberately and precisely designing spinel oxides with exclusive facets so that the collective electrocatalytic performance can be attributed to a single type of atomic arrangement on the exclusive surfaces. As such, a systematic synthesis of spinel oxides with well-controlled crystal facet and size would be particularly beneficial for evaluating promising candidates of catalysts. Despite tremendous efforts, establishing the correlation between the ORR electrocatalytic activity of spinel oxides and parameters such as particle size, morphology, composition, and surface structures, remains a formidable challenge.

Traditionally, it requires elevated temperature and prolonged time to synthesize spinel oxides via solid-state approaches involving annealing the mixtures of the corresponding metal oxides, nitrates, or carbonates. The resultant spinel oxides through this approach often problematically possess irregular morphologies and large particle sizes with a broad size distribution, seriously impeding their catalytic properties. Although substantial efforts have been dedicated to the development of alternative mild solution-based strategies such as hydro/solvothermal method, sol-gel route, and carbonate co-precipitation, it is highly challenging but desirable to synthesize ultra-small, monodisperse, crystallographic facet-tailored, and high-efficient spinel oxides electrocatalysts for the ORR in alkaline media.

Prior art of interest included U.S. Patent Publication No. 20150148216 entitled Spinel Compositions and Applications thereof (herein incorporated entirely by reference). However, these spinel compositions lack features of the spinels of the present disclosure.

There is a continuous need for electrocatalysts for the ORR in alkaline media, and methods of making and tuning such electrocatalysts.

SUMMARY

Embodiments of the present disclosure provide methods of making ultra-small, monodisperse, crystallographic facet-tailored, and highly efficient spinel oxides suitable for use as electrocatalysts. For example, in embodiments, the present disclosure includes a facile, one-pot, colloidal method to synthesize uniform spinel nano-octahedra structures with exclusively exposed {101} facets. In embodiments spinel nano-octahedra structures of the present disclosure exhibit excellent electrocatalytic activity and stability towards ORR in alkaline media.

In some embodiments, the present disclosure includes a method of making a nano-octahedra electrocatalyst material, including: heating a reaction system including a precursor material, manganese(II) acetate tetrahydrate, oleylamine, a fatty acid, and an organic solvent; and introducing an aqueous medium to the reaction system under conditions suitable for forming one or more spinels including an octahedral morphology including eight exclusively exposed {101} facets, wherein the precursor material is selected from the group consisting of cobalt(II) chloride hexahydrate, copper(II) chloride dihydrate, $ZnCl_2$, $MgSO_4$, $NiCl_2$, and combinations thereof.

In some embodiments, the present disclosure includes a method of making $CoMn_2O_4$ nano-octahedra electrocatalyst material, including: heating a reaction solution including cobalt(II) chloride hexahydrate precursor material, manganese(II) acetate tetrahydrate, oleylamine, a fatty acid, and an organic solvent; and introducing an aqueous medium to the reaction solution under conditions suitable for forming one or more $CoMn_2O_4$ spinels including an octahedral morphology including eight exclusively exposed {101} facets.

In some embodiments, the present disclosure includes a method of making $CuMn_2O_4$ nano-octahedra electrocatalyst material, including: heating a reaction solution including copper(II) chloride dihydrate precursor material, manganese (II) acetate tetrahydrate, oleylamine, a fatty acid and an organic solvent; and introducing an aqueous medium into the reaction solution under conditions suitable for forming one or more $CoMn_2O_4$ spinels including an octahedral morphology including eight exclusively exposed {101} facets.

In embodiments, the present disclosure includes a fuel cell catalyst, including: one or more substantially monodisperse $CoMn_2O_4$, $CuMn_2O_4$, $ZnMn_2O_4$, $MgMn_2O_4$, or $NiMn_2O_4$ nanocrystals, wherein the one or more substantially monodisperse $CoMn_2O_4$, $CuMn_2O_4$, $ZnMn_2O_4$, $MgMn_2O_4$, or $NiMn_2O_4$ nanocrystals are characterized as {101} facet terminated nano-octahedra spinel nanocrystals.

In some embodiments, the present disclosure includes a cathode for an alkaline fuel cell, including: a fuel cell catalyst embodiment of the present disclosure. In embodiments, the catalyst is disposed directly atop the cathode, and forms a coating thereon. In embodiments, the coating is characterized as a continuous coating atop and around the electrode. In embodiments, the present disclosure includes an alkaline fuel cell, including: a cathode embodiment of the present disclosure, such as a cathode including the catalyst of the present disclosure.

As more fully discussed herein below, the presently claimed spinel nano-octahedra catalysts exhibit enhanced electrocatalytic activity toward ORR in alkaline media, yielding a high mass activity (MA) and greater durability. It is foreseeable that the strategy used in the presently claimed synthesis could be extended to other spinel oxides with well-defined structures as non-precious metal ORR electrocatalysts.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIGS. 1C and 1D depict HAADF-STEM images of a representative, as-prepared $CoMn_2O_4$ nano-octahedron. FIGS. 1E, 1F, 1H and 1I depict elemental electron energy loss spectroscopy (EELS) maps of an individual $CoMn_2O_4$ nano-octahedron shown in FIG. 1D. FIG. 1G depicts normalized EELS line scans along the dashed path shown in FIG. 1E. The inset in FIG. 1B displays the 3D model of the octahedral nanocrystal corresponding to the scanning transmission electron microscopy (STEM) image.

FIG. 2A depicts XRD patterns of carbon-supported $CoMn_2O_4$ nano-octahedra before and after annealing. FIGS. 2B-2D depict X-ray photoelectron spectroscopy (XPS) spectra of Mn 2p (FIG. 2B), Co 2p (FIG. 2C) and O 1s (FIG. 2D) for carbon-supported $CoMn_2O_4$ nano-octahedra after annealing. Relative ratios of element states: $Mn^{2+}/Mn^{3+}/Mn^{4+}$=15/78/7; $Co^{2+}/Co^{3+}$=71:29.

FIG. 3A depicts ORR polarization profiles of $CoMn_2O_4$ nano-octahedra, $CoMn_2O_4$ nanospheres and Pt/C, in $O_2$-saturated 1 M KOH at a scan rate of 5 mV/s at 1,600 rpm. FIG. 3B depicts mass activities of $CoMn_2O_4$ nano-octahedra and $CoMn_2O_4$ nanospheres at 0.85 V vs. reversible hydrogen electrode (RHE), which was calculated by normalizing the kinetic current to the mass loading of metal oxide. FIG. 3C depicts $CoMn_2O_4$ nano-octahedra in $O_2$-saturated 1 M KOH at a scan rate of 5 mV/s at the different rotation rates indicated. FIG. 3D depicts corresponding Koutecky-Levich plots ($J^{-1}$ vs. $\omega^{-1/2}$) at different potentials. The electron transfer number (n) was calculated to be ~3.9 at 0.85 V based on the slopes of Koutecky-Levich plots. Spinel samples were annealed in air at 300° C. for 12 h before these measurements.

FIG. 4A depicts the ORR polarization profile of $CoMn_2O_4$ nano-octahedra (annealed in air at 300° C. for 12 h) and FIG. 4B depicts the ORR polarization profile of Pt/C before and after the accelerated durability tests in $O_2$-saturated 1 M KOH at a scan rate of 100 mV/s from 0.6 to 1.0 V vs. RHE.

FIG. 5B summarizes the mass activities of both types of catalysts towards ORR.

FIG. 6B depicts a nano-octahedra of the present disclosure including exclusive {101} facets. FIG. 6B further depicts the electrochemistry at the cathode in an alkaline fuel cell in accordance with the present disclosure.

FIG. 8A depicts low-magnification TEM image of the as-prepared $CoMn_2O_4$ nano-octahedra. FIG. 8B depicts size distribution histogram of the $CoMn_2O_4$ nano-octahedra. FIG. 8C depicts high-resolution TEM (HRTEM) image of a representative $CoMn_2O_4$ nano-octahedron. FIG. 8D depicts selected area electron diffraction (SAED) pattern of the $CoMn_2O_4$ nano-octahedra. The inset in (FIG. 8A) displays the 3D model of the octahedral nanocrystals corresponding to the TEM image.

FIG. 9A depicts low-magnification TEM image of the as-prepared $CoMn_2O_4$ nanospheres. FIG. 9B depicts a size distribution histogram of the $CoMn_2O_4$ nanospheres. FIGS. 9C-9D depict HRTEM images of a representative $CoMn_2O_4$ nanosphere. The inset in (FIG. 9A) displays the 3D model of the spherical nanocrystals corresponding to the TEM image.

FIG. 10A depicts as-synthesized $CoMn_2O_4$ nano-octahedra. FIG. 10B depicts $CoMn_2O_4$ nano-octahedra annealed in air at 300° C. for 12 h. The cell parameters a and c in a standard JCPDS card (No. 77-0471) are 5.784 Å and 9.091 Å, respectively.

(FIG. 12B) $Co(acac)_2$ was replaced with $CoBr_2$; (FIG. 12C) half amount of water was added into the reaction system.

FIG. 15A depicts low-magnification and FIG. 15B depicts high-magnification HAADF-STEM images of the carbon-supported $CoMn_2O_4$ nano-octahedra after the accelerated durability test. FIG. 15C depicts an HRTEM image of a representative carbon-supported $CoMn_2O_4$ nano-octahedron after the accelerated durability test. FIG. 15D depicts a STEM image and (FIGS. 15E and 15F) the corresponding energy-dispersive X-ray spectroscopy (EDX) elemental mappings of a representative carbon-supported $CoMn_2O_4$ nano-octahedron after the accelerated durability test.

FIG. 18A depicts low-magnification TEM and (FIG. 18B) HAADF-STEM images of the as-prepared $CuMn_2O_4$ nano-octahedra. (FIGS. 18C and 18D) HRTEM images of a representative $CuMn_2O_4$ nano-octahedron. (FIG. 18E) STEM image, elemental mappings and the corresponding normalized EDX line scan of a representative $CuMn_2O_4$ nano-octahedron. (FIG. 18F) STEM-EDX spectrum of the $CuMn_2O_4$ nano-octahedron. The inset in (FIG. 18A) displays the 3D model of the octahedral nanocrystals corresponding to the TEM image. The inset in (FIG. 18F) shows the atomic percentage of the Mn and Cu elements in $CuMn_2O_4$ nano-octahedron.

FIG. 19A depicts XRD patterns of carbon-supported $CuMn_2O_4$ nano-octahedra and nanospheres after annealing in air at 300° C. for 12 h. (FIGS. 19B-19D) XPS spectra of Mn 2p (FIG. 19B), Cu 2p (FIG. 19C) and O 1s (FIG. 19D) for carbon-supported $CuMn_2O_4$ nano-octahedra and nanospheres after annealing in air at 300° C. for 12 h. Relative ratios of element states: for nano-octahedra, $Mn^{2+}/Mn^{3+}/Mn^{4+}$=8:76:16; $Cu^{2+}/Cu^{+}$=100:0; for nanospheres, $Mn^{2+}/Mn^{3+}/Mn^{4+}$=14:58:28; $Cu^{2+}/Cu^{+}$=93:7.

FIG. 20A depicts ORR polarization curves of $CuMn_2O_4$ nano-octahedra/C, $CuMn_2O_4$ nanospheres/C and the commercial Pt/C, in $O_2$-saturated 1 M KOH at a scan rate of 5 mV/s at 1,600 rpm. Mass loading of $CuMn_2O_4$ and Pt: 100 μg/cm$^2$ and 20 μg/cm$^2$, respectively. (FIG. 20B) Mass activities of $CuMn_2O_4$ nano-octahedra/C and $CuMn_2O_4$ nanospheres/C at 0.85 V vs. RHE, which was calculated by normalizing the kinetic current to the mass loading of metal oxide on the electrode. (FIG. 20C) The Koutecky-Levich plots ($J^{-1}$ vs. $\omega^{-1/2}$) of $CuMn_2O_4$ nano-octahedra/C and $CuMn_2O_4$ nanospheres/C derived from the rotating disk electrode (RDE) voltammograms at 0.85 V. (FIG. 20D) Mass activities of $CuMn_2O_4$ nano-octahedra/C and $CuMn_2O_4$ nanospheres/C before and after the accelerated durability tests in $O_2$-saturated 1 M KOH at 0.85 V vs. RHE. Note that all the current densities in (a) and (c) are based on the electrode geometric area.

FIG. 20A depicts low-magnification TEM image of the as-prepared $CuMn_2O_4$ nanospheres. FIG. 20B depicts size distribution histogram of the $CuMn_2O_4$ nanospheres. FIG. 20C depicts HRTEM image of a representative $CuMn_2O_4$ nanosphere. FIG. 20D depicts STEM-EDX spectrum of the $CuMn_2O_4$ nanospheres. The inset in FIG. 20D shows the atomic percentage of the Mn and Cu elements in $CuMn_2O_4$ nanospheres.

FIG. 24A depicts $CuMn_2O_4$ nano-octahedra/C and FIG. 24B depicts $CuMn_2O_4$ nanospheres/C catalysts in $O_2$-saturated 1 M KOH at a scan rate of 5 mV/s at the different rotation rates indicated, respectively.

FIG. 27A depicts low-magnification and (FIG. 27B) high-magnification HAADF-STEM images of the $CuMn_2O_4$ nano-octahedra/C after the accelerated durability tests. (FIG. 27C) HRTEM image of a representative $CuMn_2O_4$ nano-octahedron/C after the 10,000-cycle accelerated durability tests. (FIG. 27D) STEM image, elemental mappings, and the corresponding normalized EDX line scan of a representative $CuMn_2O_4$ nano-octahedron/C after the accelerated durability test.

DETAILED DESCRIPTION OF THE INVENTION

Figure 1A:
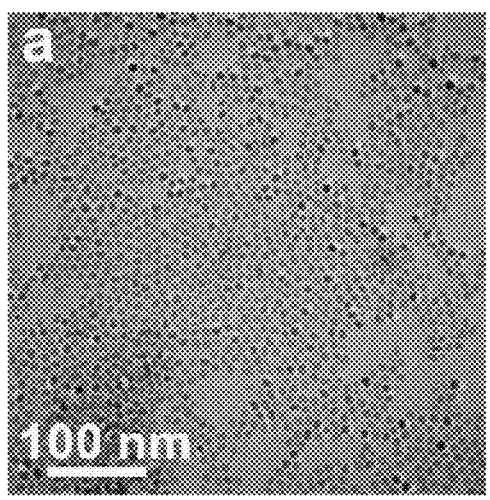
FIGS. 1A to 1I depict (FIG. 1A) low-magnification transmission electron microscopy (TEM) and (FIG. 11B) high-angle annular dark-field scanning transmission electron microscopy (HAADF-STEM) image of the as-prepared $CoMn_2O_4$ nano-octahedra.

The present disclosure is directed towards a fuel cell catalyst, including: one or more monodisperse, or substantially monodisperse $CoMn_2O_4$, $CuMn_2O_4$, $ZnMn_2O_4$, $MgMn_2O_4$, or $NiMn_2O_4$ nanocrystals. In embodiments, the one or more monodisperse, or substantially monodisperse $CoMn_2O_4$, $CuMn_2O_4$, $ZnMn_2O_4$, $MgMn_2O_4$, or $NiMn_2O_4$ nanocrystals are characterized as {101} facet terminated nano-octahedra spinel nanocrystals.

In some embodiments, the present disclosure provides a fuel cell catalyst, including: one or more substantially monodisperse $CoMn_2O_4$ or $CuMn_2O_4$ nanocrystals, wherein the one or more substantially monodisperse $CoMn_2O_4$ or $CuMn_2O_4$ nanocrystals include an octahedral morphology including eight exclusively exposed {101} facets.

In some embodiments, the present disclosure includes a cathode for an alkaline fuel cell, including: a fuel cell catalyst embodiment of the present disclosure. In embodiments, the catalyst is disposed directly atop the cathode, and forms a coating thereon. In embodiments, the coating is characterized as a continuous coating atop and around the electrode. In embodiments, the present disclosure includes an alkaline fuel cell, including: a cathode embodiment of the present disclosure, such as a cathode including the catalyst of the present disclosure.

Advantages of the embodiments of the present disclosure include providing ultra-small, monodisperse, crystallographic facet-tailored, highly efficient spinel oxides electrocatalysts suitable for use in the ORR in alkaline media. Additional advantages include providing low-cost alternative ORR electrocatalysts with high activity and stability which help overcome or alleviate a bottleneck in fuel cell use and production.

Definitions

As used in the present specification, the following words and phrases are generally intended to have the meanings as set forth below, except to the extent that the context in which they are used indicates otherwise.

As used herein, the singular forms "a", "an", and "the" include plural references unless the context clearly dictates otherwise. Thus, for example, references to "a compound" include the use of one or more compound(s). "A step" of a method means at least one step, and it could be one, two, three, four, five or even more method steps.

As used herein the terms "about," "approximately," and the like, when used in connection with a numerical variable, generally refers to the value of the variable and to all values of the variable that are within the experimental error (e.g., within the 95% confidence interval [CI 95%] for the mean) or within ±10% of the indicated value, whichever is greater.

As used herein the term "calcination" or "anneal" refers to a thermal treatment process applied to solid materials, in presence of air, to bring about a thermal decomposition, phase transition, or removal of a volatile fraction at temperatures below the melting point of the solid materials.

As used herein the term "conversion" refers to the chemical alteration of at least one material into one or more other materials.

As used herein the term "catalyst" refers to one or more materials that may be of use in the conversion of one or more other materials.

As used herein the term "spinel structure" refers to the spinel molecule.

As used herein the term "minor component" refers generally to a spinel structure having a presence of one or more elements of copper, nickel, cobalt, iron, manganese, chromium, and combinations thereof. In embodiments, the minor component can be in-phase (doping a crystallographic site) or second-phase (metal not doping the crystallographic sites of the spinel).

As used herein the term "{101}" refers to a set of crystallophic surface planes in accordance with the Miller indices.

In embodiments, the present disclosure relates to spinel compositions and in particular, spinel catalysts. Spinel compositions as disclosed herein are suitable for use in various applications, such as a catalyst to clean emissions, a catalyst to an alkaline fuel cell, and the like. In embodiments, a spinel in accordance with the present disclosure has a general formula of $AB_2O_4$, where A is a transition metal or an alkaline earth metal, and B is a transition metal but not the same transition metal as A, when A is present as a transition metal. In embodiments, A is a transition metal such as cobalt (Co), copper (Cu), nickel (Ni), zinc (Zn), and combinations thereof. In embodiments, A is an alkaline earth metal such as magnesium (Mg). In some embodiments, A is selected from the group consisting of cobalt (Co), copper (Cu), magnesium (Mg), nickel (Ni), zinc (Zn), and combinations thereof. In embodiments, B is manganese (Mn). In embodiments, a spinel is rare-earth metal free.

In embodiments, spinels are a mineral oxide having the general formula of $AB_2O_4$ and may be supported on a plurality of support oxides. In embodiments, the A component is tetrahedrally coordinated with the oxygens and the B component is octahedrally coordinated with the oxygens. Spinels may include a transition metal manganese (Mn), nickel (Ni), cobalt (Co), copper (Cu), zinc (Zn) and an "other metal" (e.g., magnesium (Mg). In embodiments, a spinel composition includes manganese (Mn), nickel (Ni), cobalt (Co), copper (Cu), zinc (Zn) and magnesium (Mg). Non-limiting examples combinations such as Cu—Mn, Co—Mn, Zn—Mn, Mg—Mn, and Ni—Mn.

In embodiments, spinel compositions may include one or more spinels of the present disclosure characterized as monodisperse, or substantially monodisperse. In embodiments, the one or more spinels may be characterized by a monodispersity having a deviation of less than approximately ±1.0 nm. In embodiments, the one or more monodisperse or substantially monodisperse spinels include $CoMn_2O_4$, $CuMn_2O_4$, $ZnMn_2O_4$, $MgMn_2O_4$, or $NiMn_2O_4$ nanocrystals. For examples the monodisperse spinels may include particles of uniform size in a dispersed phase. In embodiments, the uniform size may be characterized as having a longest diameter of 5-10 nm, about 5 nm, about 6 nm, about 7 nm, about 8 nm, about 9 nm, about 10 nm, or 7 nm, 8 nm, 9 nm, or 10 nm. In embodiments, nanocrystals of the present disclosure are characterized as {101} facet terminated nano-octahedra spinel nanocrystals. In embodiments, each {101} facet may be exclusive of other facets so that non-overlapping facets are present. In some embodiments, non-overlapping facets may be at least substantially disjoint with respect to one another.

In embodiments, spinels of the present disclosure may be provided as a fuel cell catalyst, including: one or more substantially monodisperse $CoMn_2O_4$, $CuMn_2O_4$, $ZnMn_2O_4$, $MgMn_2O_4$, or $NiMn_2O_4$ nanocrystals, wherein the one or more substantially monodisperse $CoMn_2O_4$, $CuMn_2O_4$, $ZnMn_2O_4$, $MgMn_2O_4$, or $NiMn_2O_4$ nanocrystals are characterized as {101} facet terminated nano-octahedra spinel nanocrystals. In embodiments, the one or more substantially monodisperse $CoMn_2O_4$, $CuMn_2O_4$, $ZnMn_2O_4$, $MgMn_2O_4$, or $NiMn_2O_4$ nanocrystals reach a maximum ORR mass activity in an alkaline media. In some embodiments, the one or more substantially monodisperse $CoMn_2O_4$, $CuMn_2O_4$, $ZnMn_2O_4$, $MgMn_2O_4$, or $NiMn_2O_4$ nanocrystals include an octahedral morphology including eight exclusively exposed {101} facets. In embodiments, the one or more substantially monodisperse nanocrystals have an average diameter of about 9 nm, and a monodispersity deviation of less than approximately ±1.0 nm.

In some embodiments, the present disclosure includes one or more substantially monodisperse $CoMn_2O_4$ or $CuMn_2O_4$ nanocrystals including an octahedral morphology with eight exclusively exposed {101} facets. In embodiments, the one or more substantially monodisperse $CoMn_2O_4$ or $CuMn_2O_4$ nanocrystals have an average diameter of about 9 nm, and a monodispersity deviation of less than approximately ±1.0 nm. In embodiments, the one or more substantially monodisperse $CoMn_2O_4$ or $CuMn_2O_4$ nanocrystals are characterized as highly-efficient spinel oxide electrocatalysts for ORR in alkaline media. In embodiments, the one or more substantially monodisperse $CoMn_2O_4$ or $CuMn_2O_4$ nanocrystals reach a maximum ORR mass activity in an alkaline media. In embodiments, the one or more substantially monodisperse $CoMn_2O_4$ nanocrystals yield a high mass activity (MA) up to 60.0 A/g at 0.85 V, or the one or more substantially monodisperse $CuMn_2O_4$ nanocrystals yield a high mass activity (MA) up to 37.6 A/g at 0.85 V.

In some embodiments, a spinel of the present disclosure includes a minor component. In an embodiment, a spinel includes a minor component that is a dopant. In some embodiments, a spinel composition can include a spinel as disclosed herein disposed atop or directly atop a substrate. In embodiments, the substrate may be a cathode suitable for use in an alkaline fuel cell. In embodiments, the spinel is an active ingredient disposed upon or within an electrode.

In embodiments, the catalyst or spinel of the present disclosure is disposed directly atop a substrate such as a cathode and forms a coating thereon. In embodiments, the coating is characterized as a continuous coating atop and around the substrate. In some embodiments, the substrate is made of a material suitable for use as a cathode in an alkaline fuel cell. In some embodiments, the substrate may be a refractive material, a ceramic substrate, a honeycomb structure, a metallic substrate, a ceramic foam, a metallic foam, a reticulated foam, or suitable combinations, where the substrate has a plurality of channels and a porosity. Additionally, the number of channels may vary depending upon the substrate used as is known in the art. In embodiments, substrates are either carbon, metallic, or ceramic, and provides a three-dimensional support structure. In embodiments, the support comprises or consists of active carbon.

In embodiments, one or more spinel as described herein are deposited on a substrate material. For example, a carbon cathode material such as (Ketjen Black EC600JD) may be mixed with a sufficient amount of metal oxide material of the present disclosure such as 35-45%, or 40% by weight metal oxide material to produce an electrode such as an electrode suitable for use in an alkaline fuel cell. In embodiments, percent weight includes the percent weight of the total electrode. In embodiments, a spinel of the present disclosure is combined with a carbon component. In embodiments, a carbon component can be impregnated or coated onto a surface of a spinel composition. In yet another embodiment, a substrate may be zone-coated with a spinel in a first region and no spinel in a different spinel-free region. In embodiments, a spinel of the present disclosure is disposed directly atop cathode material suitable for use in an alkaline fuel cell. In embodiments, the coating is a continuous coating in that a uniform layer of spinel catalyst of the present disclosure is disposed all around the substrate. In embodiments, the spinel catalyst is coated atop a substrate at a thickness suitable for coating the substrate.

Figure 7:
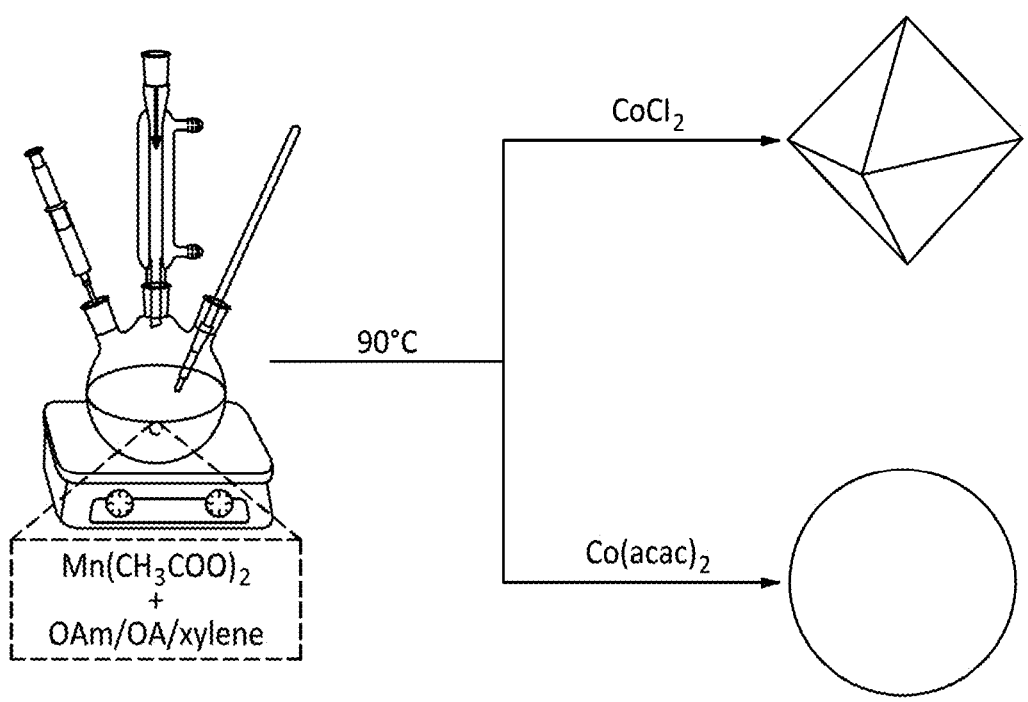
FIG. 7 depicts a schematic illustration of the syntheses of $CoMn_2O_4$ nano-octahedra and nanospheres.

In embodiments, the present disclosure includes a manufacturing process for one or more transition metal oxide nanoparticles. Referring now to FIG. 7, a round bottom flask is shown including various ports suitable for mixing and reacting various precursors and reaction solutions of the present disclosure. In embodiments, the present disclosure includes a manufacturing method of transition metal oxide nanoparticle including manufacturing a first solution or reaction system including a precursor material such as a transition metal ion-offering material, a manganese offering material, oleylamine, a fatty acid surfactant, disposed within an organic solvent. In embodiments, a precursor material is selected from the group consisting of cobalt(II) chloride hexahydrate, copper(II) chloride dihydrate, $ZnCl_2$, $MgSO_4$, $NiCl_2$, and combinations thereof. In embodiments, the organic solvent is characterized as an aromatic organic solvent or a non-polar solvent. In embodiments, the aromatic organic solvent or non-polar solvent is xylene. In embodiments, the provided reaction system is heated to a temperature of about 90 degrees Celsius for a first duration in an air atmosphere. In embodiments, the first duration of about 20 minutes.

In embodiments, the manufacturing process includes introducing or inputting an aqueous medium to the reaction solution under conditions suitable for forming one or more spinels of the present disclosure, including spinels having octahedral morphology and eight exclusively exposed {101} facets. In embodiments, the particles of the present disclosure may be formed by inputting an aqueous solution such as deionized water into the reaction system. In embodiments, introducing the aqueous solution may be performed at a temperature of 70 degrees Celsius to 95 degrees Celsius.

In embodiments, the transition metal oxide nanoparticle may be formed at a predetermined temperature performed during 1 min to 24 hr after inputting the aqueous solution and a shape of the manufactured transition metal oxide nanoparticle may be controlled by adjusting a ratio of the transition metal ion-offering material and the fatty acid surfactant, and the ratio may be, for example, in the range of 1:1 to 1:6. In embodiments, the lower the ratio the fatty acid surfactant, the smaller the size of transition metal oxide nanoparticle may be, and the more monodisperse the octahedral structures will be.

In embodiments, the present disclosure includes a method of making a nano-octahedra electrocatalyst material, including: heating a reaction system including a precursor material, manganese(II) acetate tetrahydrate, oleylamine, a fatty acid, and an organic solvent; and introducing an aqueous medium to the reaction system under conditions suitable for forming one or more spinels including an octahedral morphology comprising eight exclusively exposed {101} facets, wherein the precursor material is selected from the group consisting of cobalt(II) chloride hexahydrate, copper(II) chloride dihydrate, $ZnCl_2$, $MgSO_4$, $NiCl_2$, and combinations thereof. In embodiments, the nano-octahedra electrocatalyst material is characterized as having one or more characteristics including: an octahedral morphology, an ultra-small size, a monodispersity having a deviation of less than 25 nm, less than 10 nm, less than 5 nm, less than 2 nm, or less than 1 nm, a crystallographic facet-tailored structure, a high-efficient spinel oxide electrocatalysts suitable towards ORR in alkaline media, and combinations thereof. In embodiments, about 95% of the particles are within a deviation of about 5% of the total particles. In embodiments, the nano-octahedra electrocatalyst material is characterized as stable.

In embodiments, the present disclosure includes a method of making $CoMn_2O_4$ nano-octahedra electrocatalyst material, including: heating a reaction solution including a cobalt (II) chloride hexahydrate precursor material, manganese(II) acetate tetrahydrate, oleylamine, a fatty acid, and an organic solvent; and introducing an aqueous medium to the reaction solution under conditions suitable for forming one or more $CoMn_2O_4$ spinels including an octahedral morphology including eight exclusively exposed {101} facets. In embodiments, the organic solvent is characterized as an aromatic organic solvent or a non-polar solvent. In embodiments, the aromatic organic solvent or non-polar solvent is xylene. In embodiments, the heating is to a temperature of about 90 degrees Celsius for a first duration in an air atmosphere. In embodiments, the first duration of about 20 minutes. In embodiments, the aqueous medium is deionized water. In embodiments, the fatty acid is oleic acid. In embodiments, the manganese (II) acetate tetrahydrate is characterized by the formula $Mn(OAc)_2 \cdot 4H_2O$. In embodiments, the $CoMn_2O_4$ spinels are characterized as having one or more characteristics including: an octahedral morphology, an ultra-small size, a monodispersity having a deviation of less than approximately ±0.6 nm, a crystallographic facet-tailored structure, a high-efficient spinel oxide electrocatalysts suitable toward ORR in alkaline media, and combinations thereof. In embodiments, the $CoMn_2O_4$ spinels include an octahedral morphology and an average diameter of about 9 nm. In embodiments, the $CoMn_2O_4$ spinels are characterized by enhanced electrocatalytic activity toward ORR in alkaline media while yielding a high mass activity (MA) up to 60.0 A/g at 0.85 V. In embodiments, the method further includes annealing the $CoMn_2O_4$ nano-octahedra electrocatalyst material under conditions sufficient to improve a low crystallinity or ionic deficiency. In embodiments, the annealing includes heating the $CoMn_2O_4$ nano-octahedra electrocatalyst material in air at 300° C. for 12 h. In embodiments, a volume ratio of oleylamine to fatty acid in is preselected to tune the morphology of the final product.

In some embodiments, a method of making $CuMn_2O_4$ nano-octahedra electrocatalyst material, including: heating a reaction solution including copper(II) chloride dihydrate precursor material, manganese(II) acetate tetrahydrate, oleylamine, a fatty acid and an organic solvent; and introducing an aqueous medium into the reaction solution under conditions suitable for forming one or more $CoMn_2O_4$ or $CuMn_2O_4$ spinels including an octahedral morphology including eight exclusively exposed {101} facets. In embodiments, the organic solvent is characterized as an aromatic organic solvent, or a non-polar solvent. In embodiments, the aromatic organic solvent is xylene. In embodiments, the heating is to a temperature of about 90 degrees Celsius for a first duration in an air atmosphere. In embodiments, the first duration of about 20 minutes. In embodiments, the aqueous medium is deionized water. In embodiments, the fatty acid is oleic acid. In embodiments, the manganese(II) acetate tetrahydrate is characterized as $Mn(OAc)_2·4H_2O$. In embodiments, the $CuMn_2O_4$ spinels are characterized as having one or more characteristics including: an octahedral morphology, an ultra-small size, a monodispersity having a deviation of less than approximately ±1.0 nm, a crystallographic facet-tailored structure, a high-efficient spinel oxide electrocatalysts suitable towards ORR in alkaline media, and combinations thereof. In embodiments, the $CuMn_2O_4$ spinels comprise an octahedral morphology and an average diameter of about 9 nm. In embodiments, the $CuMn_2O_4$ spinels are characterized by enhanced electrocatalytic activity towards ORR in alkaline media and yield a high mass activity (MA) up to 37.6 A/g at 0.85 V.

Figures 6A, 6B:
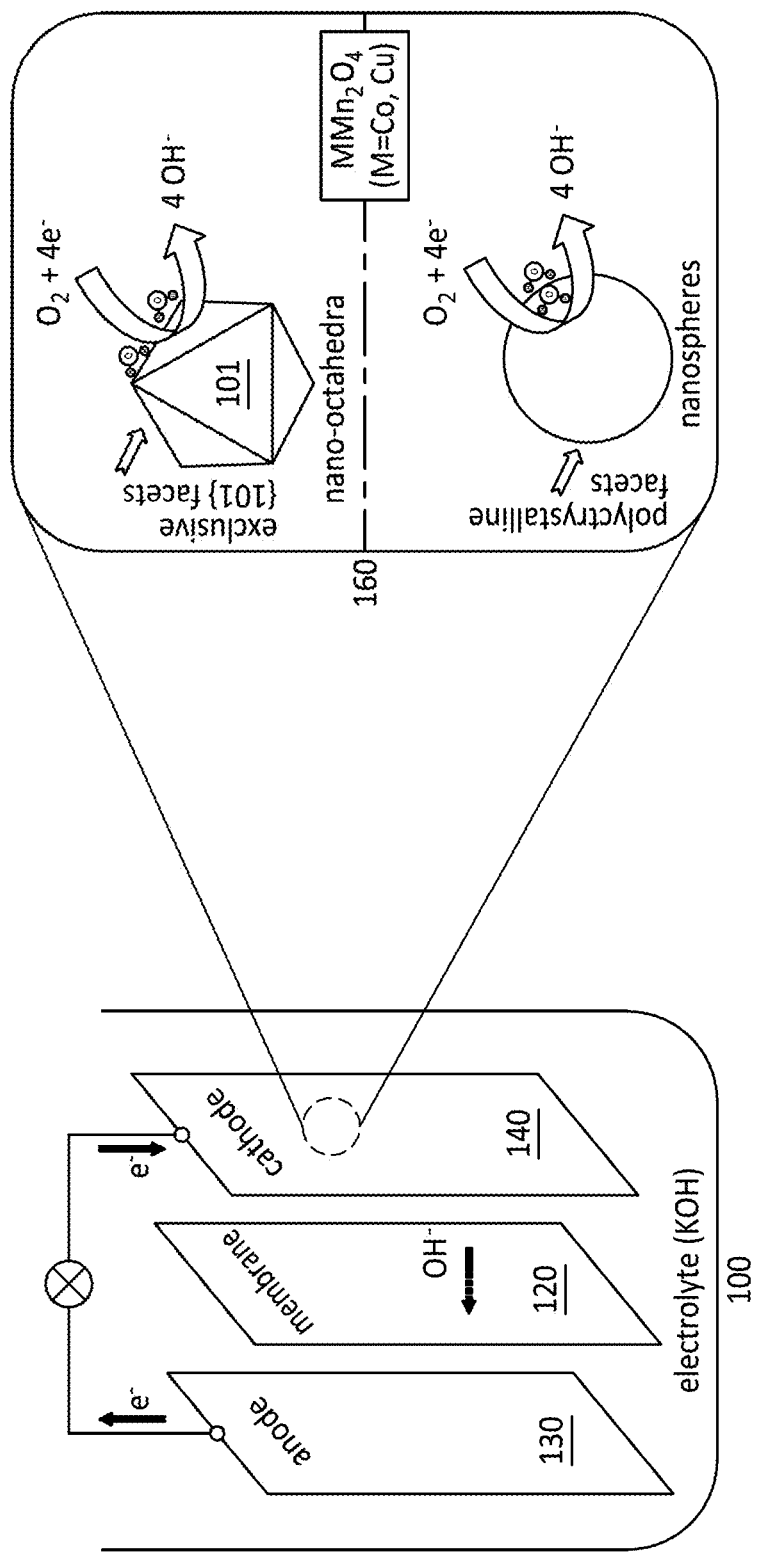
FIGS. 6A and 6B depict a schematic illustration of a cathode of the present disclosure disposed within a fuel cell of the present disclosure.

Referring now to FIGS. 6A and 6B a schematic view of a fuel cell system including a catalyst according to an embodiment of the present disclosure is shown. Here, a fuel cell system 100 includes an electrolyte membrane 120, a first electrode (an anode) 130, and a second electrode (a cathode) 140. In addition, the fuel cell system 100 may include a cover portion (not shown) having inlets/outlets, and in which the first electrode 130 and the second electrode 140 in addition to the electrolyte membrane 120 are disposed.

In embodiments, the fuel cell system 100 according to an embodiment may be an alkaline fuel cell (AFC), but is not limited thereto. In embodiments, the first electrode 130 and the second electrode 140 in addition to the electrolyte membrane 120 may form a single unit cell, and a plurality of unit cells may be stacked to form a fuel cell.

In embodiments, within fuel cell system 100, an electrochemical reaction may be carried out in as illustrated in FIG. 6B. In embodiments, an anion may be generated by a reduction reaction of oxygen in the second electrode 140. In this case, since an electron is generated in the first electrode 130 and the electron is consumed in the second electrode 140, when two electrodes are connected to each other, electricity may flow therein.

In embodiments the first electrode 130 and the second electrode 140 may be include a conductive material. In embodiments, at least one side of the second electrode 140 may be coated with transition metal oxide or nanostructure of the present disclosure including an exemplary embodiment as ORR catalyst of the present disclosure.

In embodiments, the electrolyte membrane 120 may have the form of a proton conducting polymer membrane, and may allow a side of the first electrode 130 and a side of the second electrode 140 to be separated from each other and may allow a proton to flow therebetween, at the same time. The proton conducting polymer membrane may be, for example, NAFION® brand membrane. In embodiments, the electrolyte membrane 120 is disposed within an electrolyte such as an alkaline electrolyte solution e.g., KOH electrolyte solution suitable for use in an alkaline fuel cell.

In the fuel cell system 100, an oxidation reaction and a reduction reaction are carried out at anode and cathode at certain rates, respectively, and the ORR catalyst 160 according to an exemplary embodiment may be used to accelerate the ORR rate at the cathode.

Figure 5A:
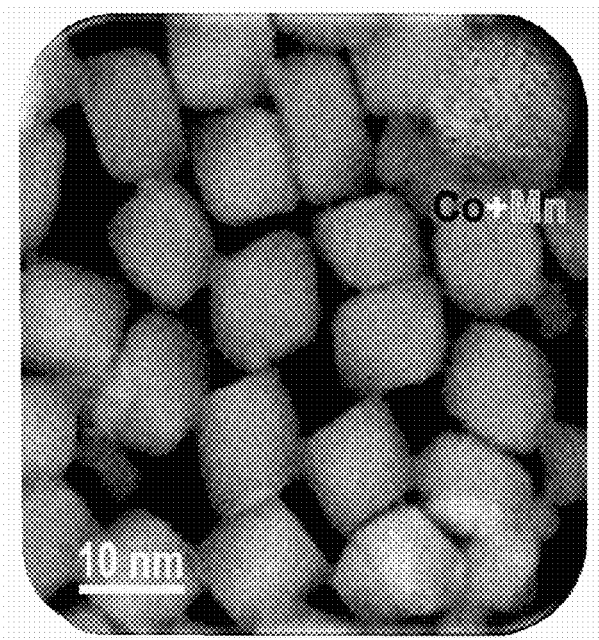
FIGS. 5A and 5B depict an image (FIG. 5A) of catalyst material of the present disclosure and a graph (FIG. 5B) relating to mass activity towards the ORR (i MA) measured at 0.85 V for $CoMn_2O_4$ nano-octahedra and $CoMn_2O_4$ nanospheres of the present disclosure.
Figure 5B:
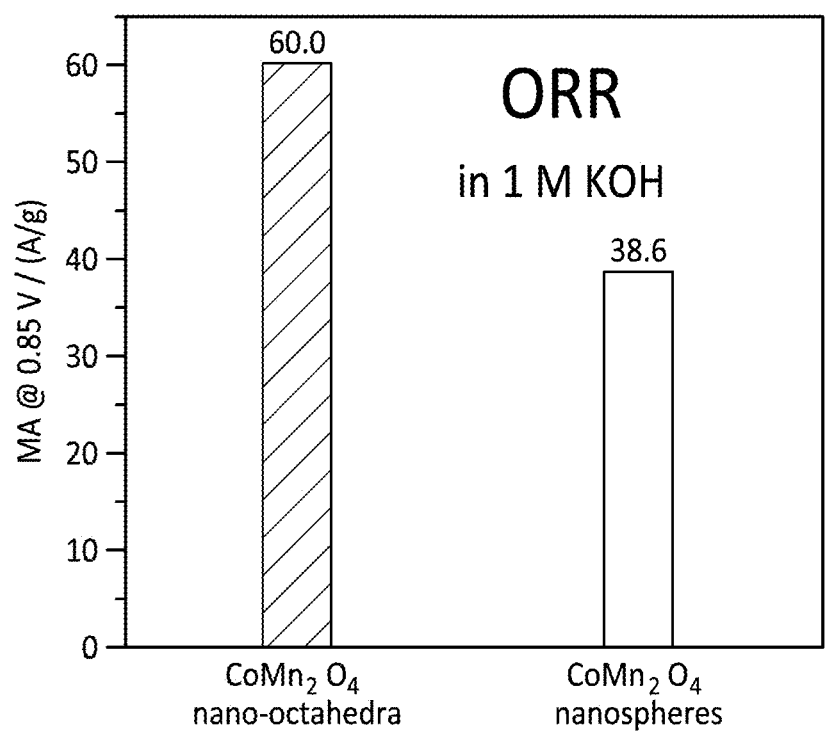

Referring now to FIG. 5A and FIG. 6B, spinel nano-octahedra of the present disclosure with the exclusively exposed {101} facets are shown. FIG. 6B also shows spinel nano-octahedra of the present disclosure with the exclusively exposed {101} facets at 160. In embodiments, and as shown in FIG. 5B, the spinel nano-octahedra of the present disclosure exhibit superior electrocatalytic activity and stability toward ORR in alkaline media when compared with the counterpart ($CoMn_2O_4$ nanospheres).

EXAMPLES

Example 1: Colloidal Synthesis of $CoMn_2O_4$ Spinel Nano-Octahedra and their Enhanced ORR Performance in Alkaline Media The development of mixed transition metal spinel electrocatalysts with well-defined shape and size offers a viable strategy for replacing precious metal catalysts while maintaining the high electrocatalytic performance for ORR in alkaline media. Unlike the conventional solid-state and hydrothermal methods with limited control over the shape and size, here embodiments provide for a facile, one-pot, colloidal method to synthesize uniform (such as about 9 nm) $CoMn_2O_4$ spinel nano-octahedra with the exclusively exposed {101} planes. By tuning the types of Co precursors involved, or providing preselected precursors, the ratio of oleylamine to oleic acid, and the fraction of water, uniform octahedral and spherical nanocrystals in an average size of <10 nm can be harvested, respectively. The resultant $CoMn_2O_4$ spinel nano-octahedra exhibit enhanced electrocatalytic activity toward ORR in alkaline media, yielding a high mass activity (MA) up to 60.0 A/g at 0.85 V, which is superior to that of the $CoMn_2O_4$ spinel nanospheres (38.6 A/g). After 10,000 cycles of durability tests, the nano-octahedra still retain a MA of 47.2 A/g, which is higher than that of the pristine $CoMn_2O_4$ spinel nanospheres. It is foreseeable that the strategy used in this synthesis could be extended to other spinel oxides with well-defined structures as non-precious metal ORR electrocatalysts, benefiting from the exclusively exposing crystal planes as active catalyst surfaces.

Chemicals, such as, cobalt(II) chloride hexahydrate ($CoCl_2 \cdot 6H_2O$, 98%), manganese(II) acetate tetrahydrate ($Mn(OAc)_2 \cdot 4H_2O$, 98%), cobalt acetylacetonate ($Co(acac)_2$, ≥97%), oleylamine (70%), oleic acid (90%), xylenes (≥98%), hexane (≥98.5%), ethanol (99.9%), chloroform (AR), potassium hydroxide (KOH, ≥99.95%), 5% Nafion and isopropanol (anhydrous, 99.5%) were purchased from Sigma-Aldrich and used as received without further purification. Ketjen Black EC600JD was provided by Lion Specialty Chemicals Co., Ltd (JP). Deionized (DI) water with a resistivity of 18.2 MΩ·cm was obtained from a Purelab Flex3 water purification system (ELGA, UK).

Colloidal Synthesis of $CoMn_2O_4$ Spinel Nano-Octahedra and Nanospheres:

$CoMn_2O_4$ spinel nano-octahedra were prepared using a one-pot approach. In a standard synthesis, 20.0 mg of $CoCl_2 \cdot 6H_2O$, 40.0 mg of $Mn(OAc)_2 \cdot 4H_2O$, 2.6 mL of oleylamine, 1.3 mL of oleic acid and 6.0 mL of xylene were combined in a 100 ml three-neck flask in an air atmosphere. The as-prepared mixture was sonicated for 5 min at room temperature to help dissolve all the solids completely, and then heated to 90° C. at 5° C./min under vigorous magnetic stirring. After 20 min, 1.0 mL of DI water was rapidly injected into the aforementioned mixture with a syringe, accompanying a rapid color change in the solution from brown to dark violet. Subsequently, the resultant solution was aged at 90° C. for 24 h, followed by natural cooling down to room temperature. Finally, the products were precipitated using 5.0 ml of hexane and 15.0 ml of ethanol and centrifugation at 9,000 rpm for 10 min. They were further washed twice using a mixture of hexane and ethanol (v:v=1:2) followed by centrifugation at 9,000 rpm for 10 min. The final product was re-dispersed in 5.0 ml of hexane for future use.

For the synthesis of $CoMn_2O_4$ spinel nanospheres, the protocol was essentially the same as the procedure used for the standard synthesis of $CoMn_2O_4$ spinel nano-octahedra, except for the addition of 29.9 mg of $Co(acac)_2$ instead of $CoCl_2 \cdot 6H_2O$.

Characterizations, such as, X-ray diffraction (XRD) patterns were collected at a scan rate of 2° $min^{-1}$ at 0.02° steps from 25 to 75° on a Rigaku Ultima IV Diffractometer. Pawley fitting was carried out using Topas (version 3) software package (1999-2000 Bruker AXS). XPS spectra were acquired on a PHI 5000 Versaprobe scanning ESCA system from Physical Electronics, Inc. Monochromatic Al Kα X-rays of 1486.6 eV were employed with the spot size of 200 μm at 50 W. Pass energies of 117 eV and 23.5 eV were used to collect survey and region scans respectively. Data were acquired at the takeoff angle of 45°. TEM and HRTEM images were taken using JEOL JEM-2100F (Japan) operated at 200 kV. The samples for TEM and HRTEM characterizations were prepared by drop-casting the nanocrystal dispersions in hexane on amorphous carbon-coated Cu grids and drying under ambient conditions. STEM images and EELS maps were taken on a fifth-order aberration-corrected STEM (Cornell Nion UltraSTEM) operated at 100 kV with a sub-Angstrom spatial resolution. EDX analysis together with partial STEM images was performed in STEM mode using an aberration-corrected JEOL 2200FS electron microscope equipped with a Bruker-AXS SDD detector and an FEI Talos 200X. The metal contents were measured using inductively coupled plasma-optical emission spectroscopy (ICP-OES, Optima 7000 DV).

Preparation of the working electrodes follows: The as-synthesized $CoMn_2O_4$ spinel nano-octahedra or nanospheres were loaded onto carbon support (Ketjen Black EC600JD) with a metal oxide content of 40%. Briefly, 5.0 mg of the $CoMn_2O_4$ spinel nanocrystals and 7.5 mg of Ketjen Black were mixed in 6.0 mL of ethanol under continuous ultrasonication for 2 h, and collected by centrifugation at 9,000 rpm for 10 min. The carbon-supported $CoMn_2O_4$ spinel nanocrystals were then washed with 0.1 M KOH in ethanol solution and collected by centrifugation at 9,000 rpm for 10 min three times. The KOH-treated sample was further annealed in air at 300° C. for 12 h to help remove the surfactants adsorbed on the surface of the nanocrystals. Subsequently, 5.0 mg of the catalyst were redispersed in a mixture of 0.6 mL of DI water, 0.4 mL of isopropanol, and 10.0 μL of 5% Nafion under ultrasonication for 1 h. Finally, 10.0 μL of the suspension was placed on a pre-cleaned glassy carbon RDE from Pine Research Instrumentation (0.196 $cm^2$ in geometric area) and dried under ambient conditions at room temperature. Similarly, the Pt/C catalyst containing 20 wt % Pt supported on Vulcan XC-72R (from the Fuel Cells Store) was used as a benchmark for comparison. The Pt/C catalyst ink was produced by dispersing 2.0 mg of the Pt/C catalyst in a mixture containing 1.0 mL of isopropanol, 1.0 mL of DI water, and 20.0 μL of 5% Nafion under ultrasonication for about 1 h. Then, 5.0 μL of the Pt/C catalyst ink was loaded on a pre-cleaned glassy carbon RDE, and dried under ambient conditions at room temperature.

All electrochemical measurements were carried out in a three-electrode cell using an electrochemical workstation (Gamry, 1000E) at room temperature. A glassy carbon electrode (GCE) with a diameter of 5 mm coated with catalysts was used as the working electrode. A Ag/AgCl in saturated KCl solution and a graphite rod were used as the reference and counter electrodes, respectively. All potentials were converted to RHE, or $V_{RHE}$, by following the equation: $E(RHE)=E(Ag/AgCl)+1.0258$ (V). Before electrochemical tests, the three-neck electrochemical cell was washed using aqua regia and then rinsed thoroughly using DI water to avoid any potential contamination of precious metal. The working electrodes were initially cycled between 0.1 and 1.42 V at 50 mV $s^{-1}$ in Ar-saturated 1 M KOH for 50 cycles to remove remaining ligands on the catalyst surfaces and yield stable CV profiles. The working electrodes were scanned between 0.38 and 1.09 V at 5 mV $s^{-1}$ and 1,600 rpm in $O_2$-saturated 1 M KOH. It should be pointed out that the capacitive background currents in CV curves, measured in Ar-saturated 1 M KOH solution were subtracted from the raw ORR data. Durability tests were carried out by potential cycling from 0.6 V to 1.0 V at 100 mV $s^{-1}$ for 10,000 cycles. To avoid potential contamination from metal species dissolved in the solution, the ORR profiles after 10,000 cycles were obtained in a fresh $O_2$-saturated 1 M KOH solution. All the aforementioned results were obtained based on the measurements of more than 3 electrodes made of each sample.

Figure 1B:
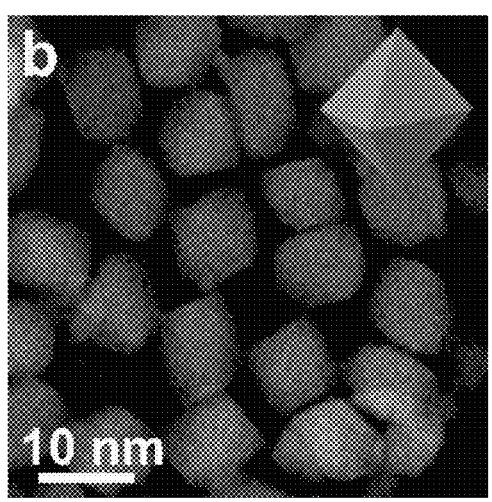
Figure 1C:
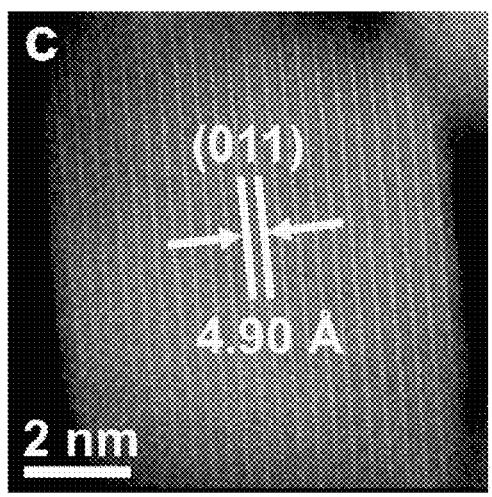
Figure 1D:
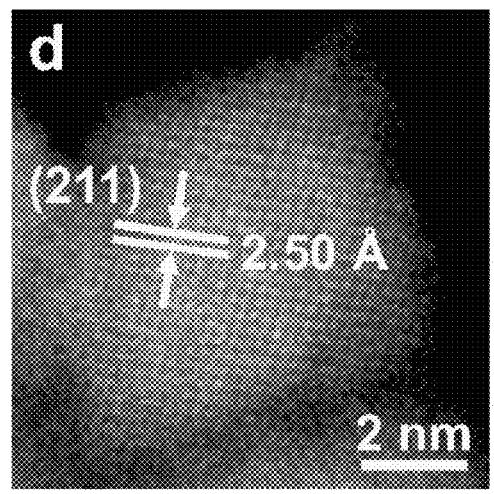
Figure 1E:
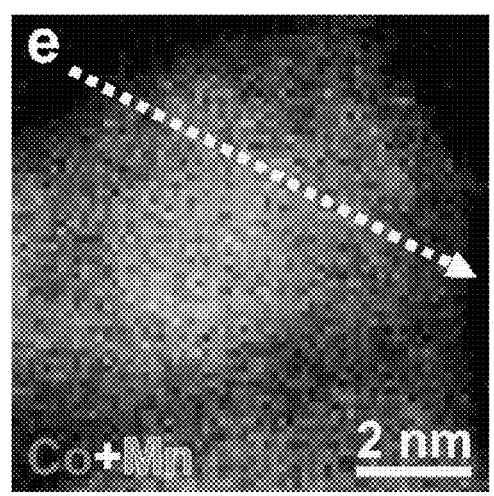
Figure 1F:
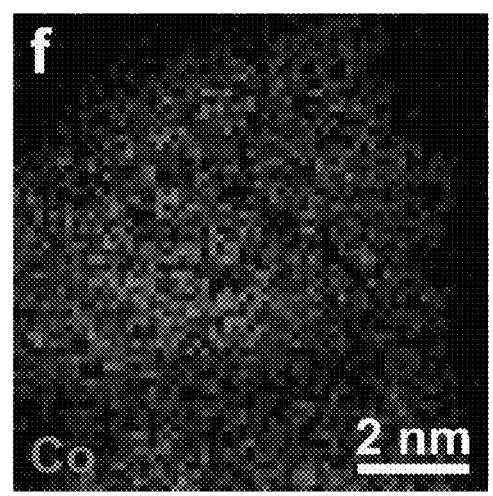
Figure 1G:
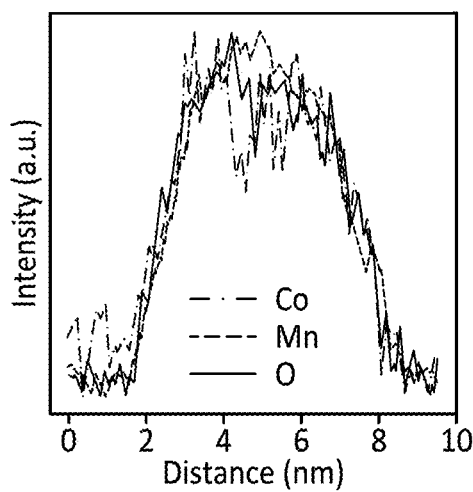
Figure 1H:
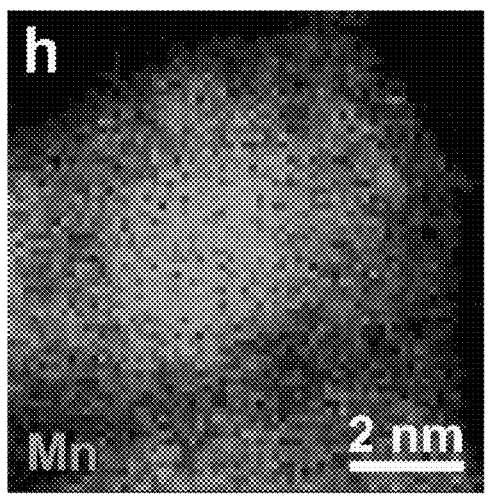
Figure 1I:
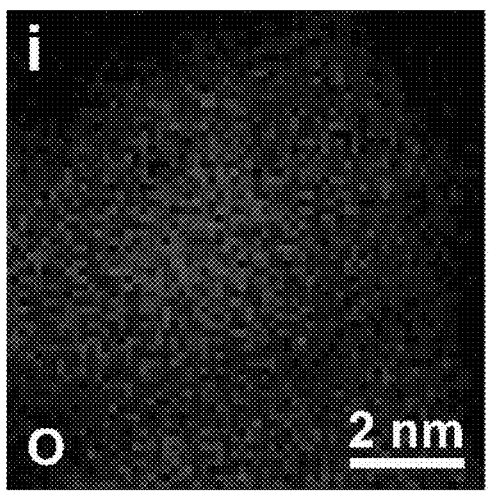
Figure 8A:
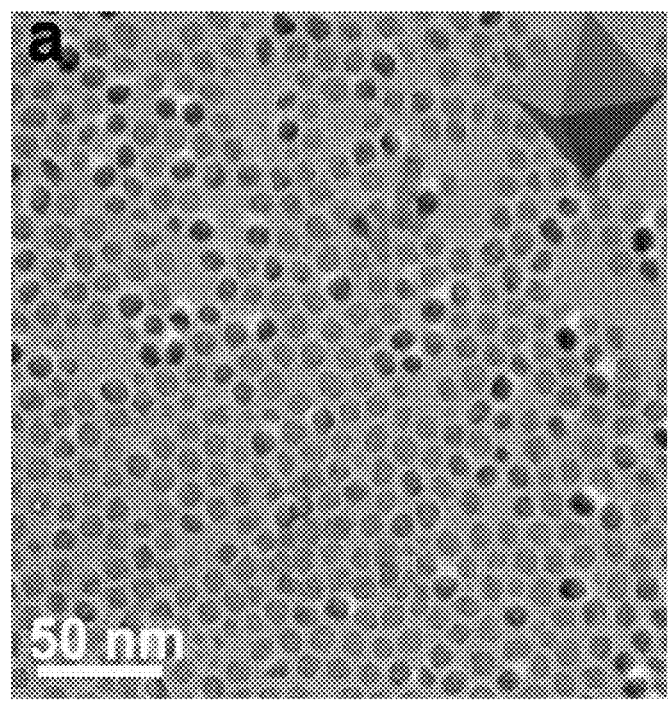
FIGS. 8A-8D depict images and data of the present disclosure.
Figure 8B:
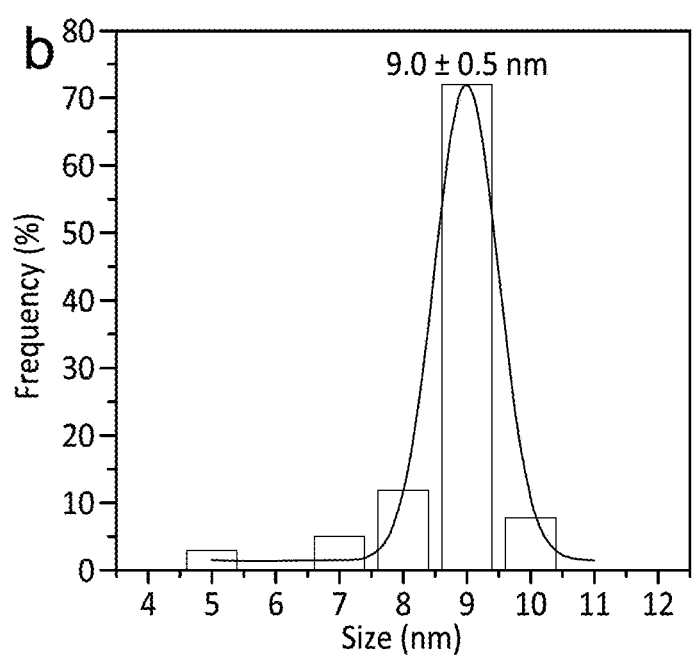
Figure 8C:
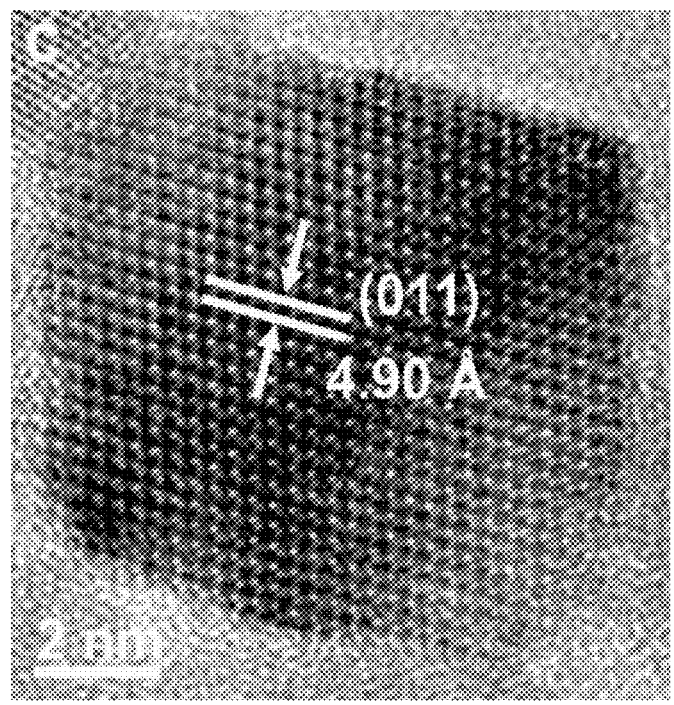
Figure 8D:
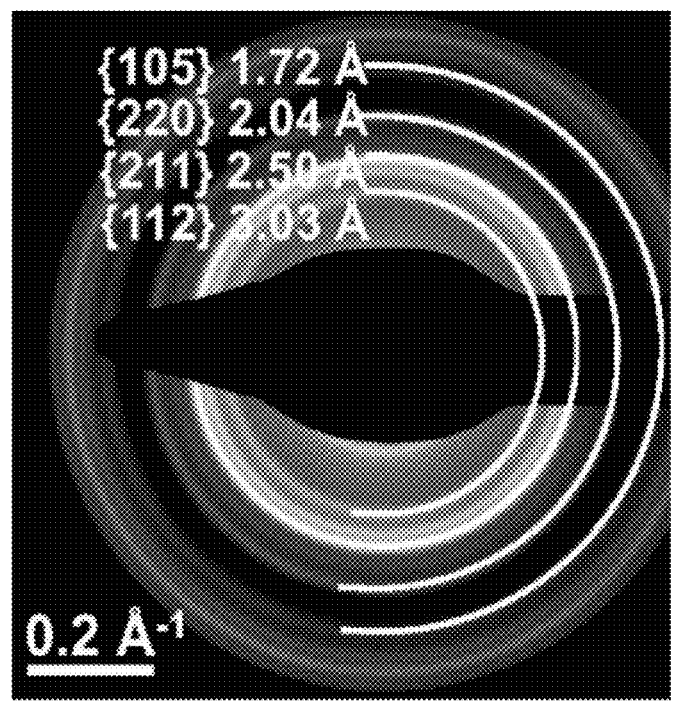

Example 1 was prepared as follows: $CoMn_2O_4$ nano-octahedra and nanospheres could be synthesized with a deliberate control by introducing different types of Co precursors into the reaction solution, while all other experimental parameters, including reaction time, temperature, and the concentrations of precursors, were kept the same. See for example, FIG. 7 depicting the syntheses of $CoMn_2O_4$ nano-octahedra of the present disclosure and nanospheres. The detailed experimental conditions are provided in the Experimental Section above. Especially, the nanocrystals were grown in a well-defined octahedral morphology when $CoCl_2·6H_2O$ was used as the Co precursors. In a typical synthesis, a mixed solution containing $CoCl_2·6H_2O$, $Mn(OAc)_2·4H_2O$, oleylamine, oleic acid and xylene was heated to 90° C. and kept for 20 min in an air atmosphere, followed by injecting deionized water into the above-mentioned reaction solution. Following the injection of water, the color of the solution turned dark brown immediately, implying the quick formation of bimetallic Co—Mn hydroxides as the intermediate species for the sequent conversion into the $CoMn_2O_4$ spinels. As shown by the low-magnification TEM and HAADF-STEM images in FIGS. 1A and 1B, at a synthesis time of 24 h, $CoMn_2O_4$ nanocrystals exhibit a uniformly octahedral morphology enclosed by {101} facets and narrow size distribution with an average edge length of 9.0±0.5 nm (See FIGS. 8A and 8B). HAADF-STEM images of an individual octahedron are shown in FIGS. 1C and 1D, where the lattice spacings were measured to be 4.90 Å and 2.50 Å, respectively, corresponding to the (011) and (211) planes of the $CoMn_2O_4$, as shown in the powder X-ray diffraction (XRD) pattern in FIG. 2A, which is also supported by HRTEM images (See FIG. 8C). The corresponding SAED pattern further corroborates that the $CoMn_2O_4$ nano-octahedra crystallizes in the tetragonal phase of $I4_1/amd$ symmetry (See FIG. 8D). Moreover, EELS elemental mapping (See FIGS. 1E, 1F, 1H and 1I) and normalized line profiles (See FIG. 1G) were used to investigate the microstructure of $CoMn_2O_4$ and exhibited homogenous elemental distributions of Co and Mn. The Co/Mn atomic ratio in $CoMn_2O_4$ nano-octahedra was determined to be 1:1.97 by ICP-OES.

Figure 9A:
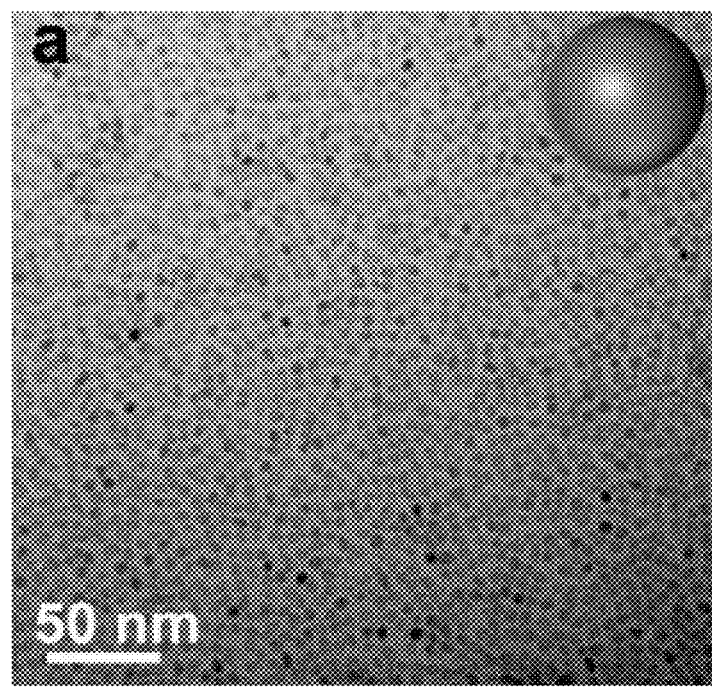
FIGS. 9A-9D depict images and data of the present disclosure.
Figure 9B:
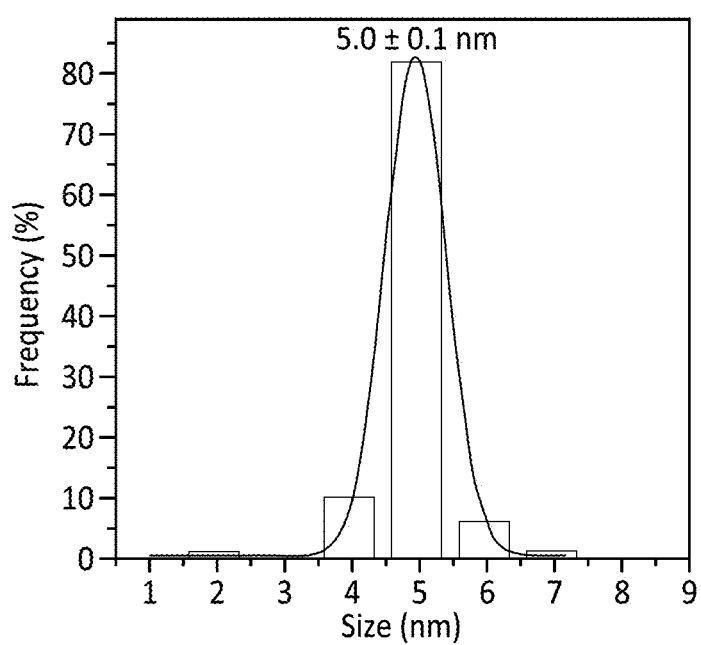
Figure 9C:
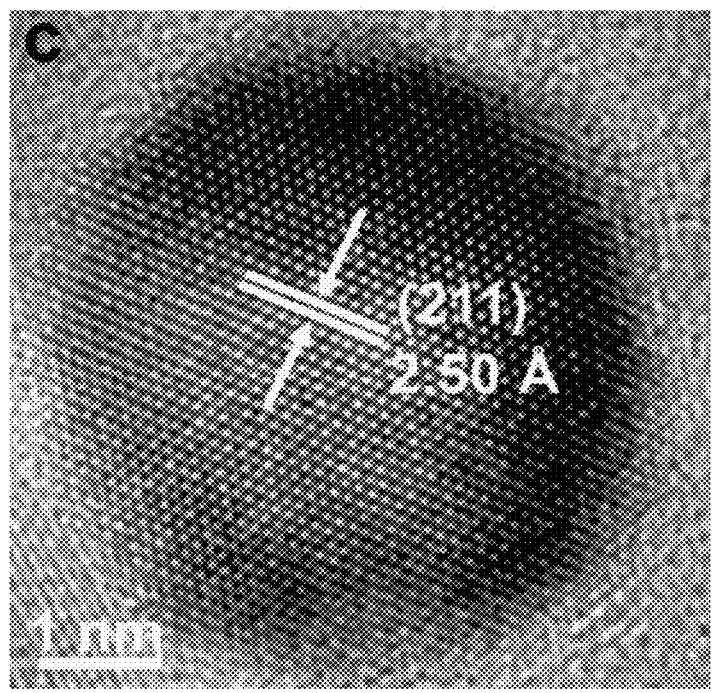
Figure 9D:
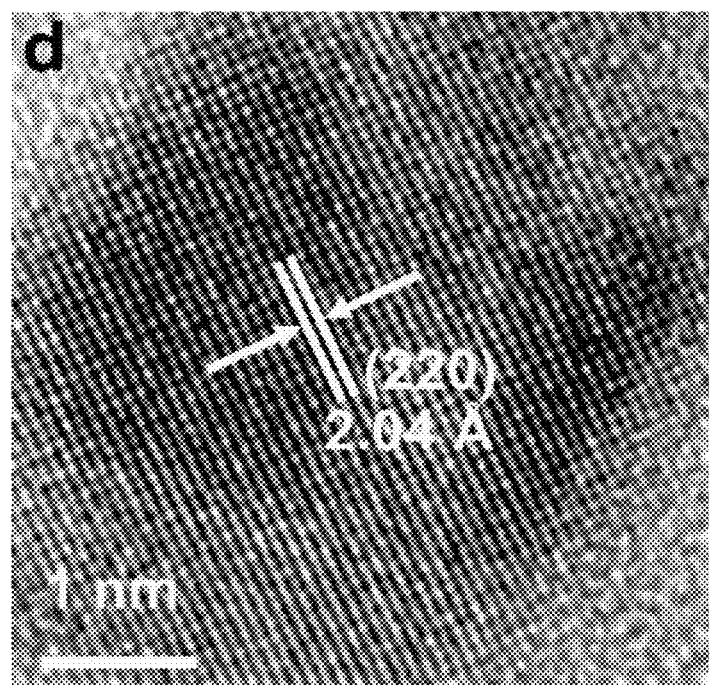

A replacement of the $CoCl_2·6H_2O$ precursors with an equal mole of $Co(acac)_2$, while other synthetic conditions were kept the same, changed the morphology of the resultant $CoMn_2O_4$ to nanospheres. As shown in the low-magnification TEM image (See e.g., FIG. 9A), nearly 100% of $CoMn_2O_4$ nanocrystals are spherical with an average size of 5.0±0.1 nm (See e.g., FIG. 9B). In the HRTEM images, the spherical nanocrystals exhibit single-crystal spinel structures with good crystallinity (See e.g., FIG. 9C-D). Specifically, the clear lattice fringes with spacings of 2.50 Å and 2.04 Å correspond to lattice planes of (211) and (220) in tetragonal $CoMn_2O_4$, respectively. This observation further reveals that the as-synthesized $CoMn_2O_4$ nanospheres possess the tetragonal phase. Moreover, the ICP-OES analysis suggests that the Co/Mn atomic ratio of the $CoMn_2O_4$ nanospheres is 1:2.00, almost the same as the composition in the $CoMn_2O_4$ nano-octahedra.

Figure 2A:
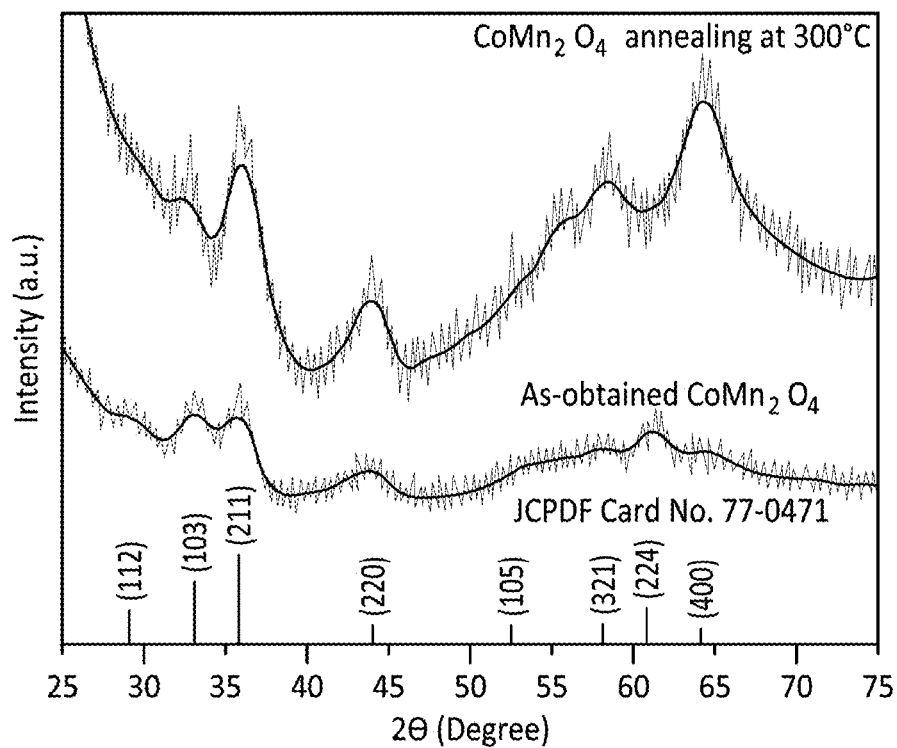
FIGS. 2A-2D depict various graphs of data of the present disclosure.
Figure 2B:
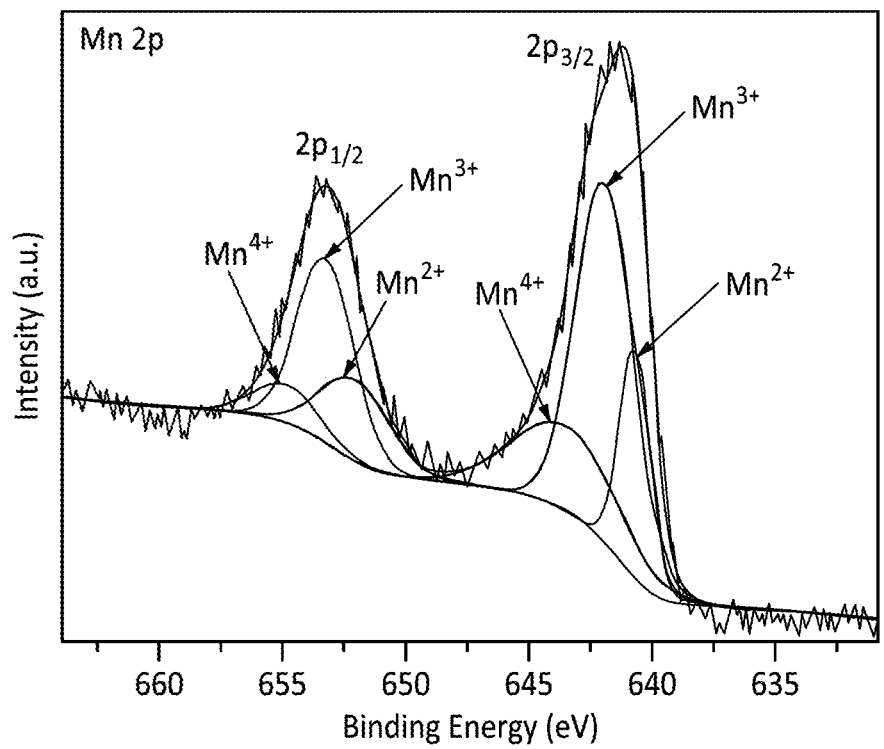
Figure 2C:
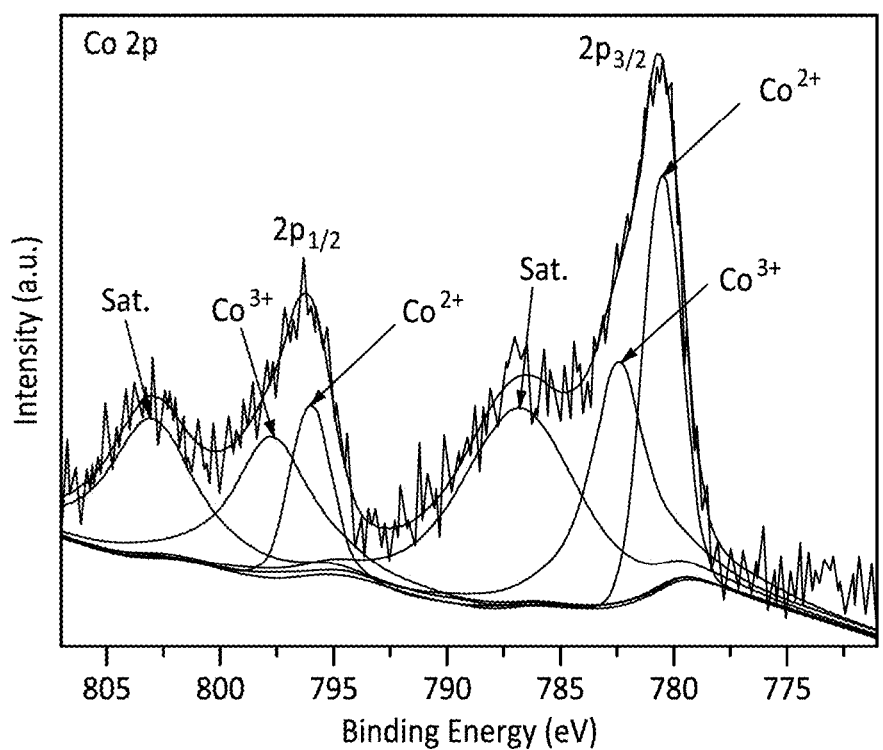
Figure 2D:
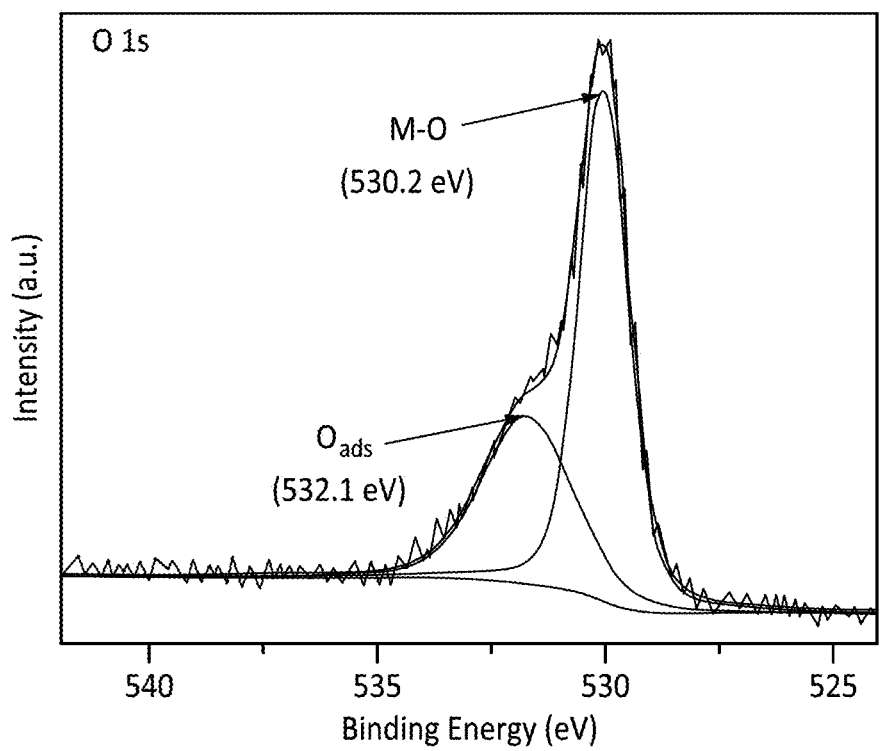
Figure 10A:
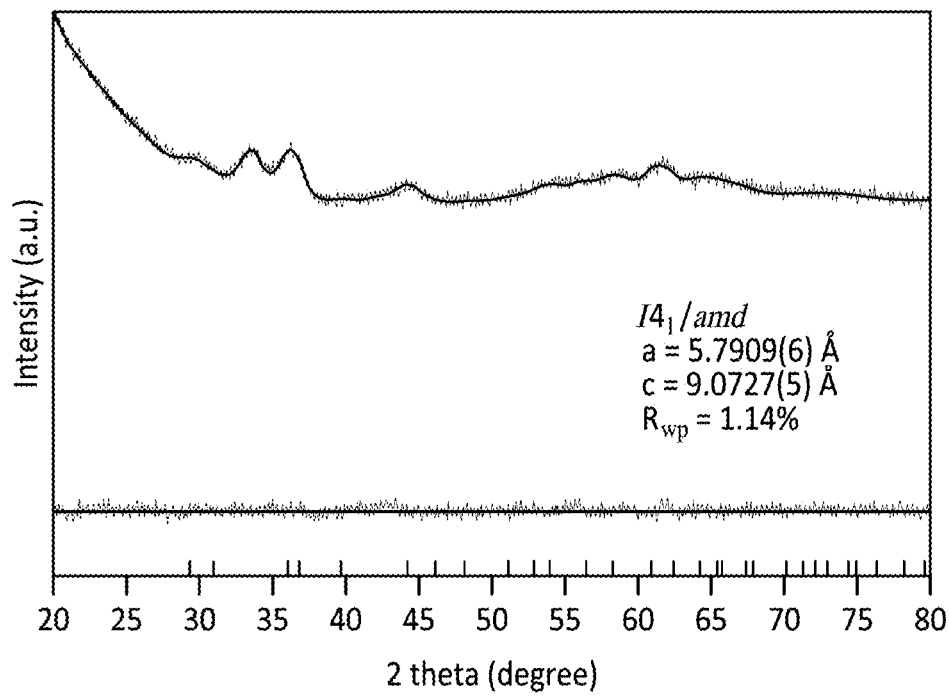
FIGS. 10A and 10B depict lattice parameters of carbon-supported (Ketjen Black EC-600JD) $CoMn_2O_4$ nano-octahedra received from Pawley fitting. "$R_{wp}$" means the weighted profile R-factor. (See e.g., Toby, B. H., R Factors in Rietveld Analysis: How Good is Good Enough? Powder Diffr. 200, 21(1), 67-70)).
Figure 10B:
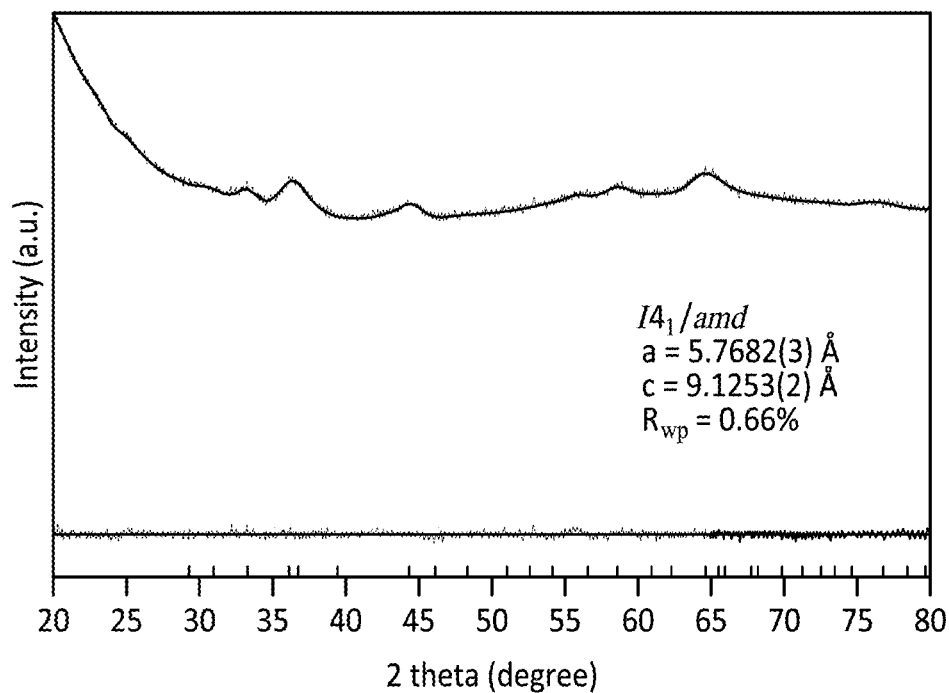
Figure 11:
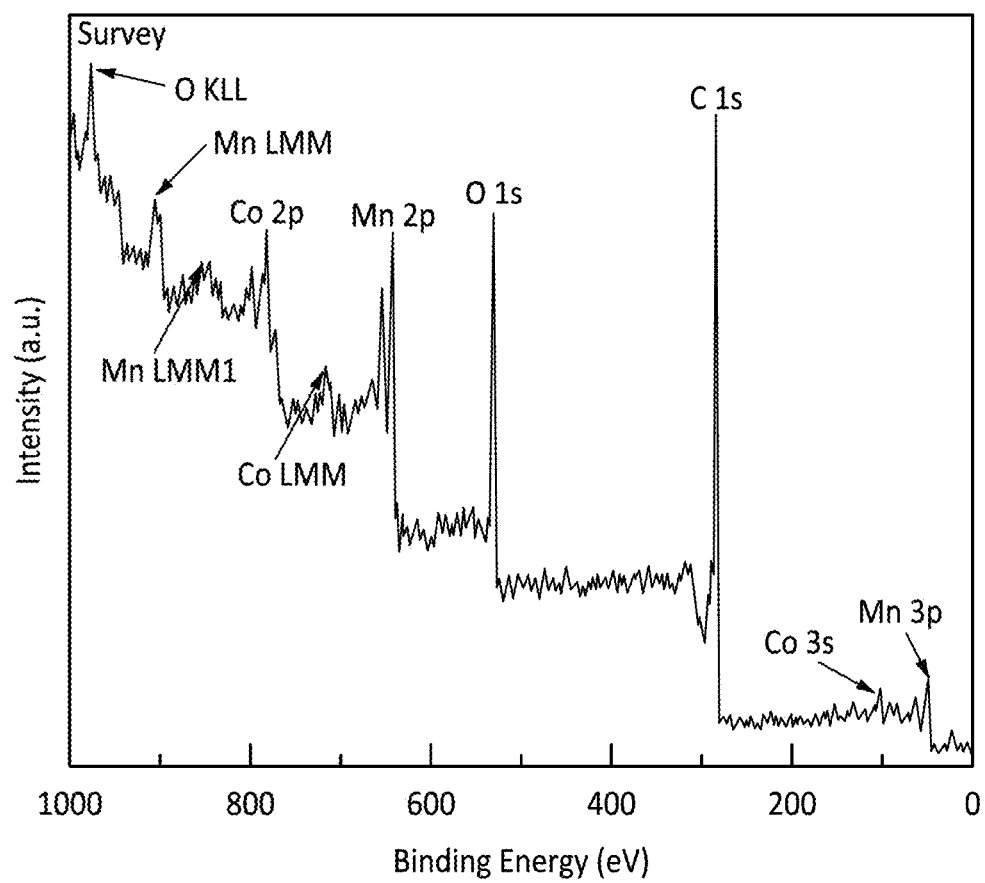
FIG. 11 depicts a survey spectrum of $CoMn_2O_4$ nano-octahedra after annealing in air at 300° C. for 12 h.

Typically, samples synthesized at a low temperature could result in a low crystallinity and abundant ionic deficiency, which can be improved by an annealing treatment. More importantly, thermal treatment in air has been demonstrated as an effective approach to remove surfactants from the nanocrystal surfaces, increasing average metal-oxygen bond length and lowering average Mn valence in the product. Accordingly, a process sequence includes annealing, such as annealing the carbon-supported $CoMn_2O_4$ nano-octahedra in air at 300° C. for 12 h, and their crystal phases before and after the annealing treatment were further confirmed by XRD. As shown in FIG. 2A, all peaks in the XRD patterns of the $CoMn_2O_4$ nano-octahedra before and after the annealing treatment match with the standard diffraction lines of spinel $CoMn_2O_4$ very well (tetragonal, $I4_1/amd$, JCPDS no. 77-0471). The top pattern presented in FIG. 2A shows that no phase transition took place for the $CoMn_2O_4$ nano-octahedra during the annealing. Broad peaks could be determined in both patterns, indicating the small sizes of nanocrystallites both before and after this annealing process according to the Scherrer equation. Pawley fitting verifies the single phase of the octahedral sample both before and after the annealing with an $I4_1/amd$ (141) symmetry as shown in (FIGS. 10A and 10B). The fitting also indicates that the annealing treatment caused a tiny decrease in cell parameter a (from ~5.79 Å to ~5.77 Å and a slight increase in c (from ~9.07 Å to ~9.13 Å), but both changes are insignificant. Furthermore, the valence states of Mn, Co, and O in the $CoMn_2O_4$ nano-octahedra after annealing were investigated using XPS. The XPS survey spectrum (See e.g., FIG. 11) indicates the coexistence of Co, Mn, and O, in which the atomic ratio of Co to Mn on the surface of the nanocrystals was determined to be 1:2.46. For the Mn 2p spectrum shown in FIG. 2B, the peaks located at 641.0 and 652.3 eV in $CoMn_2O_4$ nano-octahedra are assigned to the $Mn^{2+}$ with a separation of 11.3 eV, further demonstrating the successful formation of tetragonal $CoMn_2O_4$ spinel nanocrystals. Meanwhile, the peaks located at 642.2 and 653.5 eV are assigned to the $Mn^{3+}$, while the other ones located at 643.8 and 654.8 eV are attributed to $Mn^{4+}$. XPS analysis suggests that $Mn^{2+}$, $Mn^{3+}$, and $Mn^{4+}$ co-existed on the surface of the $CoMn_2O_4$ nano-octahedra with atomic fractions of 15%, 78%, and 7%, respectively, indicating that $Mn^{3+}$ was dominant on the $CoMn_2O_4$ nano-octahedral surface. Similarly, the Co 2p spectrum (FIG. 2C) was also best fitted into two spin-orbit doublets characteristic of $Co^{2+}$ and $Co^{3+}$ and two shake-up satellites (denoted as sat.) using a Gaussian fitting method. The peaks located at 780.7 and 796.0 eV are assigned to the $Co^{2+}$ with a separation of 15.3 eV, while the others located at 782.3 and 797.7 eV are ascribed to $Co^{3+}$. This result suggests the co-existence of $Co^{2+}$ and $Co^{3+}$ on the surface of the $CoMn_2O_4$ nano-octahedra comprises molar contributions of 71% and 29%, respectively. Furthermore, the oxygen species on the surface of the $CoMn_2O_4$ nano-octahedra were determined from the deconvolution of the O 1s spectrum in FIG. 2D. The peak at 530.2 eV is attributed to the lattice oxygen, while the peak at 532.1 eV is ascribed to the oxygen-containing species absorbed on the surface. The co-existence of $Mn^{2+}/Mn^{3+}/Mn^{4+}$ and $Co^{2+}/Co^{3+}$ in $CoMn_2O_4$ spinels, based on the XPS analysis, is consistent with our previous operando X-ray absorption spectroscopy measurements on similar Co—Mn spinels without the shape control. In summary, those results suggest that the surface of the $CoMn_2O_4$ nano-octahedra was predominated by $Mn^{3+}$ and $Co^{2+}$ with an Mn/Co ratio of 2.46:1, further corroborating the formation of the $CoMn_2O_4$ spinel nanocrystals.

Figure 12A:
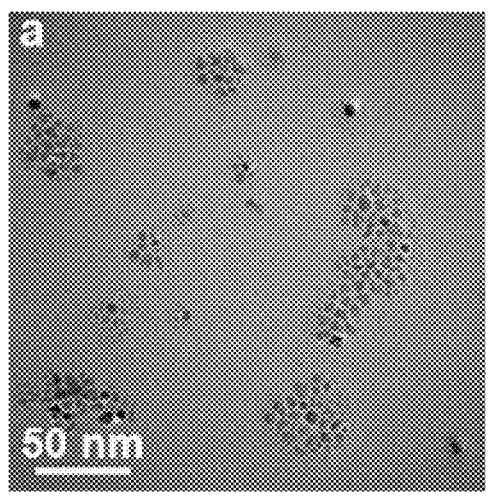
FIGS. 12A-12C depict TEM images of the nanocrystals synthesized under the same conditions, except that (FIG. 12A) no oleic acid was added into the reaction solution.
Figure 12B:
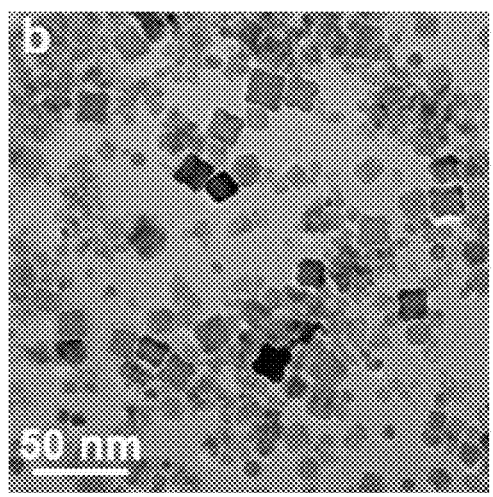
Figure 12C:
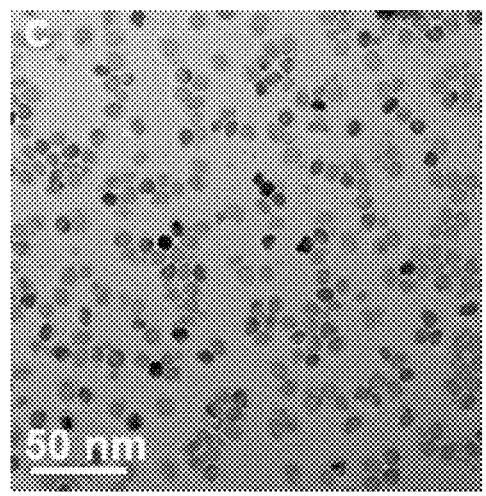

To further gain insights into the formation mechanism of the $CoMn_2O_4$ spinel nanocrystals, sets of control experiments were conducted. In this case, oleylamine plays a crucial factor as an alkalescent media during the synthesis. When the synthesis was carried out with the addition of oleic acid in the absence of oleylamine, only a transparent solution was observed without generating products. When only oleylamine was used as the solvent in the absence of oleic acid, nanoparticles with a relatively broad size distribution were obtained without octahedral products (FIG. 12A). As such, an appropriate volume ratio of oleylamine to oleic acid in the synthesis is essential to tune the morphology of the final product. Meanwhile, it was also determined that the type of Co precursors is critically important for the successful formation of octahedral nanocrystals. As reported earlier, anions could have a significant impact on the reaction kinetics and thus the morphology of the final product, which can be ascribed to the considerable differences in coordination ability between anions and metallic cations. Particularly, when $CoBr_2$ was used as the Co precursor, most of the final products presented as concave nanocubes[45] due to the stronger coordination ability between Br ions and metallic cations and the stronger capping effect of Br ions on {001} facets (See e.g., FIG. 12B), when compared to Cl ions and acetylacetone ligands. Furthermore, by reducing the water in a volume of the half, the resultant nanocrystals became more spherical as compared to the octahedral nanocrystals (FIG. 12C). Based on these observations, the introduction of water at the elevated temperature may favor the formation of the bimetallic Co—Mn hydroxides as nuclei in the early reaction stage and effectively prevent the formation of the metal-oleylamine complex. Taken together, it is concluded that all the factors, including an appropriate ratio between oleylamine and oleic acid, the type of Co precursors, and the fraction of water, play significant roles in the formation of $CoMn_2O_4$ octahedral nanocrystals.

Figure 3A:
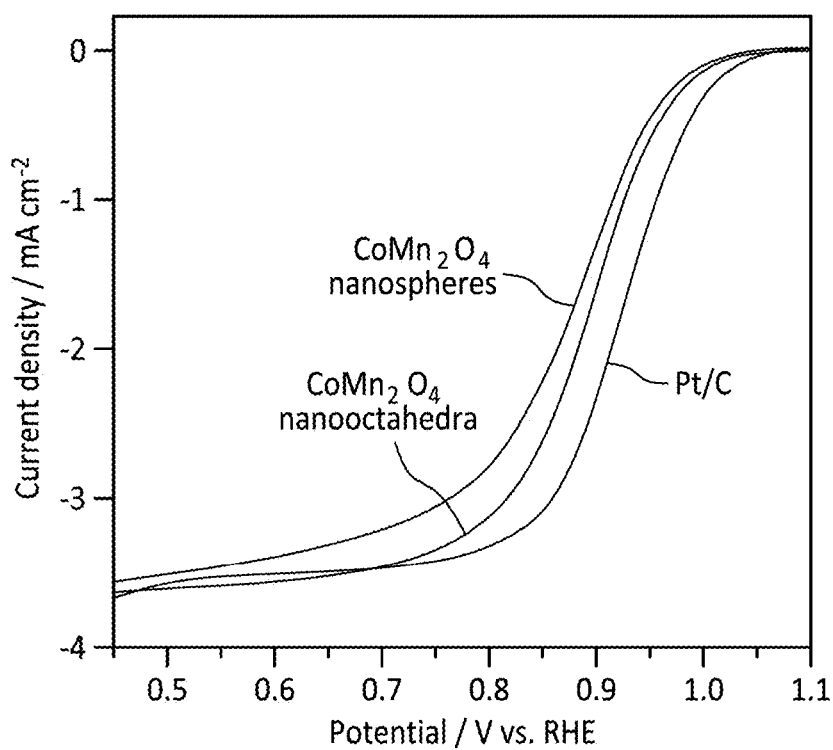
FIGS. 3A-3D depict various graphs of data of the present disclosure.
Figure 3B:
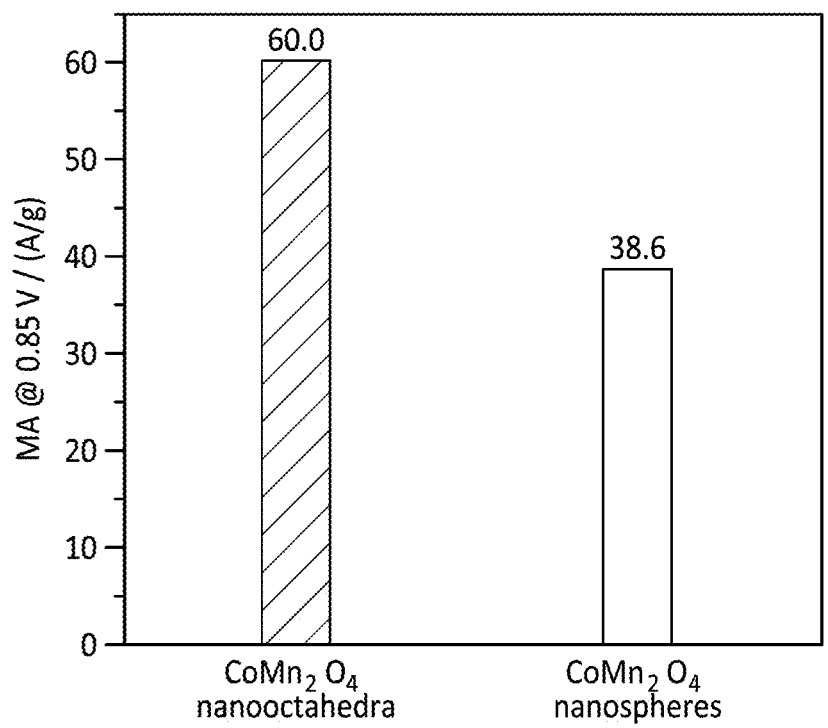
Figure 3C:
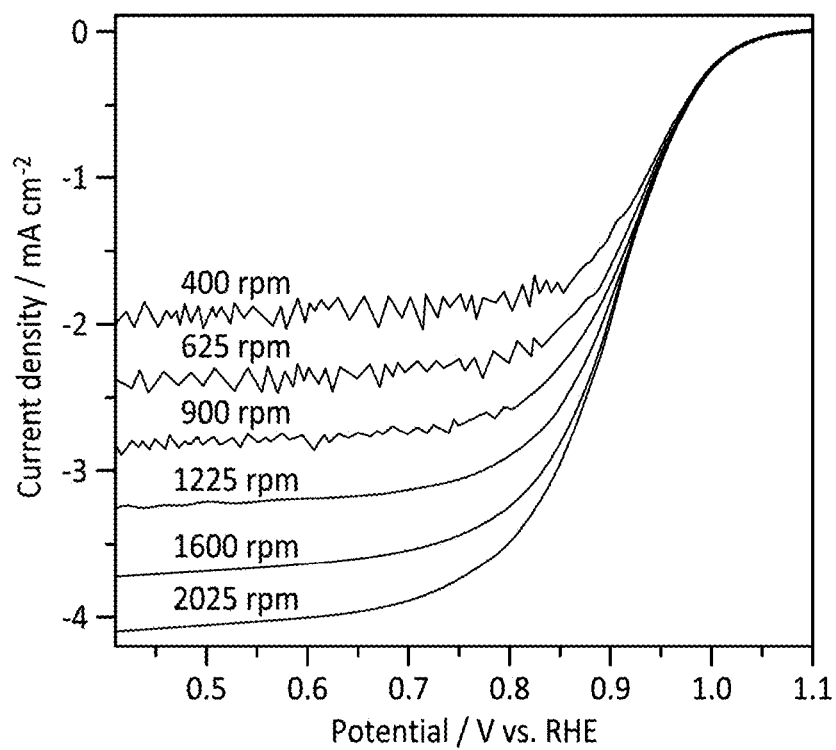
Figure 3D:
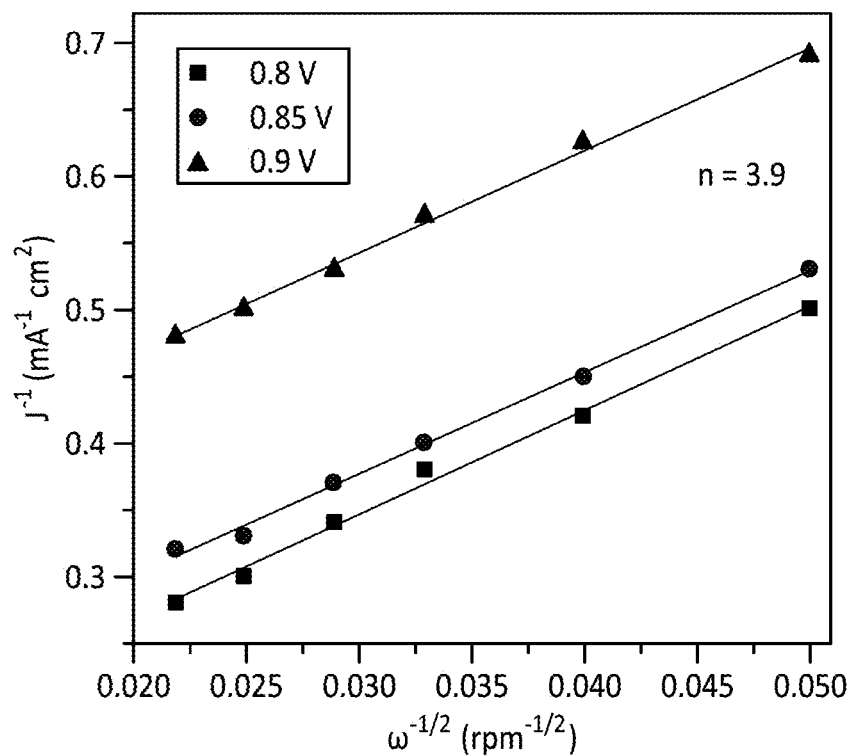
Figure 13:
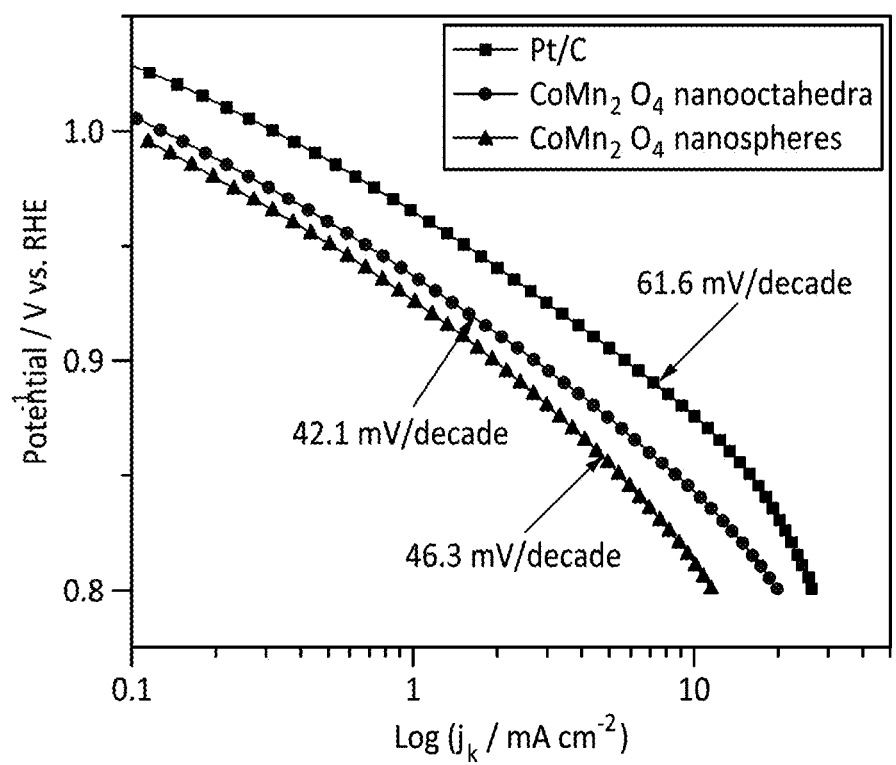
FIG. 13 depicts Tafel plots derived from the ORR polarization profiles of $CoMn_2O_4$ nano-octahedra, $CoMn_2O_4$ nanospheres, and Pt/C, in FIG. 3a. Spinel samples were annealed in air at 300° C. for 12 h. Note that Tafel slopes are shown on the plot.

As a proof-of-concept application, the ORR activities of $CoMn_2O_4$ nano-octahedra and nanospheres, loaded on carbon and annealed in air at 300° C. for 12 h, were comparatively evaluated using the RDE measurement in alkaline media. As shown in FIG. 3A, the ORR polarization profile of the commercial Pt/C exhibits a half-wave potential ($E_{1/2}$) of 0.890 V vs. RHE, as a benchmark activity value in $O_2$-saturated 1 M KOH at a scan rate of 5 mV/s and a rotation rate of 1,600 rpm. Note that 1 M KOH is closer to the realistic $OH^-$ concentration in practical membrane electrode assembly (MEA) tests, relative to 0.1 M KOH. More importantly, the diffusion-limited current density, $I_d$, in 1 M $O_2$-saturated KOH can reach around $-3.8$ mA/cm$^2$ at 1,600 rpm, suggesting a 4e$^-$ ORR process, based on the Levich equation. The ORR polarization profiles of the $CoMn_2O_4$ octahedral nanocrystals showed an $I_d$ of around $-3.7$ mA/cm$^2$, similar to that of the commercial Pt/C, indicating that the 4e$^-$ process played a leading role in reducing $O_2$ completely to $H_2O$, instead of the 2e$^-$ process of forming peroxide species. Particularly, the $CoMn_2O_4$ nano-octahedra exhibited an $E_{1/2}$ value of 0.875 V vs. RHE, 25 mV more positive than that of $CoMn_2O_4$ nanospheres (0.85 V), revealing a better alkaline ORR catalytic activity of the $CoMn_2O_4$ nano-octahedra relative to nanospheres. To further quantitatively evaluate the activity of the $CoMn_2O_4$ nano-octahedra and nanospheres, the MA at 0.85 V, as a metric value, was calculated by normalizing the kinetic current to the mass loading of metal oxides. As shown in FIG. 3B, the MA at 0.85 V of $CoMn_2O_4$ nano-octahedra (60.0 A/g) was about 1.6× as high as that of $CoMn_2O_4$ nanospheres (38.6 A/g). Excellent ORR activity of the $CoMn_2O_4$ nano-octahedra was also confirmed from the smaller Tafel slope of 42.1 mV/decade than those measured with the $CoMn_2O_4$ nanospheres (46.3 mV/decade) and commercial Pt/C (61.6 mV/decade), suggesting a smaller overpotential in order to achieve the same kinetic current change (FIG. 13). As a result, the enhancement of alkaline ORR activity of $CoMn_2O_4$ nano-octahedra, relative to $CoMn_2O_4$ nanospheres, is likely due to the exclusively exposed {101} planes on the catalyst surface. The ORR kinetic of the $CoMn_2O_4$ nano-octahedra in 1 M KOH was subsequently investigated by RDE measurement at different rotation rates. FIGS. 3C-D depict the ORR polarization profiles of the $CoMn_2O_4$ nano-octahedra in $O_2$-saturated 1 M KOH at a scan rate of 5 mV/s at the different rotation rates and the corresponding Koutecky-Levich plots at different potentials, respectively. According to the slopes of Koutecky-Levich plots, the electron transfer number (n) can be determined with a value of ~3.9 at 0.60-0.75 V, further revealing a 4e$^-$ oxygen reduction process in $CoMn_2O_4$ nano-octahedra, similar to the case on the commercial Pt/C.

Figure 4A:
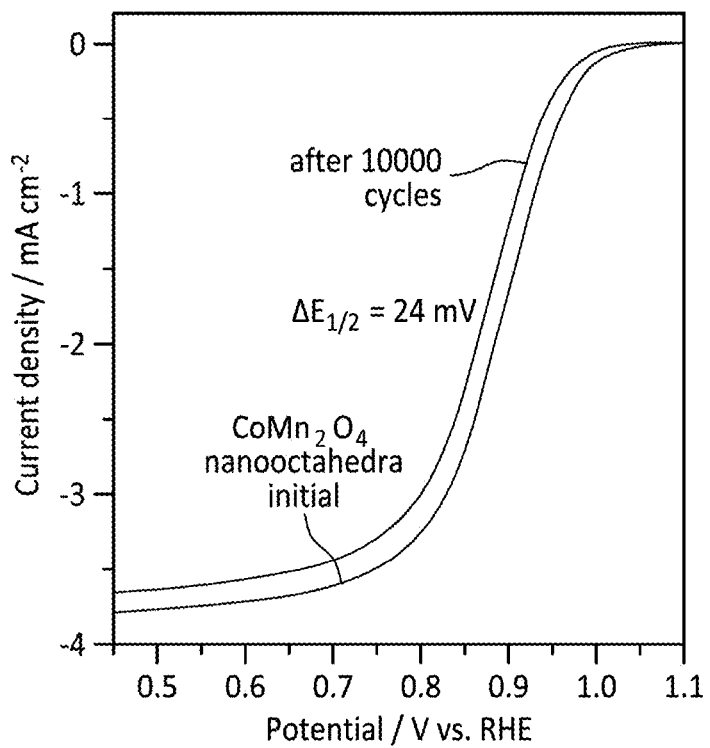
FIGS. 4A-4B depict various graphs of ORR polarization profiles of the present disclosure.
Figure 4B:
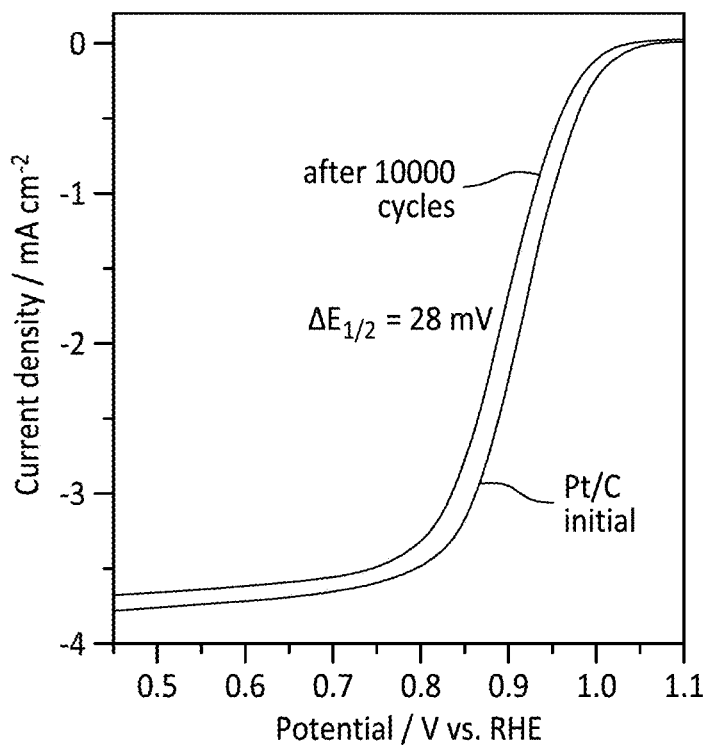
Figure 14A:
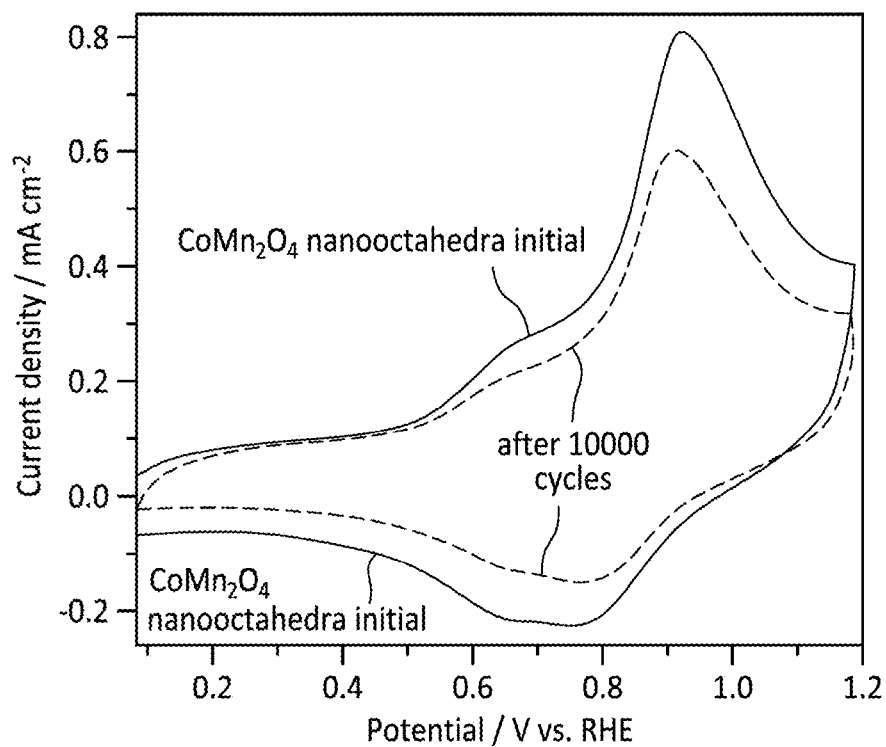
FIGS. 14A and 14B depict cyclic voltammetric (CV) curves of (FIG. 14A) $CoMn_2O_4$ nano-octahedra (annealed in air at 300° C. for 12 h) and (FIG. 14B) Pt/C before and after the accelerated durability tests in $O_2$-saturated 1 M KOH at a scan rate of 100 mV/s from 0.6 to 1.0 V vs. RHE.
Figure 14B:
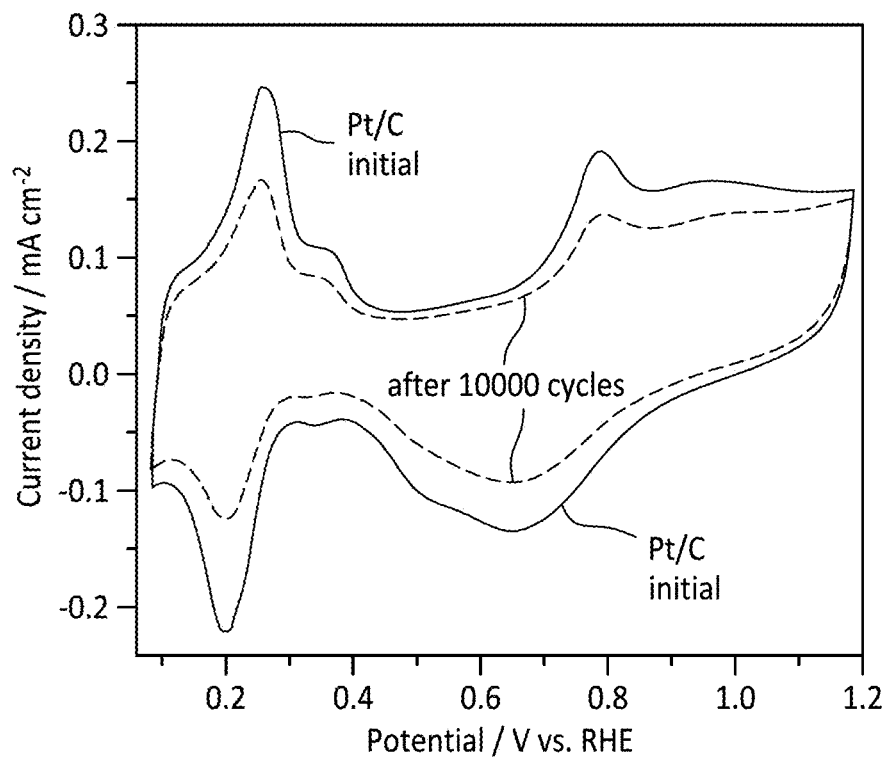
Figure 15A:
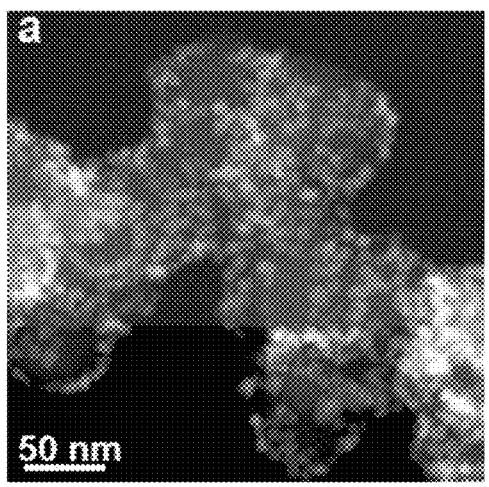
FIGS. 15A-15F depict data of the present disclosure.
Figure 15B:
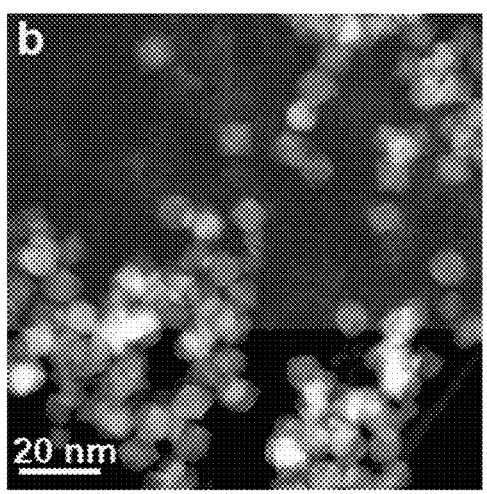
Figure 15C:
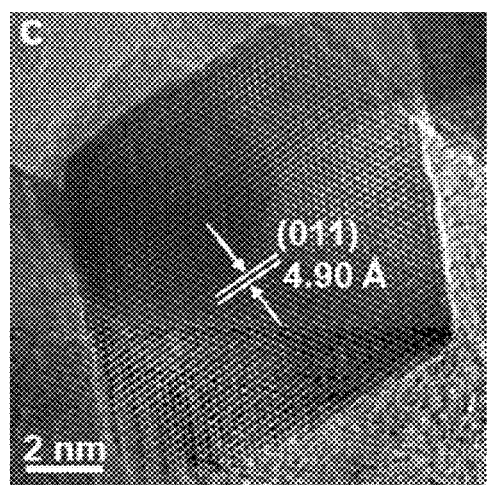
Figure 15D:
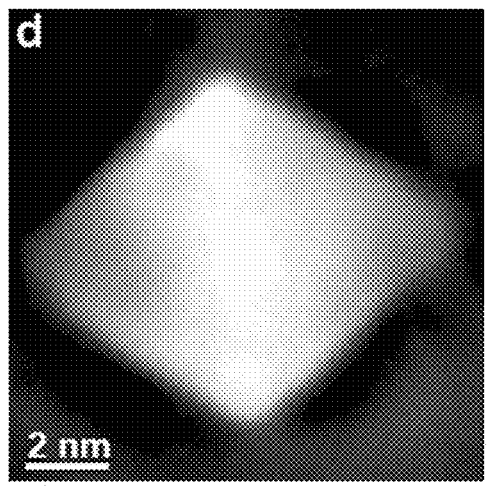
Figure 15E:
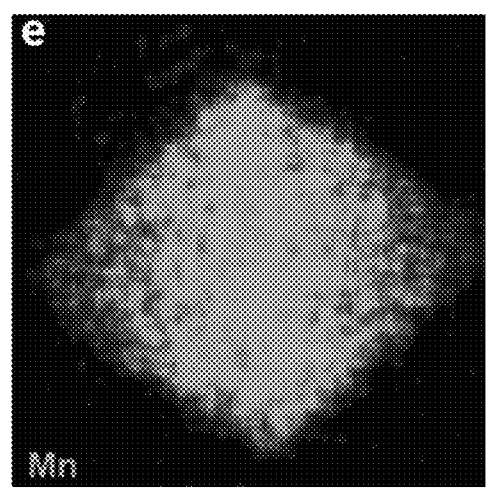
Figure 15F:
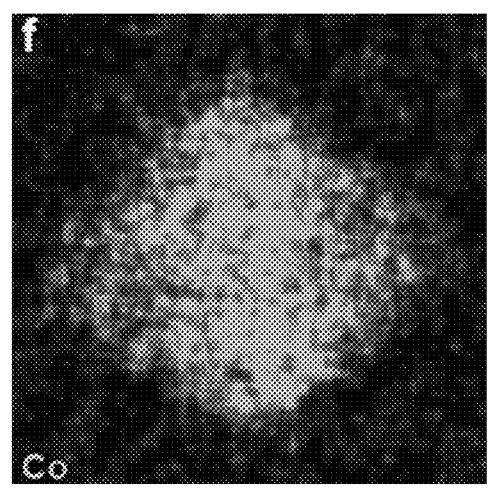
Figure 16:
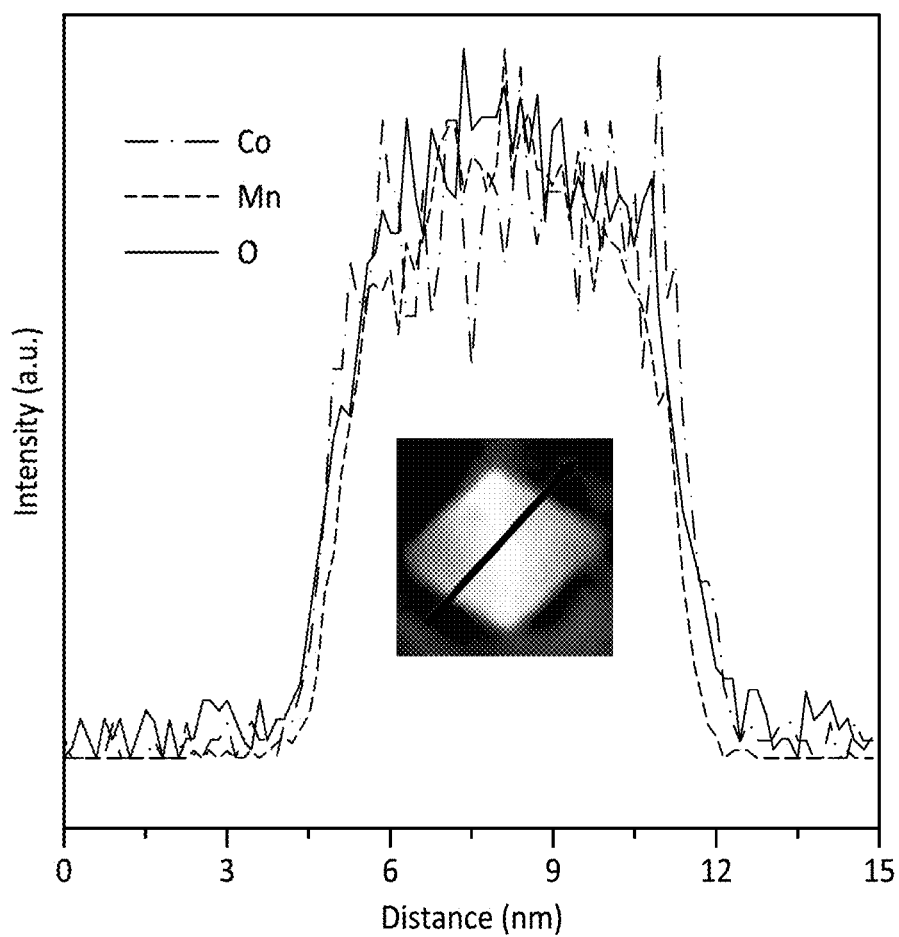
FIG. 16 depicts a normalized EDX line scan across an individual carbon-supported $CoMn_2O_4$ nano-octahedron after the accelerated durability tests.
Figure 17A:
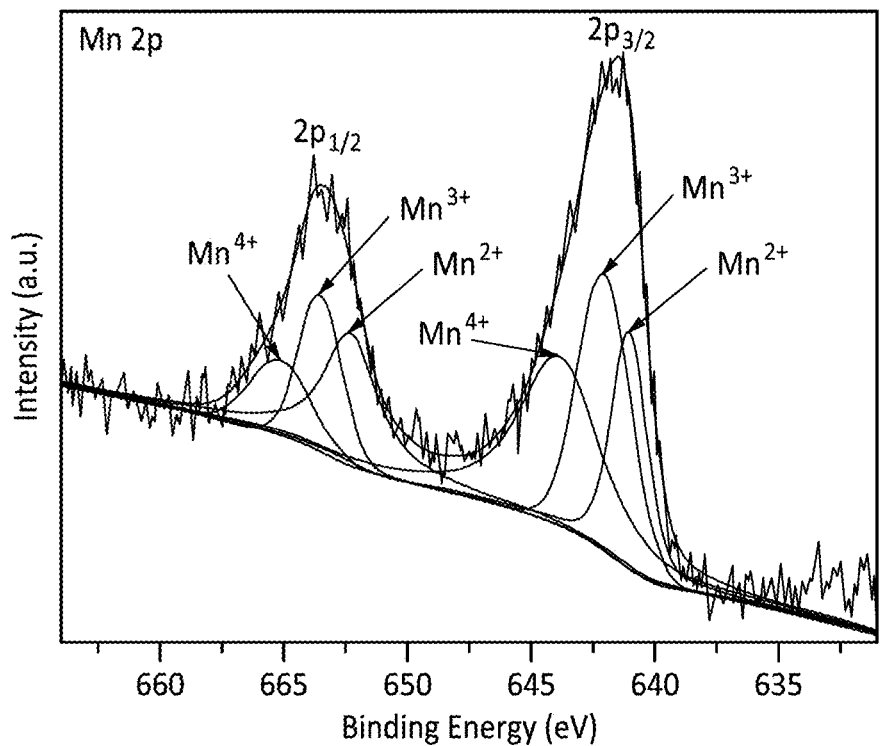
FIGS. 17A and 17B depict XPS spectra of (FIG. 17A) Mn 2p and (FIG. 17B) Co 2p for carbon-supported $CoMn_2O_4$ nano-octahedra after the accelerated durability test. Ratios of element states: $Mn^{2+}/Mn^{3+}/Mn^{4+}$=23/62/15; $Co^{2+}/Co^{3+}$=70:30.
Figure 17B:
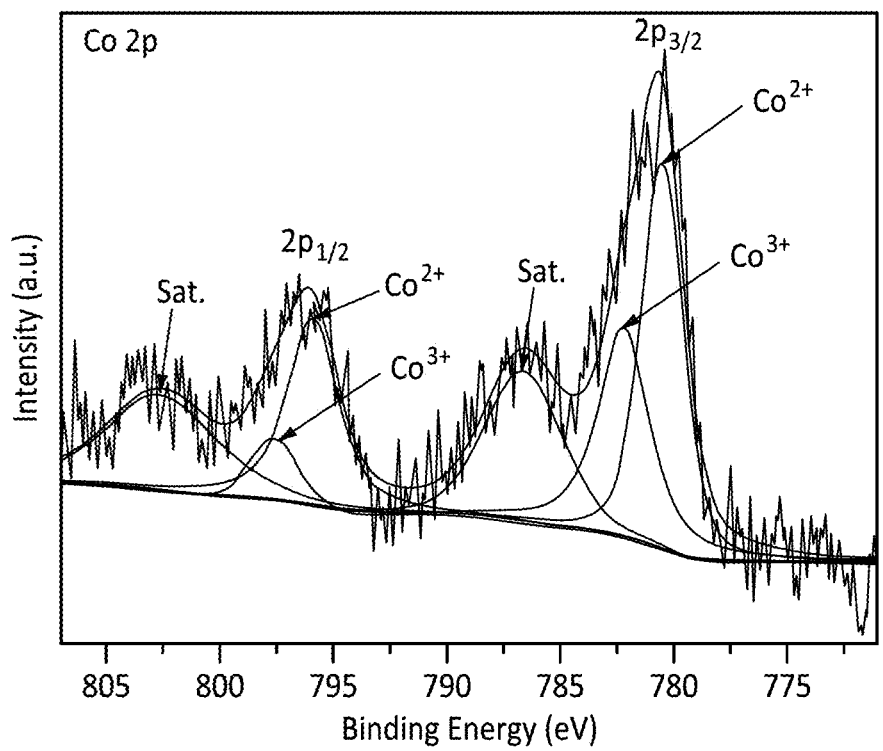

In addition to the great enhancement in MA, the $CoMn_2O_4$ nano-octahedral catalyst also showed remarkable durability relative to $CoMn_2O_4$ nanospheres and the commercial Pt/C. After 10,000 cycles of accelerated durability tests at room temperature with potential cycles between 0.6 to 1.0 V at 100 mV/s, the $CoMn_2O_4$ nano-octahedral catalyst exhibited an activity decay with a $\Delta E_{1/2}$ value of 24 mV, which is superior to the commercial Pt/C with a $\Delta E_{1/2}$ value of 28 mV (FIGS. 4A and 4B). Accurately, the MA at 0.85 V only dropped to 47.2 A/g, corresponding to a loss of 21% relative to the pristine MA. This value is still 1.22-time higher than the pristine MA of the $CoMn_2O_4$ nano-spherical catalyst, indicating the promising stability of the $CoMn_2O_4$ nano-octahedra. As evidenced by CV measurement before and after the accelerated durability tests (See e.g., FIGS. 14A and 14B), the activity decay could be ascribed to a progressive decrease of the electrochemically active surface area (ECSA) derived from particle aggregation/sintering during long-term potential cycles. Moreover, the HAADF-STEM (FIGS. 15A and 15B) and HRTEM characterizations (FIG. 15C) confirmed that the size, morphology, and crystal phase were still well-preserved after the accelerated durability tests. The octahedral morphology of $CoMn_2O_4$ and the uniform composition distribution of Mn and Co elements after the accelerated durability tests were also confirmed by STEM-EDX mapping (See e.g., FIGS. 15D-15F) and corresponding EDX line scan (FIG. 16), in which the ratio of Mn/Co was measured to be 1.92:1. Furthermore, the chemical valence states of Mn and Co after the accelerated durability tests were further determined by XPS, showing $Mn^{2+}/Mn^{3+}/Mn^{4+}=23:62:15$ and $Co^{2+}/Co^{3+}=70:30$. The XPS analysis suggests that the fraction of $Mn^{3+}$ in Mn element, that is, $Mn^{3+}/(Mn^{2+}+Mn^{3+}+Mn^{4+})$, decreased from 78% (before the accelerated durability tests) to 62% (after the accelerated durability tests, FIG. 17A), whereas the ratio of $Co^{2+}$ to $Co^{3+}$ did not show a major change before ($Co^{2+}/Co^{3+}=71:29$) and after the accelerated durability tests ($Co^{2+}/Co^{3+}=70:30$, FIG. 17B). This is in agreement with a previous report that the ORR activity strongly depends on Mn valent states on the surface of Mn-based spinel oxides. It is plausible that the ORR activity is related to the decrease of relative $Mn^{3+}$ contents on $CoMn_2O_4$ surfaces. In addition, noticeable surface area decay was observed in CV profiles after 10,000 potential cycles, indicating a mild particle aggregation (See e.g., FIGS. 4A and 15A). Combined together, these results demonstrate the promising catalytic durability associated with the octahedral nanocrystals synthesized in the reported approach.

A facile protocol for the one-pot synthesis of uniform 9 nm $CoMn_2O_4$ spinel nano-octahedra with the exclusively exposed {101} planes was demonstrated under modest conditions. Based on the observation of particle morphologies, it is confirmed that the type of Co precursors, the ratio of oleylamine to oleic acid, and the fraction of water play pivotal roles in facilitating the formation of $CoMn_2O_4$ nanocrystals with distinct crystal facets. $CoMn_2O_4$ spinel nano-octahedra exhibit a superior electrocatalytic activity and stability toward ORR in alkaline media compared to their nano-spherical counterparts. It was also observed that the ORR activity decay may be associated with the decrease of the $Mn^{3+}$ content on the $CoMn_2O_4$ nano-octahedral catalyst surface. This work provides a new strategy for the crystal facet-controlled synthesis of $CoMn_2O_4$ nanocrystals with an improved ORR performance. It paves the way for the controlled synthesis of spinel-based nanocrystals with different crystal facets, which could be used for the investigation of their facet-dependent properties and applications.

Example II: Surface-structure engineering represents an attractive strategy to manipulate nanocatalysts for harvesting their collective performance on deliberately controlled exposed facets. Herein, a facile, colloidal approach to controllably synthesize facet-tailored $CuMn_2O_4$ spinel nano-octahedra in ultra-small sizes through elaborately and systematically designing the synthetic parameters is demonstrated under mild conditions. The key to the successful synthesis of the nanocrystals with morphological control mainly relies on the selective use of the Cu precursors with striking discrepancies in reaction kinetics. Specifically, the switch from nanospheres to nano-octahedra can be achieved by replacing the precursor $Cu(acac)_2$ with $CuCl_2$. Following carbon loading and an annealing post-treatment of the as-synthesized nanocatalysts, the exclusively {101} facet-exposed $CuMn_2O_4$ spinel nano-octahedra exhibit much improved electrocatalytic activity toward ORR in 1 M KOH, when compared to their spherical counterparts, delivering a mass activity (MA) as high as 37.6 A/g at 0.85 V. After 10,000 cycles of ORR durability test, the nano-octahedra still retain a MA of 24.5 A/g, which is twice that of the $CuMn_2O_4$ spinel nanospheres. Structural characterizations after durability testing indicate that the MA decay is likely associated with a decrease of the $Mn^{3+}$ fraction and the emergence of $Cu^+$ on $CuMn_2O_4$ nano-octahedral surfaces. As a paradigm, this synthesis approach could be extended to the preparation of octahedral nanocrystals of other Mn-based spinel systems with a precise shape-control, enabling us to understand and establish the relationship between the surface lattice/valence state and electrocatalytic properties.

The ORR represents a significant electrocatalytic reaction in fuel cells, a class of transformative energy conversion technologies. While many advances have been made in the widespread development of ORR catalysts for proton exchange membrane (PEM) fuel cells (i.e., acidic conditions), further mass-utilization of this technology is impeded by the limit of the ORR catalysts including the need for precious metals such as platinum (Pt) or Pt-group metals (PGMs) and their sluggish kinetics. In alkaline fuel cells, alternatively, the PGM-containing expensive electrocatalysts can be replaced with a wide range of earth-abundant element-based catalysts in a less corrosive environment and the ORR is kinetically faster.

Transition metal spinels have been extensively explored as promising candidates to replace noble metal-based electrocatalysts because of their intrinsic superior activity and stability for ORR under alkaline conditions, as well as their earth abundance, low cost, and access to multiple valence states. In an effort to meet the requirements for their projected broad-based application, it will be key to develop alternative strategies that can be used to significantly boost their electrocatalytic performance toward the ORR. Deliberately and precisely regulating the surface structure of transition metal spinels, at the atomic level, has been recognized as an effective approach, which can fully combine and take advantage of the unique morphologies/facets and tunable chemical valence states. However, due to the lack of accessible synthetic approaches to tailor/control the exposed crystal facets, the underlying reasons of how surface structure affects catalytic performance have not been systematically investigated, resulting in an insufficient insight into crystal facet reactivity. Thus, developing effective synthesis protocols for the preparation of transition metal spinels with well-defined controlled facets and ultra-small size and elucidating the relationships of the exclusively exposed facets and electrocatalytic performance is still a formidable challenge yet rewarding endeavor due to their potentially significant impacts on ORR performance improvements.

Except for the exposed facets and size-effect, it has been experimentally established that the proration of different chemical valence states on spinel oxide surfaces can also affect catalytic performance. Various approaches, such as foreign ion substitution and surface modification, have been developed for deliberately tuning the proration of different chemical valence states with high precision and easy control, thereby significantly accelerating the surface kinetics and enhancing the intrinsic electrochemical reactivity. Despite continuous efforts, to the best of our knowledge, there have been very limited reports on the simultaneous control of the exposed facets and chemical valence states for substantially enhancing ORR performance of transition metal spinels in alkaline media via a feasible surface-structure engineering approach under mild conditions.

Herein, a facile, colloidal approach to simultaneously regulate the morphologies, size, as well as $Mn^{3+}/Mn^{2+}$ and $Cu^{2+}/Cu^+$ ratios on the surface of $CuMn_2O_4$ nanocrystals is reported under mild conditions. Particularly, by deliberately altering the types of Cu precursors, well-defined octahedral and spherical nanocrystals can be readily achieved with uniform size and shape distributions, respectively. Importantly, the $CuMn_2O_4$ spinel nano-octahedra exhibit excellent electrocatalytic activity and stability toward the ORR in alkaline media, when compared with the $CuMn_2O_4$ nano-spheres counterparts. The motivation of this work is to explore the "shape effect" of $CuMn_2O_4$ spinel nanocrystals on the ORR performance in 1 M KOH media. To the best of our knowledge, such kind of study on ultrasmall spinel electrocatalysts has never been reported.

Similar to the fact that the crystallographic facet of PGM-based catalysts is an intimate factor associated with the ORR performance in a PEM fuel cell, it was experimentally determined that different facets on a spinel oxide, as well as their diverse prorations of chemical valence states on the surfaces, could also alter the catalytic performance. Despite various efforts, limited work on ORR performance of spinel oxides with controlled catalyst facets has been reported. Herein, we demonstrate a facile and colloidal approach to prepare {101}-terminated $CuMn_2O_4$ spinel nano-octahedra and showcase improved mass activity and durability toward ORR in 1 M KOH solutions, when compared with their spherical counterparts. The experimental result indicates that control and tuning of the crystallographic facet, as a new strategic direction for the spinel electrocatalyst design, could also leverage the ORR performance in alkaline media. The motivation of this work is to explore the "shape effect" on ORR performance. As far as we know, such kind of study on ultra-small spinel electrocatalysts has never been reported.

Figure 18A:
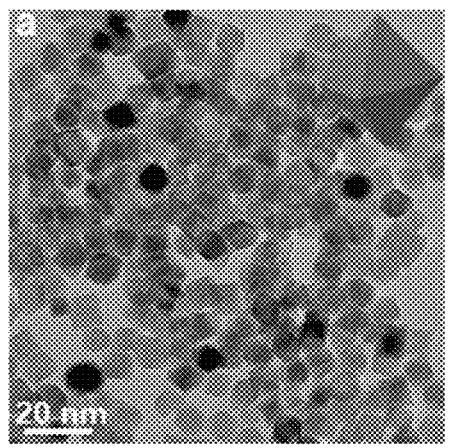
FIGS. 18A-18F depict images and data of the present disclosure.
Figure 18B:
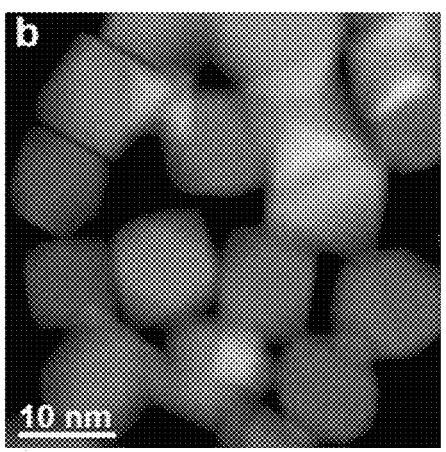
Figure 18C:
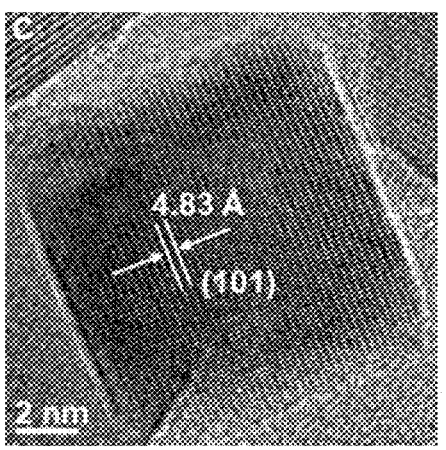
Figure 18D:
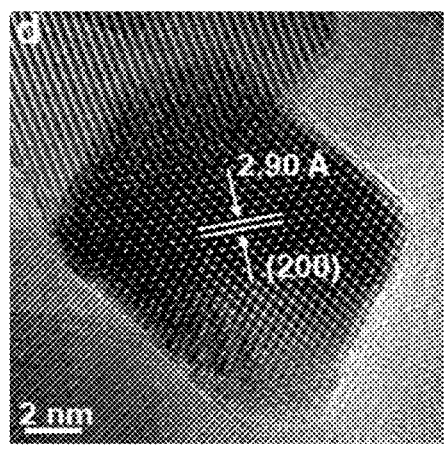
Figure 18E:
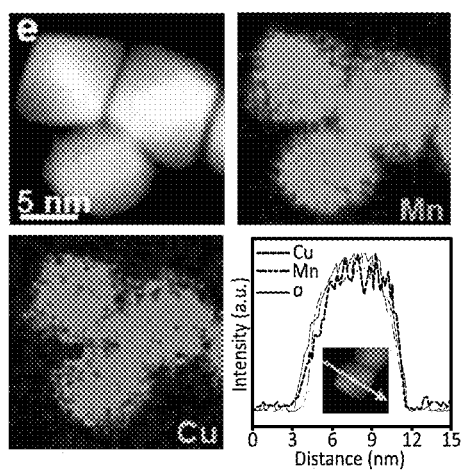
Figure 18F:
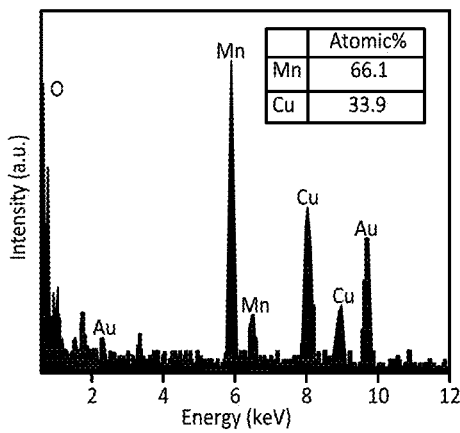
Figure 21:
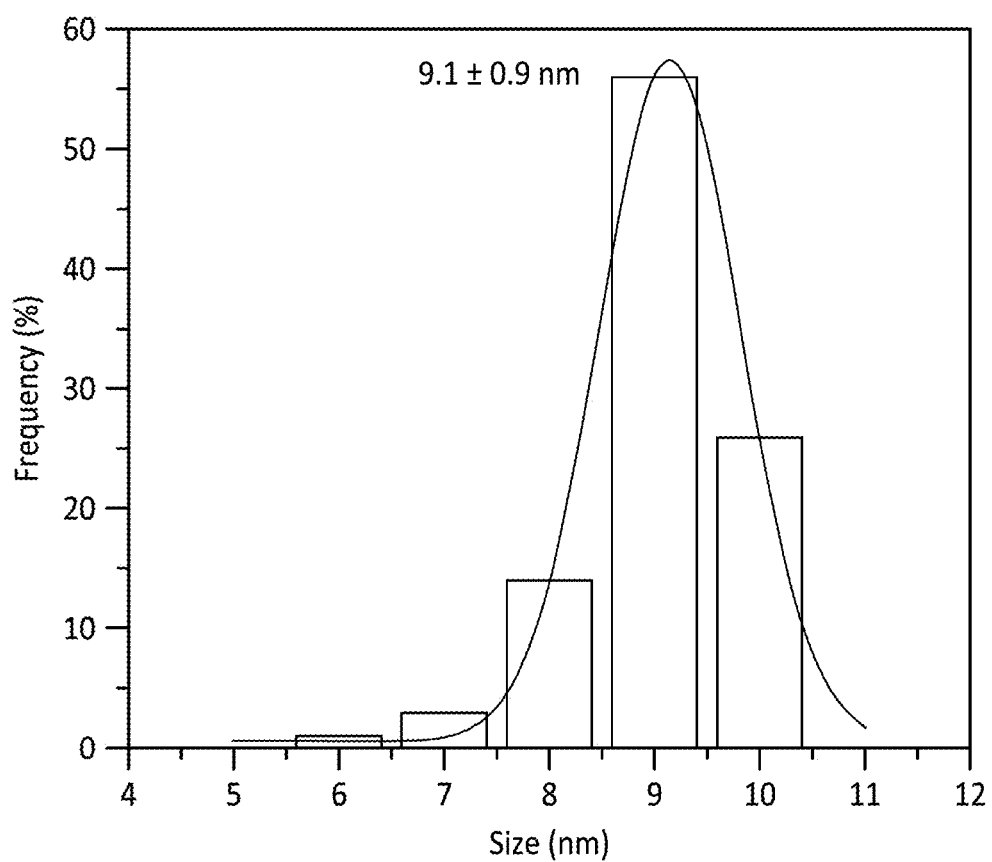
FIG. 21 depicts a size distribution histogram of the as-prepared $CuMn_2O_4$ nano-octahedra.
Figure 22A:
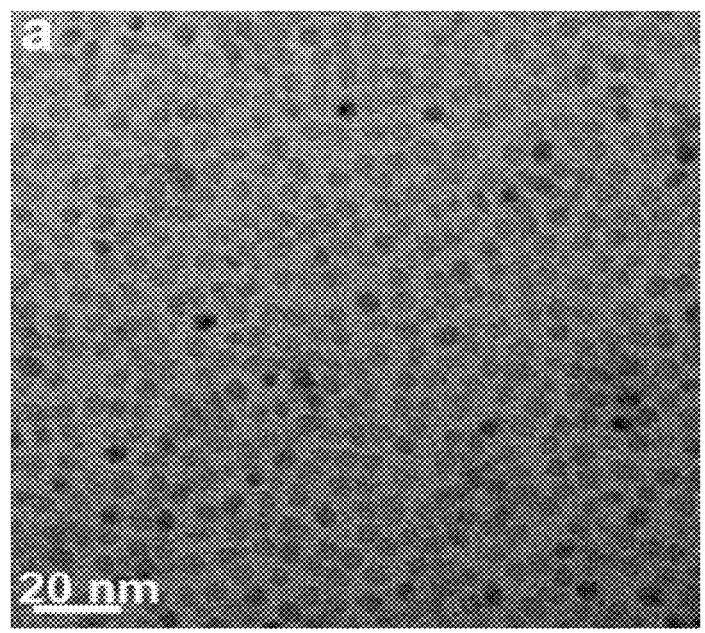
FIGS. 22A-22D depict images and data of the present disclosure.
Figure 22B:
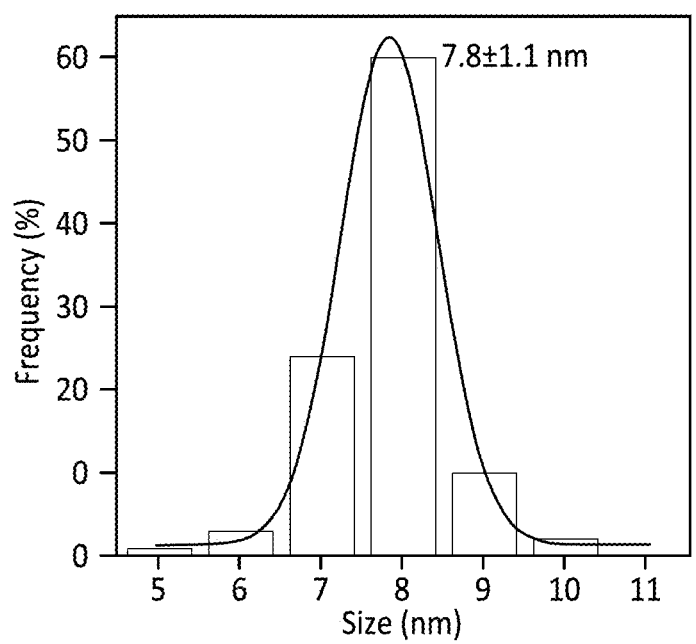
Figure 22C:
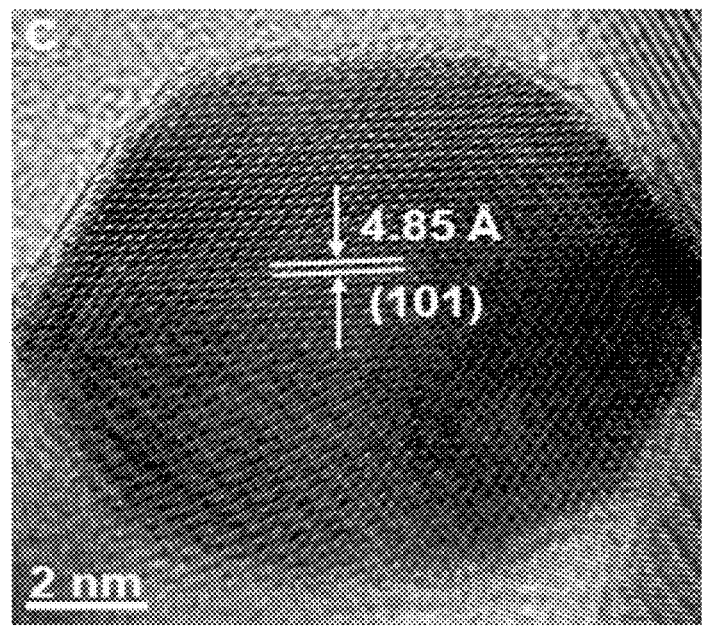
Figure 22D:
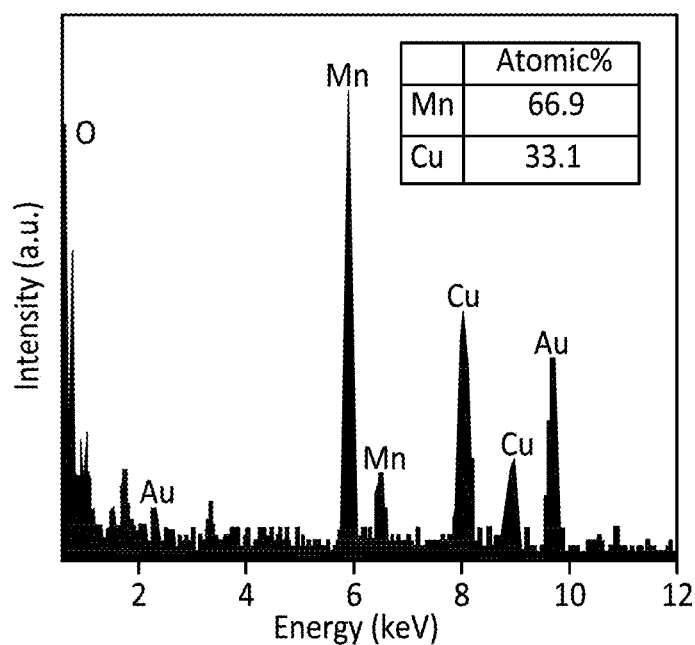

$CuMn_2O_4$ nano-octahedra were synthesized using a conventional one-pot approach, where $CuCl_2 \cdot 2H_2O$, $Mn(OAc)_2 \cdot 4H_2O$, oleylamine, oleic acid, and xylene were combined in a 100 ml three-neck flask and then heated to 90° C., at a heating ramp rate of 5° C./min in an air atmosphere, followed by rapidly injecting the DI water into the aforementioned mixture with a syringe. Following the injection of water, the color of the reaction mixture immediately turned brick-red, indicating the rapid generation of bimetallic Cu—Mn hydroxides as reaction intermediates. Note that these intermediate species, as precursors, could be further converted into the $CuMn_2O_4$ spinel in the subsequent aging process. FIGS. 18A and 18B presents the low-magnification TEM and HAADF-STEM images of the as-synthesized $CuMn_2O_4$ nano-octahedra, showing a uniform size and shape distribution with an average edge length of 9.1±0.9 nm (FIG. 21). The HRTEM images (FIGS. 18C and 18D) taken from a representative octahedron displayed high crystallinity with a continuous lattice extending across the entire facet. The lattice spacings were determined to be 4.83 Å and 2.90 Å, corresponding to the (101) and (200) planes, respectively. These observations further confirm that the as-synthesized octahedral nanocrystals are single-crystal structures terminated with pure {101} facets. The spatial distribution of Mn and Cu in an octahedron was resolved by EDX elemental mapping and line scans, from which the uniform distribution of Mn and Cu across the entire nanocrystal could be established (FIG. 18E). The Mn/Cu atomic ratio of a $CuMn_2O_4$ nano-octahedron was also analyzed by STEM-EDX (FIG. 18F), yielding a value of 1.95, which is consistent well with ICP-OES results (Mn/Cu atomic ratio=1.97:1). Based on these results, it can be concluded that the conversion yield approaches ~95% in the one-pot synthesis of $CuMn_2O_4$ nano-octahedra. These analyses suggest that the fraction of element Cu in the one-pot synthesized $CuMn_2O_4$ nano-octahedra is slightly higher than its spinel stoichiometric composition. As a comparative study, $CuMn_2O_4$ nanospheres were also synthesized using the same protocol except for the replacement of $CuCl_2 \cdot 2H_2O$ with $Cu(acac)_2$. As shown in FIGS. 22A and 22B, the as-synthesized $CuMn_2O_4$ nanospheres exhibited a narrow size distribution with an average size of 7.8±1.1 nm (FIG. 22B) based on a low-magnification TEM image. The clear lattice fringes with a spacing of 4.85 Å, as revealed in FIG. 22C, can be assigned to the (101) plane of tetragonal $CuMn_2O_4$. Moreover, the STEM-EDX analysis indicated that the Mn/Cu atomic ratio of the $CuMn_2O_4$ nanospheres was 2.02 (FIG. 22D), which is slightly higher than that in the $CuMn_2O_4$ nano-octahedra. The STEM-EDX result and ICP-OES result (Mn/Cu=2.07) show a slightly lower Cu fraction in the nanospheres when compared with its spinel stoichiometric proportion. The different Cu contents in both types of products can be attributed to the diverse conversion rates of the Cu-precursors. The diverse reactivities may also cause the $CuMn_2O_4$ morphological change from the octahedron to the sphere. In this case, $Cu(acac)_2$ generally possesses much higher inter-miscibility with xylene than $CuCl_2$ does, significantly accelerating the nucleation rate and benefiting an anisotropic growth. Therefore, both precursors generate nanocrystals with different morphologies. As a result, it is of critical importance to judiciously select different types of precursors to achieve precise control over the morphology of yielded nanocrystals in such kinds of syntheses.

Figure 19A:
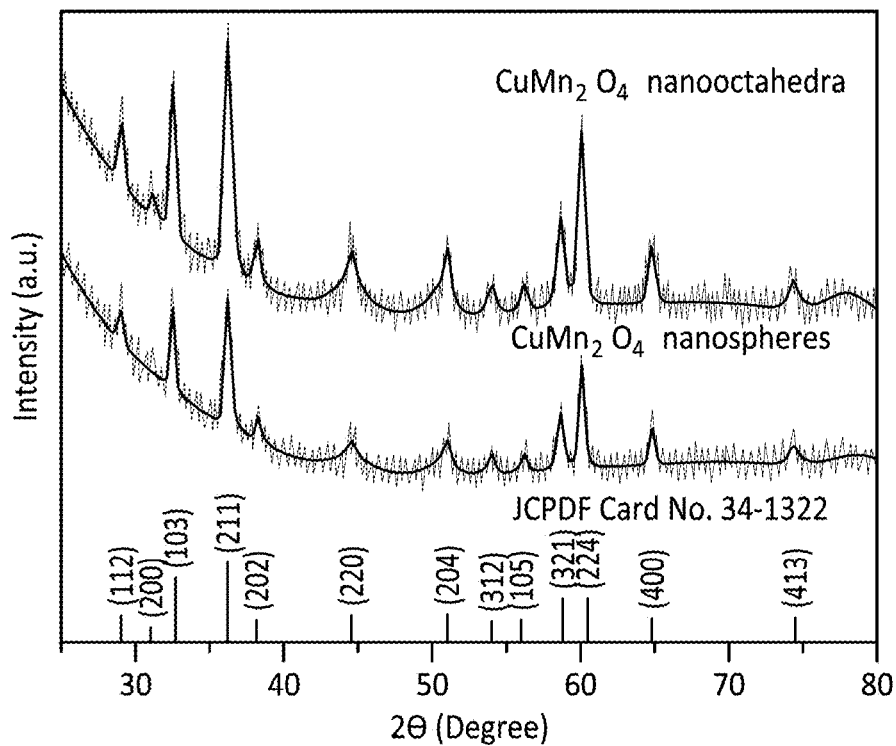
FIGS. 19A-19D depict data of the present disclosure.
Figure 19B:
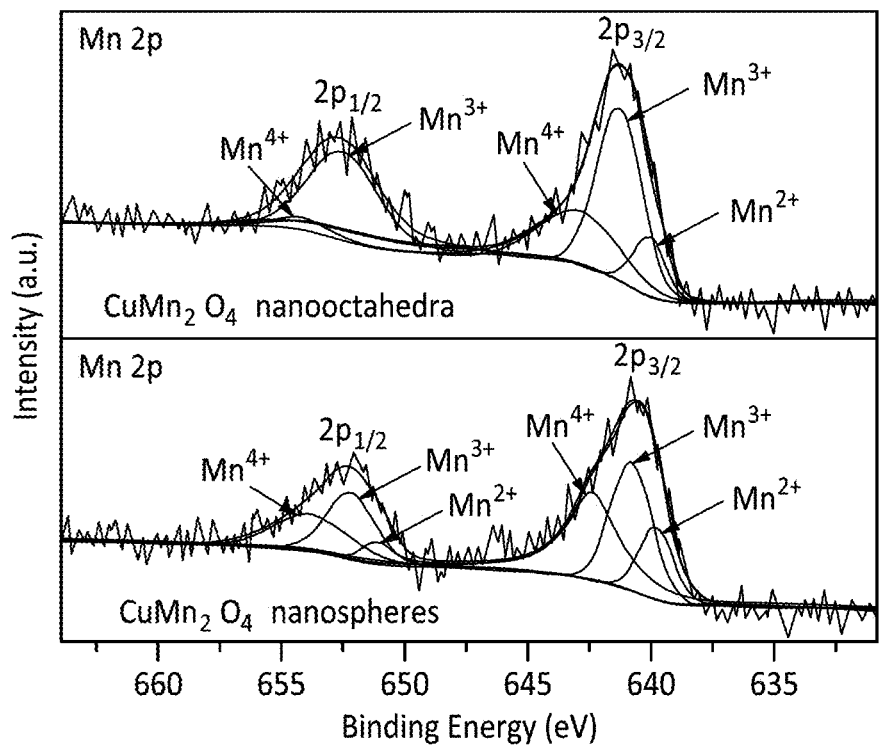
Figure 19C:
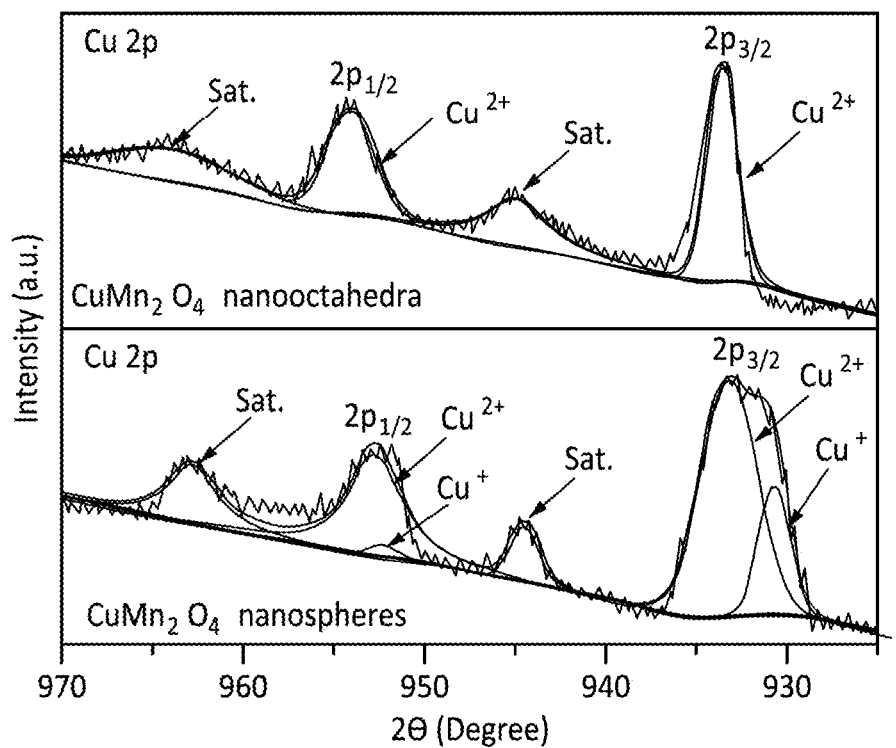
Figure 19D:
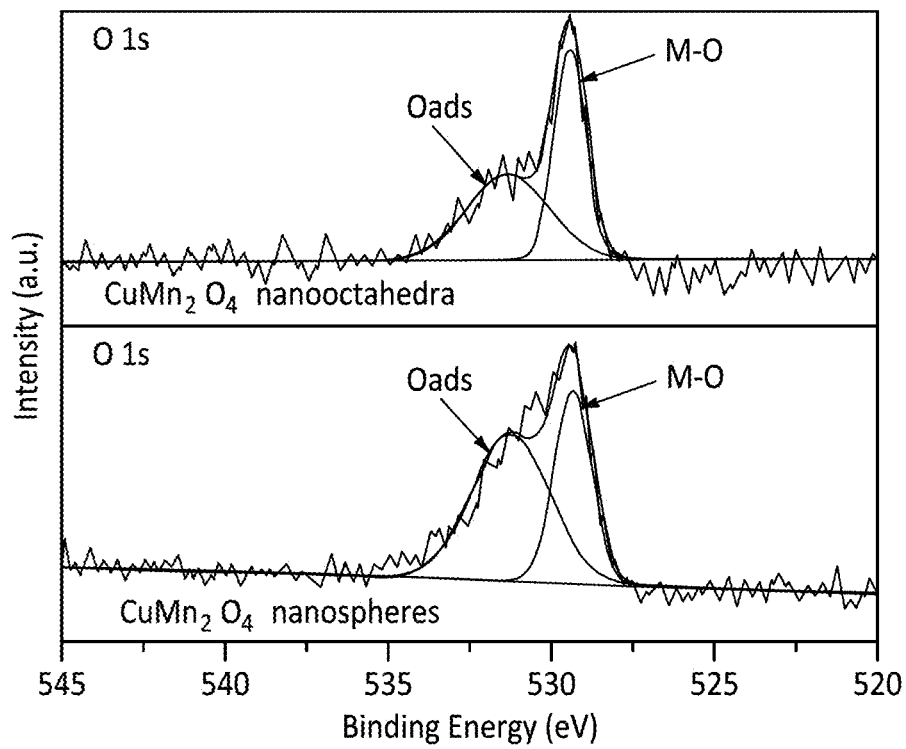
Figure 23:
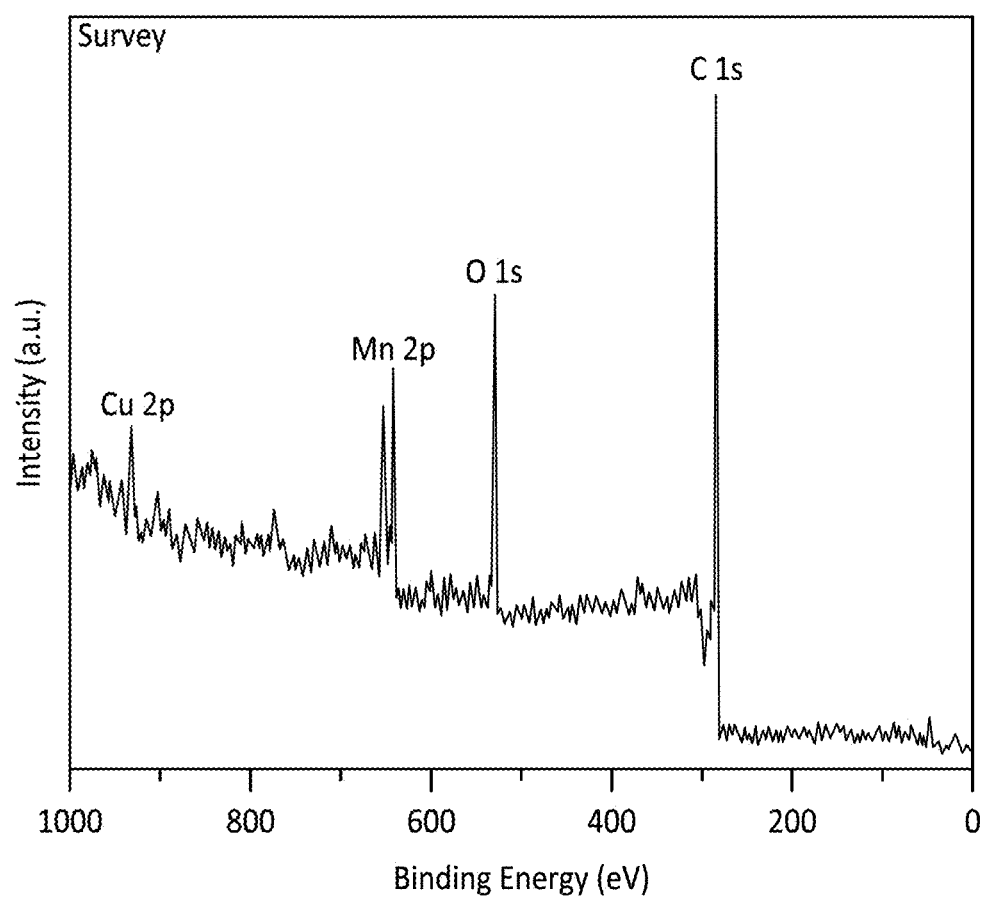
FIG. 23 depicts a survey spectrum of carbon-supported $CuMn_2O_4$ nano-octahedra after annealing in air at 300° C. for 12 h.

The $CuMn_2O_4$ samples were subsequently loaded onto carbon and annealed in air at 300° C. for 12 h to obtain $CuMn_2O_4$ nano-octahedra/C and $CuMn_2O_4$ nanospheres/C catalysts, respectively (refer to the Experimental Section below). The crystal structures of the carbon-supported samples were further confirmed by X-ray diffraction (XRD). It should be pointed out that the annealing treatment in air can greatly improve the crystallinity of the as-synthesized nanocrystals and effectively remove the surfactants adsorbed on the surfaces, thereby facilitating the ORR catalytic reaction.[7] As shown in FIG. 19A, all the characteristic peaks in the XRD patterns of both samples displayed well-resolved diffraction peaks, consistent with the standard lines of tetragonal $CuMn_2O_4$ (JCPDS no. 34-1322). This confirms the formation of the tetragonal phase with high crystallinity. To determine the chemical valence states of Mn, Cu, O as well as surface composition on these nanocrystals supported on carbon, XPS measurements were conducted. As shown in FIG. 23, the XPS survey spectrum of the $CuMn_2O_4$ nano-octahedra/C suggests the coexistence of Mn, Cu and O, in which the atomic ratio between Mn and Cu was determined as 1.98:1, almost identical to the STEM-EDX and ICP-OES results, indicating the uniform composition distribution throughout the entire nanocrystal. The Mn 2p spectra of $CuMn_2O_4$ nano-octahedra/C and nanospheres/C (FIG. 19B) were best fitted to three spin-orbit doublets characteristic of $Mn^{2+}$ (640.4 and 651.6 eV) $Mn^{3+}$ (641.6 and 652.8 eV) and $Mn^{4+}$ (643.2 and 654.4 eV), in which the surfaces of these $CuMn_2O_4$ nanocrystals were mainly dominated by $Mn^{3+}$ ($Mn^{4+}/Mn^{3+}/Mn^{2+}$=16/76/8). Notably, all the peaks of $CuMn_2O_4$ nano-octahedra/C exhibited slightly positive shifts compared to the peak positions of $CuMn_2O_4$ nanospheres/C, indicating an appreciable change in the electronic structure of Mn in $CuMn_2O_4$ nano-octahedra/C. More importantly, the $Mn^{3+}$ content in $CuMn_2O_4$ nano-octahedra/C was determined to be 76%; much higher than that in $CuMn_2O_4$ nanospheres/C with an $Mn^{3+}$ content of 58%, which might be more beneficial to boost the ORR performance. This result is in agreement with the previous reports that the ORR activity is strongly associated with Mn valence states on the surface of Mn-based spinel oxides. For the Cu 2p spectra shown in FIG. 19C, the peaks located at 933.5 and 954.0 eV in $CuMn_2O_4$ nano-octahedra/C can be assigned to the $Cu^{2+}$, which are more positive than those in $CuMn_2O_4$ nanospheres/C, confirming a clear change of the electronic structure of Cu in $CuMn_2O_4$ nano-octahedra/C as well. Particularly, in FIG. 19C, no $Cu^+$ peaks were observed in $CuMn_2O_4$ nano-octahedra/C, further implying the much stronger structural stability relative to nanospheres. It has been previously reported that the presence of $Cu^+$ affects the long-range cation ordering in spinels and thus lowers the crystal symmetry. Moreover, the deconvoluted O 1s spectra in FIG. 19D, which were fitted by two components assigned as lattice oxygen located at 529.3 eV and oxygen-containing species adsorbed on the surface, located at 531.3 eV, respectively, suggest a larger number of lattice oxygens on $CuMn_2O_4$ nano-octahedra/C than that on $CuMn_2O_4$ nanospheres/C. It is interesting to note that the large presence of lattice oxygen significantly contributes to the $O_2$ binding, thus greatly improving the ORR performance in alkaline media Combined together, these results reveal that the $CuMn_2O_4$ nano-octahedra/C exhibited enhanced electronic interactions between Cu and Mn centers, chemical/structural stability, and the improved ability of $O_2$ adsorption when compared with the $CuMn_2O_4$ nanospheres/C, thereby potentially improving their performance toward the ORR in alkaline media.

Figure 20A:
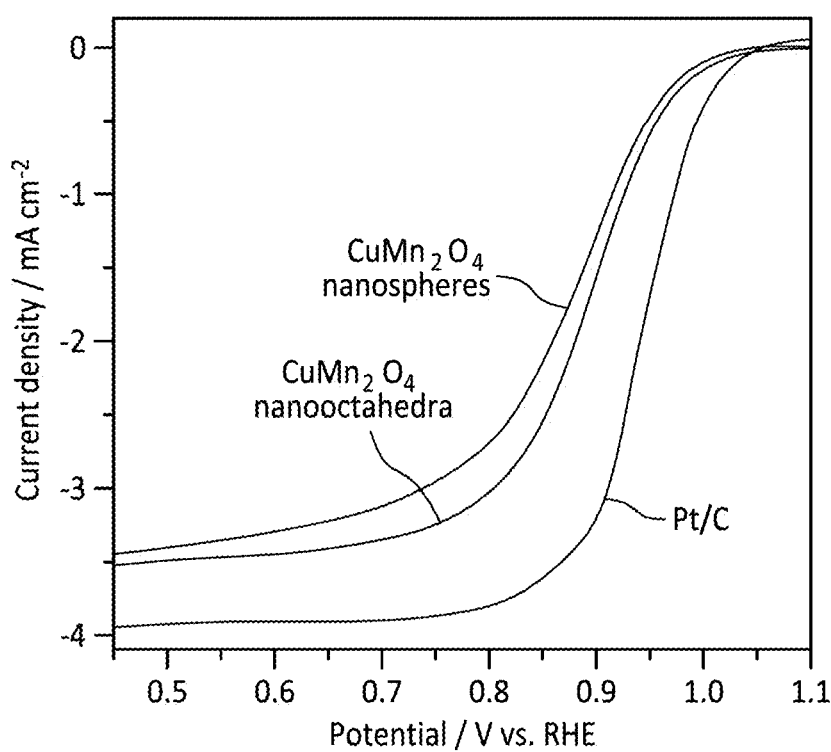
FIGS. 20A-20D depicts data of the present disclosure.

The electrocatalytic ORR performance of the $CuMn_2O_4$ nano-octahedra/C, nanospheres/C, and commercial Pt/C was comparatively investigated using an RDE in 1 M KOH solution. FIG. 20A shows the positive-going ORR polarization curves recorded for the $CuMn_2O_4$ nano-octahedra/C, $CuMn_2O_4$ nanospheres/C, and commercial Pt/C catalysts. In FIG. 20A, the $CuMn_2O_4$ nano-octahedra/C showed an $E_{1/2}$ value of 0.881 V vs. RHE, which is 17 mV higher than the $CuMn_2O_4$ nanospheres/C, revealing the superior alkaline ORR catalytic activity of the $CuMn_2O_4$ nano-octahedra/C catalyst compared with the $CuMn_2O_4$ nanospheres/C. More importantly, the ORR polarization profiles of both $CuMn_2O_4$ catalysts exhibited a diffusion-limited current density of $-3.6$ mA/cm$^2$, similar to the case of the commercial Pt/C, indicating a dominant 4e$^-$ reduction process accompanied with the complete conversion of $O_2$ into $H_2O$.

Figure 20B:
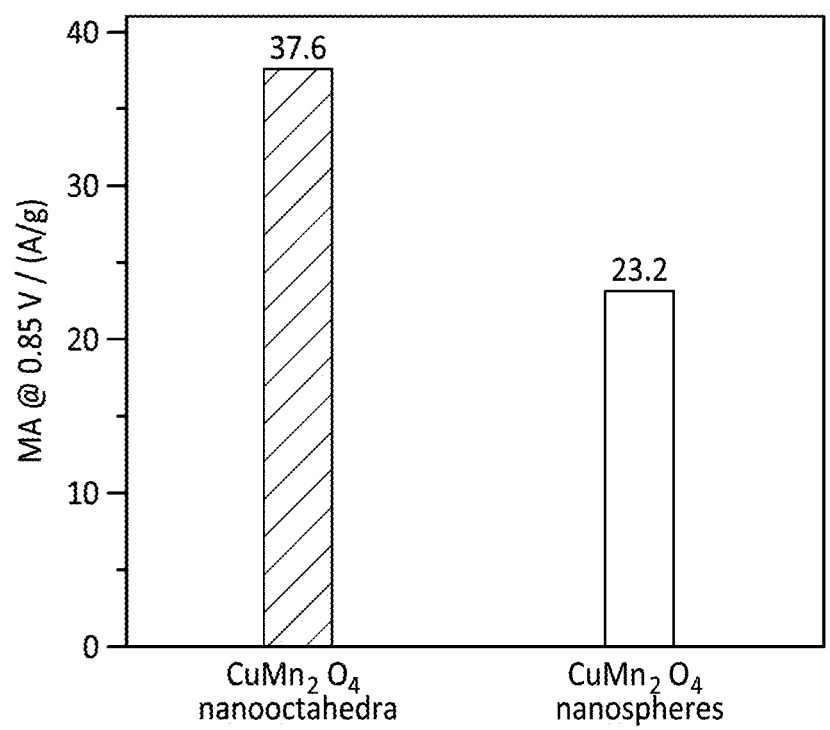
Figure 20C:
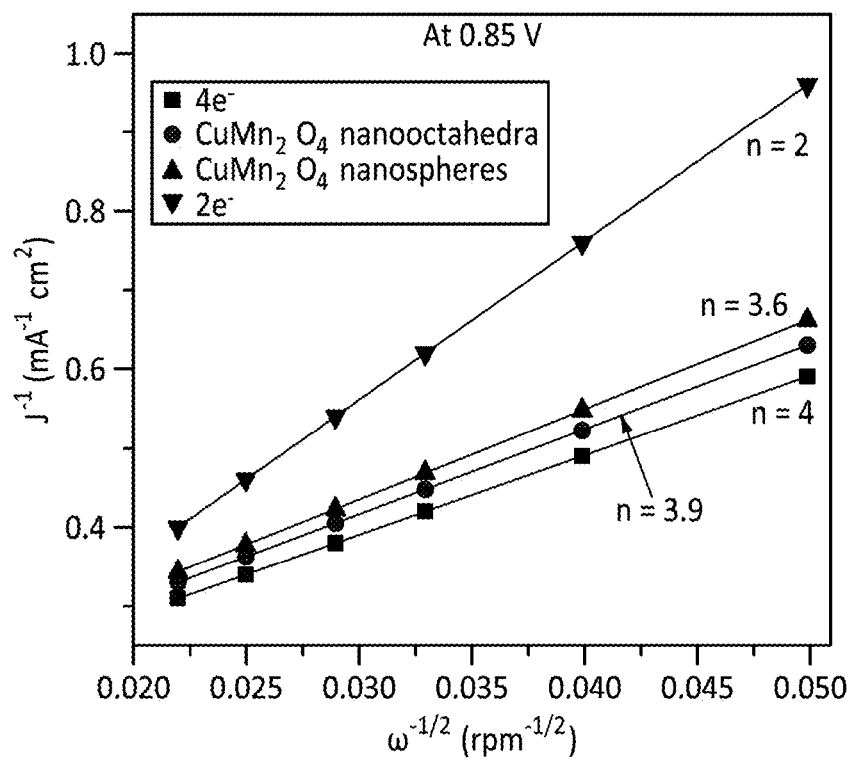
Figure 24A:
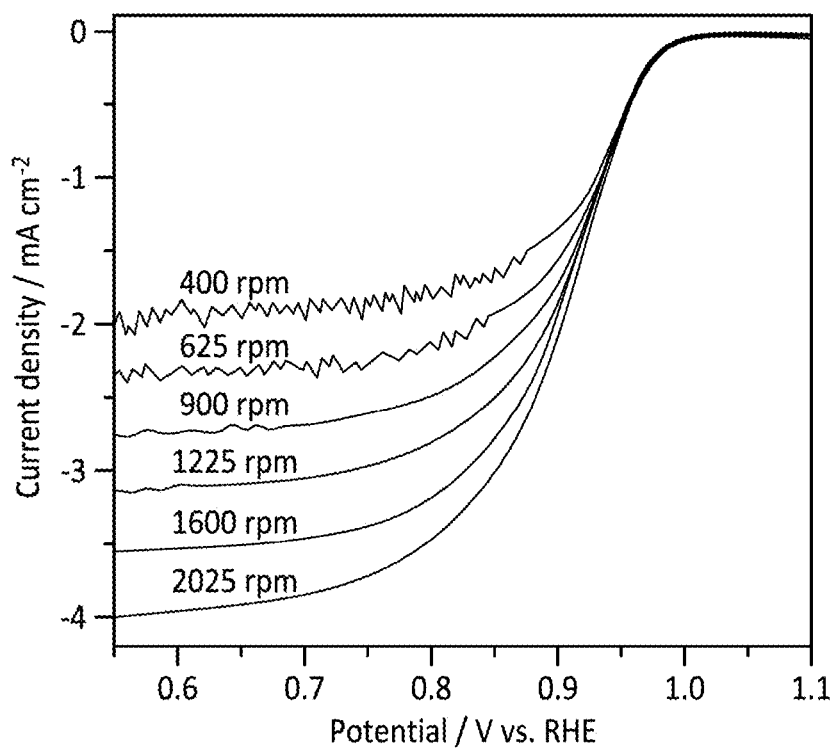
FIGS. 24A and 24B depict data of the present disclosure.
Figure 24B:
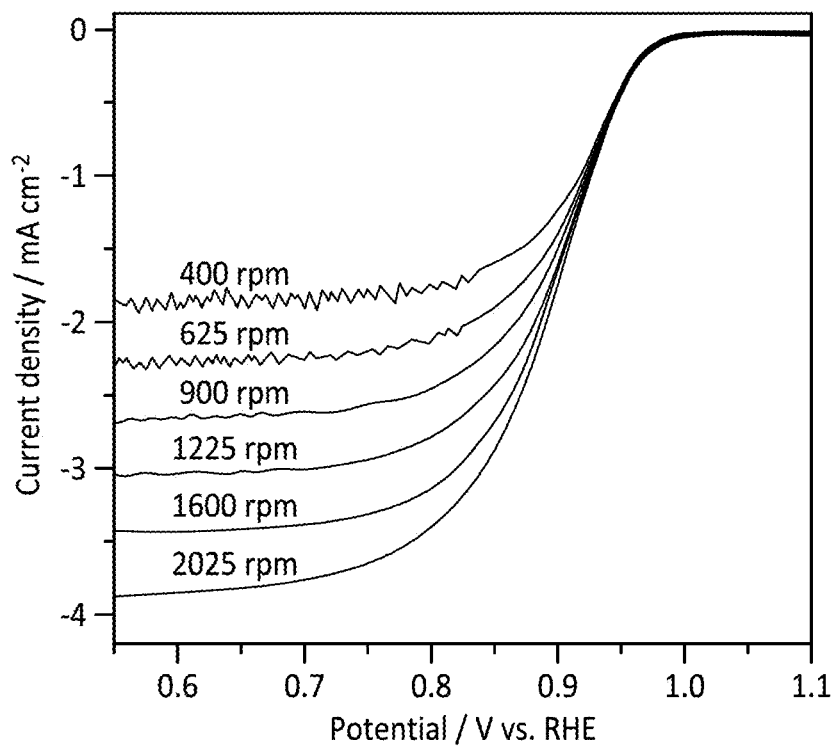

To further quantitatively evaluate the activity of the $CuMn_2O_4$ catalysts, the MA at 0.85 V used as a metric value, was calculated, based on the Levich equation, and then normalized against the mass loading of metal oxides on the electrode. As shown in FIG. 20B, the MA at 0.85 V of the $CuMn_2O_4$ nano-octahedra/C (37.6 A/g) was about 1.62 times as high as that of the $CuMn_2O_4$ nanospheres/C (23.2 A/g). Assuming that the carbon-supported annealing at 300° C. wouldn't change the particle size much, the possible size effect on this ORR performance of both the $CuMn_2O_4$ nanocatalysts can be ruled out based on the estimation of their specific surface areas. Relative to the $CuMn_2O_4$ nanospheres/C catalyst, the enhancement in MA of the $CuMn_2O_4$ nano-octahedra/C catalyst can thus be mainly attributed to the exclusively exposed {101} facets on the catalyst surface and a higher $Mn^{3+}$ content. The corresponding Koutecky-Levich (K-L) plots ($J^{-1}$ vs. $\omega^{-1/2}$) derived from the RDE voltammograms (FIGS. 24A and 24B) at 0.85 V are presented in FIG. 20C. The K-L plots show good linearity and parallelism for the $CuMn_2O_4$ nano-octahedral/C and $CuMn_2O_4$ nanosphere/C catalysts, revealing the first-order reaction kinetics for the ORR as a function of the concentration of dissolved oxygen. In addition, the electron transfer numbers (n) at +0.85 V were determined to be ~3.9 for the $CuMn_2O_4$ nano-octahedral/C catalyst and ~3.6 for the $CuMn_2O_4$ nanosphere/C catalyst, respectively, further verifying their excellent ORR activity.

Figure 20D:
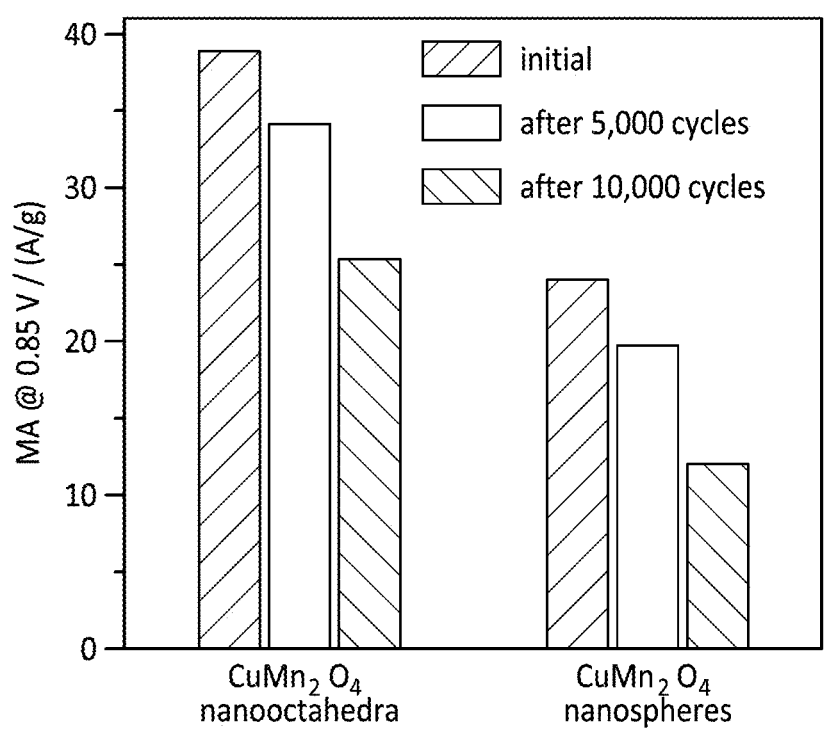
Figure 25A:
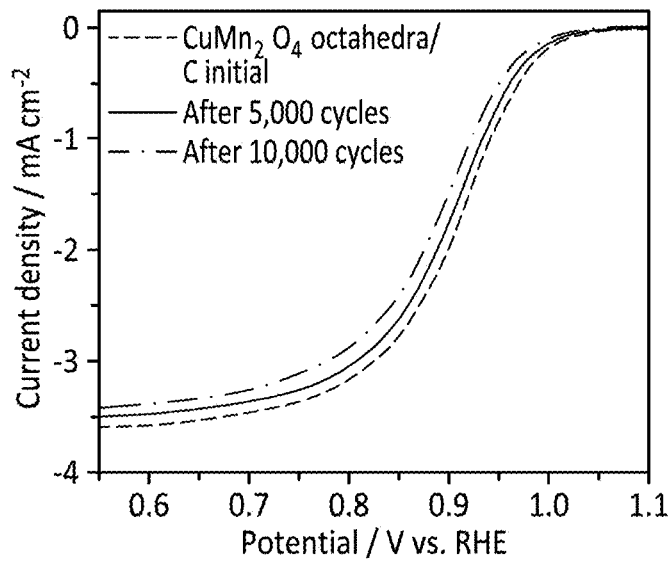
FIGS. 25A-25C depict data of the present disclosure including ORR polarization curves of (FIG. 25A) $CuMn_2O_4$ nano-octahedra/C, (FIG. 25B) $CuMn_2O_4$ nanospheres/C, and (FIG. 25C) Pt/C catalysts before and after the accelerated durability tests in $O_2$-saturated 1 M KOH at a scan rate of 100 mV/s from 0.6 to 1.0 V vs. RHE, respectively.
Figure 25B:
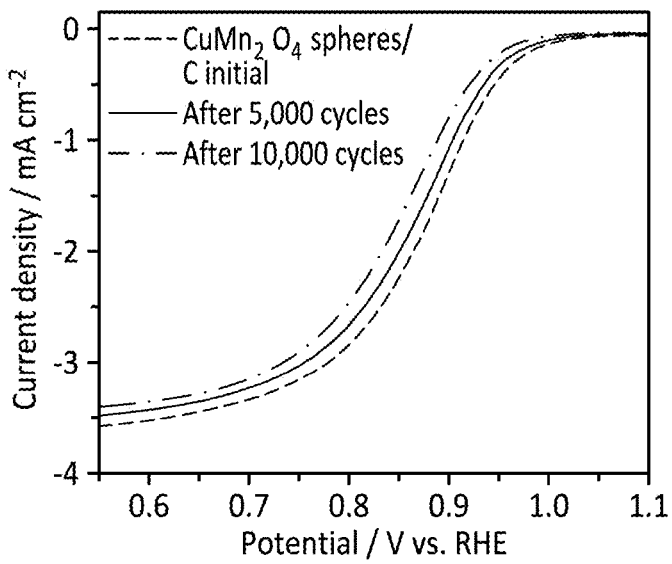
Figure 25C:
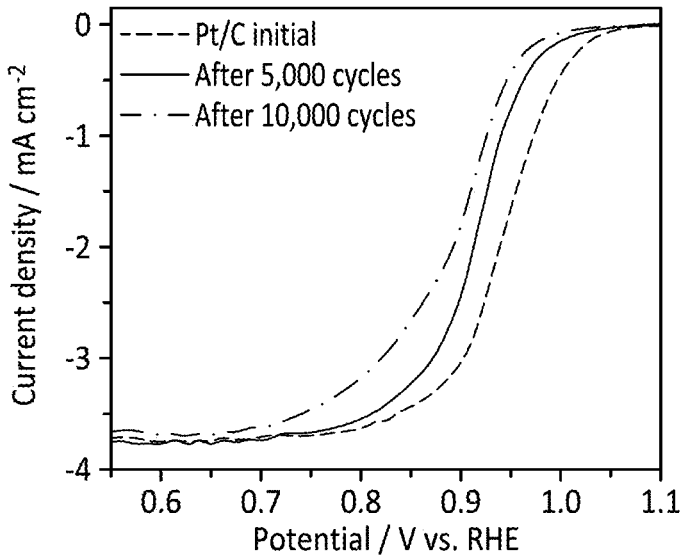
Figure 26A:
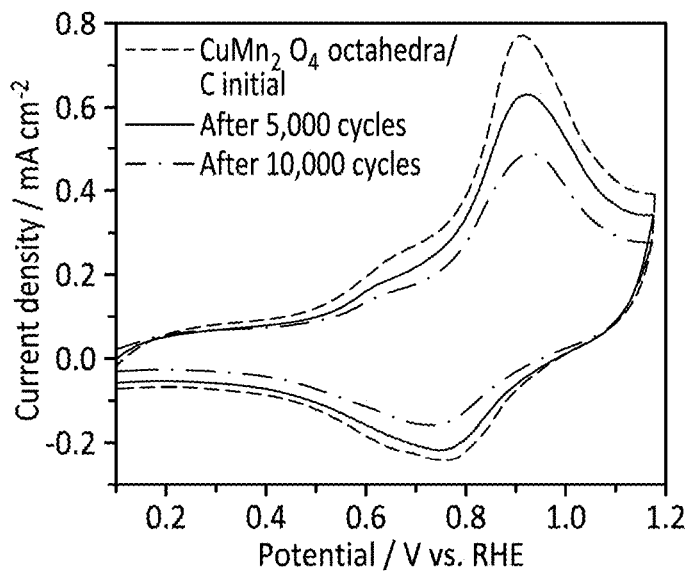
FIGS. 26A-26C depict CV curves of (FIG. 26A) $CuMn_2O_4$ nano-octahedra/C, (FIG. 26B) $CuMn_2O_4$ nanospheres/C, and (FIG. 26C) Pt/C catalysts before and after the accelerated durability tests in $O_2$-saturated 1 M KOH at a scan rate of 100 mV/s from 0.6 to 1.0 V vs. RHE, respectively.
Figure 26B:
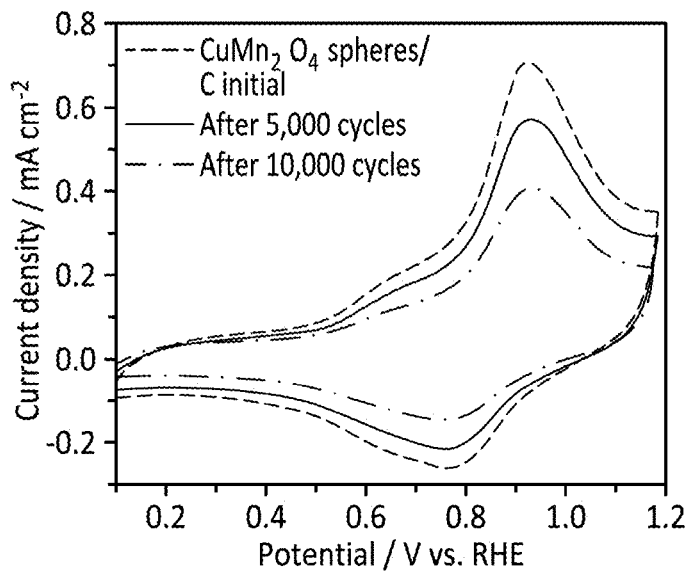
Figure 26C:
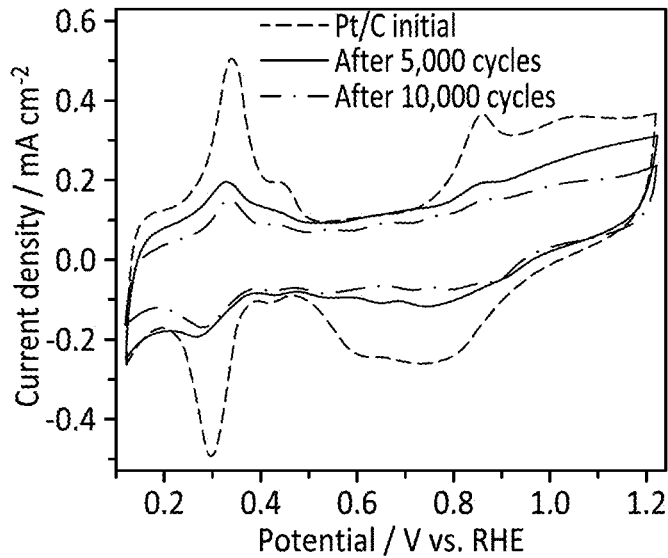
Figure 27A:
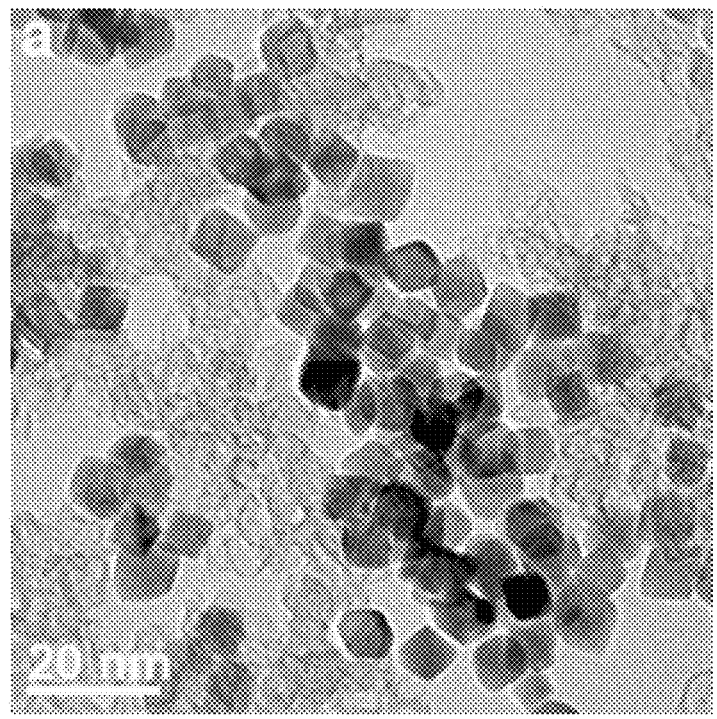
FIGS. 27A-27D depict images and data of the present disclosure.
Figure 27B:
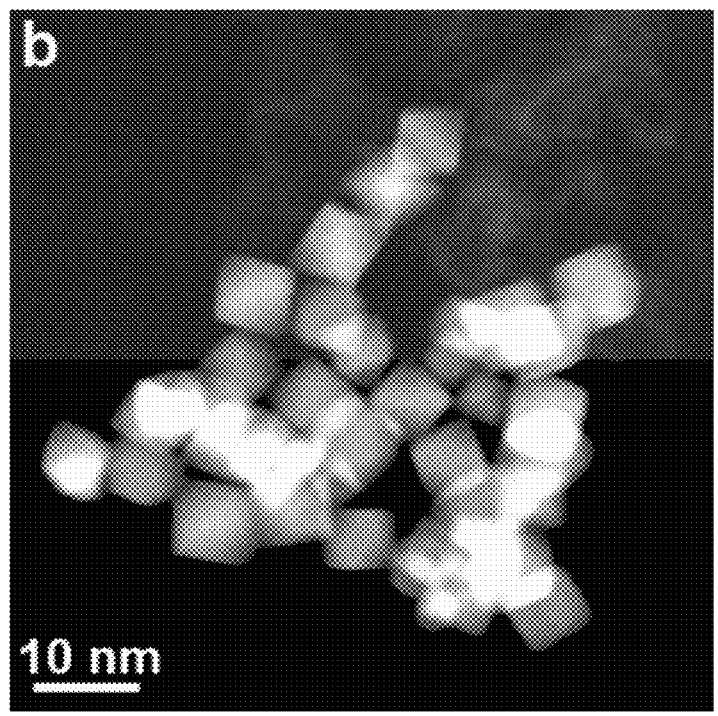
Figure 27C:
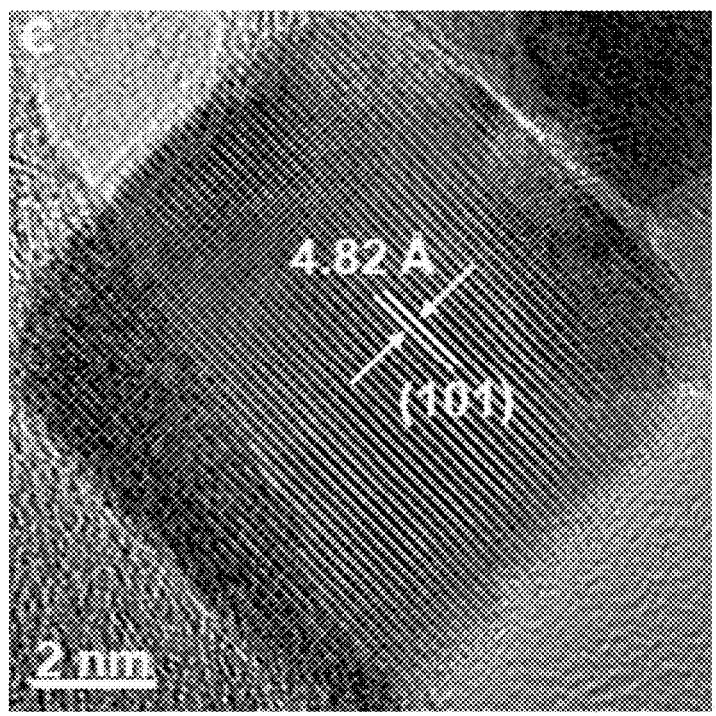
Figure 27D:
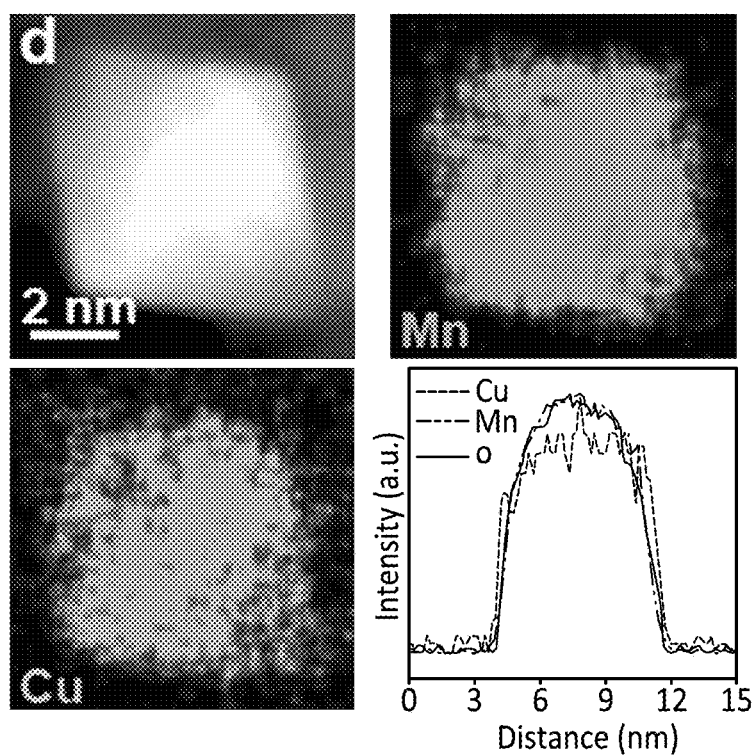
Figure 28A:
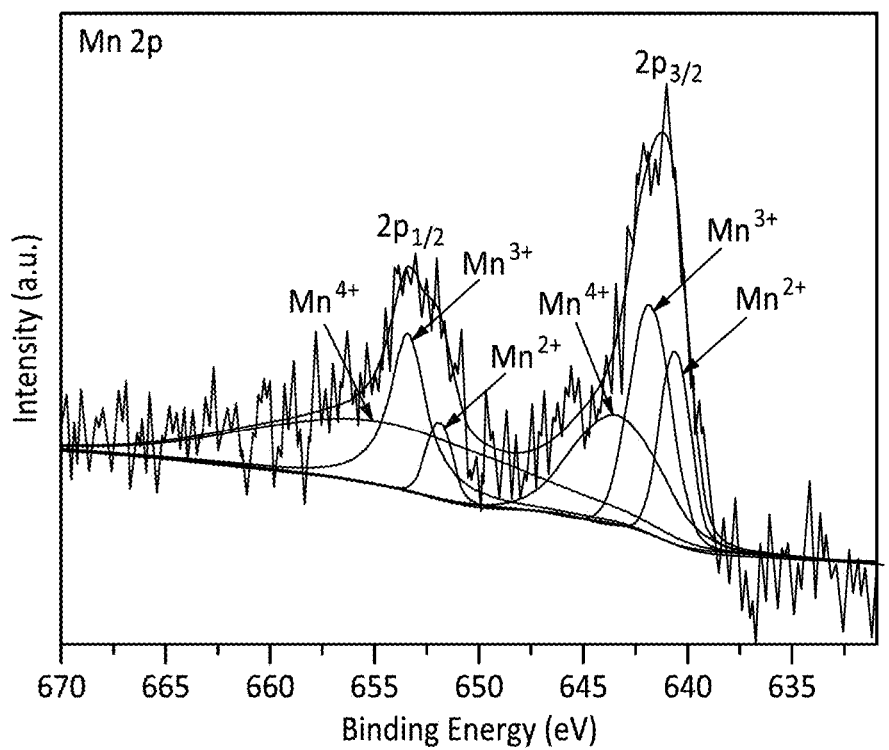
FIGS. 28A and 28B depict XPS spectra of (FIG. 28A) Mn 2p and (FIG. 28B) Cu 2p for $CuMn_2O_4$ nano-octahedra/C catalyst after the 10,000-cycle accelerated durability tests. Relative ratios of element states: $Mn^{2+}/Mn^{3+}/Mn^{4+}$=23:58:19; $Cu^{2+}/Cu^{+}$=93:7.
Figure 28B:
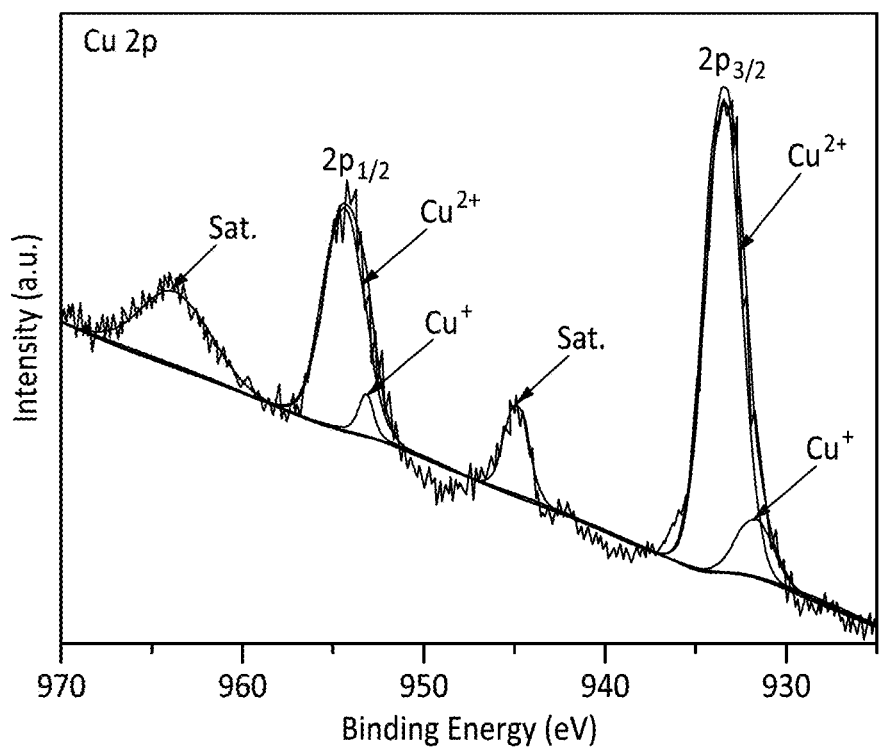

The durability of the $CuMn_2O_4$ nano-octahedral/C catalyst was evaluated via accelerated durability test (ADT), demonstrating a remarkable enhancement in stability when compared to that of the $CuMn_2O_4$ nanosphere/C and Pt/C catalysts. As shown in FIG. 25A, the $CuMn_2O_4$ nano-octahedral/C catalyst exhibited an activity decay with a $\Delta E_{1/2}$ value of 10 mV after 5,000 cycles and 24 mV after 10,000 cycles, which is superior to the $CuMn_2O_4$ nanospheres/C with a $\Delta E_{1/2}$ value of 33 mV (FIG. 25B) and the commercial Pt/C with a $\Delta E_{1/2}$ value of 51 mV after 10,000 cycles (FIG. 25C). The MA of the $CuMn_2O_4$ nano-octahedral/C catalyst at 0.85 V decreased from 37.6 A/g to 33.0 A/g after 5,000 cycles, corresponding to a loss of 12% relative to the pristine MA (FIG. 20D). After 10,000 cycles, the $CuMn_2O_4$ nano-octahedral/C catalyst retained 65.2% of its original MA value, while the $CuMn_2O_4$ nanosphere/C catalyst only retained 50% of its initial value (FIG. 20D). Remarkably, the MA of the $CuMn_2O_4$ nano-octahedral/C catalyst after 10,000 cycles was about 2 times as high as that of the $CuMn_2O_4$ nanosphere/C catalyst. Based on the CV measurement before and after the ADT (FIG. 26A-C), the $CuMn_2O_4$ nano-octahedral/C, $CuMn_2O_4$ nanosphere/C and Pt/C catalysts displayed a continuous decrease of the ECSA, mainly due to the nanoparticle aggregation/sintering and the loss of active components during the ADT progress. To probe the origin of the catalytic activity decline after the ADT, TEM (FIG. 27A), HAADF-STEM (FIG. 27B), and HRTEM characterizations (FIG. 27C) were further performed to examine the size, morphology, and crystal phase changes for the $CuMn_2O_4$ nano-octahedral/C catalyst. Impressively, after the ADT, the $CuMn_2O_4$ nano-octahedral/C catalyst retained its pristine structural parameters. The uniform elemental distribution in a representative carbon-supported $CuMn_2O_4$ nano-octahedron, after the ADT, was further confirmed by EDX mapping and corresponding normalized EDX line scan (FIG. 27D), in which the ratio of Mn/Cu was determined to be 2.2:1. Meanwhile, the XPS characterization (FIG. 28A) was carried out to identify the valence states of Mn and Cu on the catalyst surface after the 10,000-cycle ADT, in which the ratio of Mn/Cu was determined to be 2.3:1, nearly consistent with the EDX results. Especially, the content of $Mn^{3+}$ (FIG. 28A) shows a significant diminution from 76% (before the ADT) to 58% (after the 10,000-cycle ADT), illustrating the intrinsic nature of the ORR activity decline. Further XPS analysis of the Cu 2p spectrum (FIG. 28B) revealed the appearance of $Cu^+$ peaks, although $Cu^{2+}$ was still the dominant state of Cu atoms in the $CuMn_2O_4$ nano-octahedral/C catalyst after the ADT. The presence of $Cu^+$ may also contribute to an effect on the cation ordering, leading to degradation in the structural stability and ORR activity of the catalyst, as reported in previous studies.[1] As a result, we posit that the ORR activity decline in the $CuMn_2O_4$ nano-octahedral/C catalyst after the ADT could arise, at least in part, from a decrease in the surface $Mn^{3+}$ content and the appearance of $Cu^+$.

A facile, colloidal approach was demonstrated for the rational synthesis of uniform $CuMn_2O_4$ spinel nanocrystals with well-defined morphologies and size, as well as specific $Mn^{3+}/Mn^{2+}$ and $Cu^{2+}/Cu^+$ ratios on the surface. It was found that the type of Cu precursor plays a pivotal role in facilitating/controlling the formation of $CuMn_2O_4$ nanocrystals with distinct morphologies. More importantly, the as-synthesized $CuMn_2O_4$ spinel nano-octahedra exhibited superior electrocatalytic activity and stability toward the ORR in alkaline media when compared with their nano-spherical counterparts. It was found that the ORR activity decay may be due to a decrease in the $Mn^{3+}$ content and the existence of the $Cu^+$ on the surface of the $CuMn_2O_4$ nano-octahedral catalyst. This work provides a new strategy for the crystal facet and surface valence state-controlled synthesis of $CuMn_2O_4$ nanocrystals with substantially enhanced ORR performance. The facet-tailored nanocatalysts could provide a unique platform for an in-depth understanding of their surface lattice- and valence state-dependent catalytic properties.

Colloidal Synthesis of $CuMn_2O_4$ Spinel Nano-octahedra and Nanospheres: Chemicals, such as, Copper(II) chloride dihydrate ($CuCl_2 \cdot 2H_2O$, ≥99%), manganese(II) acetate tetrahydrate ($Mn(OAc)_2 \cdot 4H_2O$, 98%), copper acetylacetonate ($Cu(acac)_2$, 97%), oleylamine (70%), oleic acid (90%), xylenes (≥98%), hexane (≥98.5%), ethanol (99.9%), chloroform (AR), potassium hydroxide (KOH, ≥99.95%), 5% Nafion and isopropanol (anhydrous, 99.5%) were purchased from Sigma-Aldrich and used as received without further purification. Ketjen Black EC600JD was provided by Lion Specialty Chemicals Co., Ltd (JP). Deionized (DI) water with a resistivity of 18.2 MΩ·cm was obtained from a Purelab Flex3 water purification system (ELGA, UK).

$CuMn_2O_4$ spinel nano-octahedra were synthesized using a one-pot approach. In a standard synthesis, 13.9 mg of $CuCl_2 \cdot 2H_2O$, 40.0 mg of $Mn(OAc)_2 \cdot 4H_2O$, 2.6 mL of oleylamine, 1.3 mL of OA and 6.0 mL of xylene were combined in a 100 ml three-neck flask in air atmosphere. It is believed that oleylamine provides an alkalescent environment for the synthesis and oleic acid regulates the alkalinity of the reaction solution, whereas xylene serves as a non-polar solvent. The as-prepared mixture was sonicated for 6 min at room temperature to help dissolve all the solids completely, and then heated to 90° C. at 5° C./min under vigorous magnetic stirring. After 20 min, 1.0 mL of DI water was rapidly injected into the aforementioned mixture with a syringe. Subsequently, the resultant solution was aged at 90° C. for 24 h, followed by natural cooling down to room temperature. Finally, the products were precipitated using 5.0 ml of hexane and 15.0 ml of ethanol and centrifugation at 9,000 rpm for 10 min. They were further washed twice using a mixture of hexane and ethanol (v:v=1:2) followed by centrifugation at 9,000 rpm for 10 min. The final product was re-dispersed in 5.0 ml of hexane for future use.

For the synthesis of $CuMn_2O_4$ spinel nanospheres, the protocol was essentially the same as the procedure used for the standard synthesis of $CuMn_2O_4$ spinel nano-octahedra, except for the addition of 21.4 mg of $Cu(acac)_2$ instead of $CuCl_2 \cdot 2H_2O$. Note that in this work the conversion yield was estimated by calculating the molar ratio between the product and the input reactant supported by the ICP-OES assessment.

Characterizations: X-ray diffraction (XRD) patterns were collected at a scan rate of 2° min$^{-1}$ at 0.02° steps from 25 to 75 (or 80)° in 2 theta on a Rigaku Ultima IV Diffractometer. XPS spectra were acquired on PHI 5000 Versaprobe equipment. TEM and HRTEM images were taken using JEOL JEM-2100F (Japan) operated at 200 kV. The samples for TEM and HRTEM characterizations were prepared by drop-casting the nanocrystal dispersions in hexane on amorphous carbon-coated Cu grids and drying under ambient conditions. EDX analysis together with partial STEM images was performed in STEM mode on amorphous carbon-coated Au grids using an aberration-corrected JEOL 2200FS electron microscope equipped with a Bruker-AXS SDD detector and an FEI Talos 200X. The metal contents were measured using ICP-OES (Optima 7000 DV).

Preparation of the Working Electrodes: The as-synthesized $CuMn_2O_4$ spinel nano-octahedra or nano-spheres were loaded onto carbon support (Ketjen Black EC600JD) with a metal oxide content of 40%. Briefly, 4.0 mg of the $CuMn_2O_4$ spinel nanocrystals and 6.0 mg of Ketjen Black were mixed in 5.0 mL of ethanol under continuous ultrasonication for 4 h, and collected by centrifugation at 9,000 rpm for 10 min. The carbon-supported $CuMn_2O_4$ spinel nanocrystals were then washed with 0.1 M KOH in ethanol solution and collected by centrifugation at 9,000 rpm for 10 min thrice. The KOH-treated sample was further annealed in air at 300° C. for 12 h to help remove the surfactants absorbed on the surface of the nanocrystals. Subsequently, 5.0 mg of the carbon-supported catalyst were redispersed in a mixture of 0.6 mL of DI water, 0.4 mL of isopropanol, and 10.0 μL of 5% Nafion under ultrasonication for 1 h. Finally, 10.0 μL of the suspension was placed on a pre-cleaned glassy carbon RDE from Pine Research Instrumentation (0.196 cm$^2$ in geometric area) and dried under ambient conditions at room temperature. Similarly, the Pt/C catalyst containing 20 wt % Pt supported on Vulcan XC-72R (from the Fuel Cells Store) was used as a benchmark for comparison. The Pt/C catalyst ink was produced by dispersing 2.0 mg of the Pt/C catalyst in a mixture containing 1.0 mL of isopropanol, 1.0 mL of DI water, and 20.0 μL of 5% Nafion under ultrasonication for about 2 h. Then, 20.0 μL of the Pt/C catalyst ink was loaded on a pre-cleaned glassy carbon RDE, and dried under ambient conditions at room temperature. The mass loading of the commercial Pt/C catalysts is thus 20 μg/cm$^2$.

Electrochemical Measurements: All electrochemical measurements were carried out in a three-electrode cell using an electrochemical workstation (Gamry, 1000E) at room temperature (~25° C.). A glassy carbon electrode (GCE) with a diameter of 5 mm coated with catalysts was used as the working electrode. A Ag/AgCl in saturated KCl solution and a graphite rod were used as the reference and counter electrodes, respectively. All potentials were converted to RHE, or VRHE, by following the equation: E(RHE)=E(Ag/AgCl)+1.0258 (V). Before electrochemical tests, the three-neck electrochemical cell was washed using aqua regia and then rinsed thoroughly using DI water to avoid any potential contamination of precious metal. The working electrodes were initially cycled between 0.1 and 1.42 V at 50 mV s$^{-1}$ in Ar-saturated 1 M KOH for 50 cycles to remove the remaining ligands on the catalyst surfaces and yield stable CV profiles. The working electrodes were scanned cathodically between 0.38 and 1.09 V at 5 mV s$^{-1}$ and 1,600 rpm in $O_2$-saturated 1 M KOH. Note that the capacitive background currents in CV curves, measured in Ar-saturated 1 M KOH solution were subtracted from the raw ORR data. Note that all the current densities shown in CV and ORR profiles were calculated based on the electrode geometric area only. Durability tests were carried out by potential cycling from 0.6 V to 1.0 V at 100 mV s$^{-1}$ for 10,000 cycles. To avoid potential contamination from metal species in the solution, the ORR profiles after 10,000 cycles were obtained in a fresh $O_2$-saturated 1 M KOH solution.

Based on the average particle sizes of the $CuMn_2O_4$ nano-octahedra and $CuMn_2O_4$ nanospheres presented in FIGS. 21 and 22, the specific surface areas of both samples are estimated as follows.

For an octahdron, the volume V=(2/3) a$^3$, surface area A=2√3 a$^2$ (a is the side length, and is about 9.1 nm according to FIG. 21.) For a sphere, the volume V=(4/3)πr$^3$, surface area A=4π r$^2$ (r is the radius, and is about 7.8/2 nm according to FIGS. 22A-D.) Assume the density of $CuMn_2O_4$ is ρ. According to the fact that the total mass loaded on the electrode for each sample is the same (note that the oxide/carbon mass ratio is also the same for each sample), then (2/3) a$^3$ m ρ=(4/3)πr$^3$ n ρ (m is the total number of nano-octahdra on the electrode; whereas n for nanospheres) That is, m/n=2π (r$^3$/a$^3$). Hence, the ratio between total surface area of nano-octahdra and total surface area of nanospheres is: [2√3 a$^2$ m]/[4π r$^2$ n]=[2√3 a$^2$/4π r$^2$] (m/n)=[2√3 a$^2$/4π r$^2$][2π (r$^3$/a$^3$)]=√3 (r/a)≈1.732 (3.4/9.1)≈0.65. This means that the total surface area of the nano-octahedra is much less than that of the nanospheres.

Since the masses of both catalysts are equal, the aforementioned outcome indicates that the specific surface area of the nano-octahedra is much less than that of the nano-spheres. As such, it is worth pointing out that, in this case, the higher specific surface area (the case of nanospheres) should make more contributions to the catalytic activity as compared to nano-octahedra.

Further, with respect to specific surface area based on the average particle sizes of the CuMn2O4 nano-octahedra and CuMn2O4 nanospheres presented in FIG. 21 and FIG. 22 A-D, the specific surface areas of both samples are estimated as follows: For an octahedron, the volume V=(2/3) a$^3$, surface area A=2 √3 a$^2$ (a is the side length, and is about 9.1 nm according to FIG. 21)

For a sphere, the volume V=(4/3) π r$^3$, surface area A=4 π r$^2$ (r is the radius, and is about 7.8/2 nm according to FIG. 22A-D.) Assume the density of CuMn2O4 is p, According to the fact that the total mass loaded on the electrode for each sample is the same (note that the oxide/carbon mass ratio is also the same for each sample), we have $$(2/3)a^3 m\ p = (4/3)\pi r^3 n\rho$$

(m is the total number of nano-octahedra on the electrode; whereas n for nanospheres) That is, $$m/n = 2\pi(r^3/a^3)$$

Hence, the ratio between the total surface area of nano-octahedra and the total surface area of nanospheres is:

$$[2\sqrt{3}\,a^2 m]/[4\pi r^2 n] = [2\sqrt{3}\,a^2/4\pi r^2]$$

$$(m/n) = [2\sqrt{3}\,a^2/4\pi r^2][2\pi(r^3/a^3)] = \sqrt{3}\,(r/a) \approx 1.732\,(3.4/9.1) \approx 0.65$$

This means that the total surface area of the nano-octahedra is much less than that of the nanospheres. Since the masses of both catalysts are equal, the aforementioned outcome indicates that the specific surface area of the nano-octahedra is much less than that of the nanospheres. As such, it is worth pointing out that, in this case, the higher specific surface area (the case of nanospheres) should make more contributions to the catalytic activity as compared to nano-octahedra. Note that the above-discussed specific surface area is for the consideration of possible size-effect only, and cannot be used as ECSA for the specific activity calculation.

Mass activity summary of some recently reported spinel electrocatalysts towards ORR in alkaline media is presented in Table 1. It should be noted that the mass activity might be measured with slightly different values at different labs due to some diverse conditions. Also, 0.1 M KOH conditions normally provide superior results compared to the 1 M KOH. However, it is clear from the Table 1 results that the presently claimed catalyst provide higher MA than most.

TABLE 1

| Catalysts | Electrolyte | Mass activity at 0.85 V (A g$^{-1}$) | Reference |
|---|---|---|---|
| CuMn$_2$O$_4$ nano-octahedra | O$_2$-saturated 1M KOH | 37.6 | Disclosed herein |
| CuMn$_2$O$_4$ nanospheres | | 23.2 | |
| CoMn$_2$O$_4$ nano-octahedra | O$_2$-saturated 1M KOH | 60.0 | Disclosed herein |
| CoMn$_2$O$_4$ nanospheres | | 38.6 | |
| CuMn$_2$O$_4$ nanoparticles | O$_2$-saturated 1M KOH | 8.6 | Proc. Natl. Acad. Sci. 2019, 116, 24425 |
| CuCo$_2$O$_4$ nanoparticles | | 16 | |
| CuFe$_2$O$_4$ nanoparticles | | 16 | |
| Co$_2$VO$_4$ nanosheets | O$_2$-saturated 1M KOH | 5.2 | Adv. Mater. 2020, 32, 1907168 |
| MnCo$_2$O$_4$ spinels | O$_2$-saturated 0.1M KOH | 10.0 | Adv. Mater. 2017, 29, 1606800 |
| Mn$_{0.8}$(CoFe$_2$)$_{0.73}$O$_4$ nanoparticles | O$_2$-saturated 1M NaOH | 7.25 | J. Am. Chem. Soc. 2019, 141, 4412 |
| Co$_{1.5}$Mn$_{1.5}$O$_4$/C | O$_2$-saturated 1M KOH | 28.41 | J. Am. Chem. Soc. 2019, 141, 1463 |
| CoMn$_2$O$_4$/nitrogen-doped carbon nanofibers | O$_2$-saturated 0.1M KOH | 34.2 | J. Mater. Chem. A 2019, 7, 24868 |
| Co$_{0.25}$Mn$_{0.75}$Fe$_{2.0}$ multi-metal oxide nanoparticles | O$_2$-saturated 1M KOH | 46.9@0.9 V | Adv. Mater. 2022, 34, 2107868 |
| mesostructured CuCo$_2$O$_4$ | O$_2$-saturated 0.1M KOH | 16.4@0.9 V | ChemElectroChem 2019, 6, 3460 |
| ZnCo$_2$O$_4$ microspheres | O$_2$-saturated 1M KOH | 2.8 | Int. J. Hydrogen Energy 2019, 44, 1565 |
| NiFe$_2$O$_4$/MoS$_2$ hetero-structured composite | O$_2$-saturated 0.1M KOH | 5.1 | Energy Fuels 2022, 36, 7782 |

The entire disclosure of all applications, patents, and publications cited herein are herein incorporated by reference in their entirety. While the foregoing is directed to embodiments of the present disclosure, other and further embodiments of the disclosure may be devised without departing from the basic scope thereof.

What is claimed:

1. A fuel cell catalyst, comprising: one or more substantially monodisperse CoMn$_2$O$_4$ or CuMn$_2$O$_4$ nanocrystals, wherein the one or more substantially monodisperse CoMn$_2$O$_4$ or CuMn$_2$O$_4$ nanocrystals comprise an octahedral morphology comprising eight exclusively exposed {101} facets.

2. The fuel cell catalyst of claim 1, wherein the one or more substantially monodisperse CoMn$_2$O$_4$ or CuMn$_2$O$_4$ nanocrystals have an average diameter of about 9 nm, and a monodispersity having a deviation of less than approximately ±1.0 nm.

3. The fuel cell catalyst of claim 1, wherein the one or more substantially monodisperse CoMn$_2$O$_4$ or CuMn$_2$O$_4$ nanocrystals are characterized as highly-efficient spinel oxide electrocatalysts toward ORR in alkaline media.

4. The fuel cell catalyst of claim 1, wherein the one or more substantially monodisperse CoMn$_2$O$_4$ or CuMn$_2$O$_4$ nanocrystals reach a maximum oxygen reduction reaction (ORR) mass activity in an alkaline media.

5. The fuel cell catalyst of claim 1, wherein the one or more substantially monodisperse CoMn$_2$O$_4$ nanocrystals yield a high mass activity (MA) up to 60.0 A/g at 0.85 V, or the one or more substantially monodisperse CuMn$_2$O$_4$ nanocrystals yield a high mass activity (MA) up to 37.6 A/g at 0.85 V.

6. A cathode for an alkaline fuel cell, comprising: a fuel cell catalyst in accordance with claim 1.

7. An alkaline fuel cell, comprising: the cathode of claim 6.

8. A fuel cell catalyst, comprising: one or more substantially monodisperse CoMn$_2$O$_4$, CuMn$_2$O$_4$, ZnMn$_2$O$_4$, MgMn$_2$O$_4$, or NiMn$_2$O$_4$ nanocrystals, wherein the one or more substantially monodisperse CoMn$_2$O$_4$, CuMn$_2$O$_4$, ZnMn$_2$O$_4$, MgMn$_2$O$_4$, or NiMn$_2$O$_4$ nanocrystals are characterized as {101} facet terminated nano-octahedra spinel nanocrystals.

9. The fuel cell catalyst of claim 8, wherein the one or more substantially monodisperse CoMn$_2$O$_4$, CuMn$_2$O$_4$, ZnMn$_2$O$_4$, MgMn$_2$O$_4$, or NiMn$_2$O$_4$ nanocrystals reach a maximum oxygen reduction reaction (ORR) mass activity in an alkaline media.

10. A cathode for an alkaline fuel cell, comprising: a fuel cell catalyst in accordance with claim 8.

11. An alkaline fuel cell, comprising: the cathode of claim 10.

* * * * *